(12) United States Patent
Wang et al.

(10) Patent No.: US 11,046,491 B2
(45) Date of Patent: *Jun. 29, 2021

(54) BOTTLE CLOSURE ASSEMBLY INCLUDING A POLYETHYLENE COMPOSITION

(71) Applicant: NOVA Chemicals (International) S.A., Fribourg (CH)

(72) Inventors: XiaoChuan Wang, Calgary (CA); Ian Gibbons, Calgary (CA); Eric Vignola, Airdrie (CA); Cliff Baar, Calgary (CA); Amin Mirzadeh, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 169 days.

This patent is subject to a terminal disclaimer.

(21) Appl. No.: 16/202,565

(22) Filed: Nov. 28, 2018

(65) Prior Publication Data

US 2019/0168935 A1 Jun. 6, 2019

Related U.S. Application Data

(60) Provisional application No. 62/591,911, filed on Nov. 29, 2017.

(51) Int. Cl.
*B65D 55/16* (2006.01)
*B65D 41/34* (2006.01)
(Continued)

(52) U.S. Cl.
CPC .......... *B65D 55/16* (2013.01); *B65D 1/0246* (2013.01); *B65D 41/34* (2013.01);
(Continued)

(58) Field of Classification Search
CPC .... B65D 55/16; B65D 41/3428; B65D 41/48; B65D 1/0246; B65D 41/34; B65D 53/02;
(Continued)

(56) References Cited

U.S. PATENT DOCUMENTS

| 3,645,992 A | 2/1972 | Elston |
| 3,904,062 A | 9/1975 | Grussen |

(Continued)

FOREIGN PATENT DOCUMENTS

| WO | 93/03093 A1 | 2/1993 |
| WO | 2005/121239 A2 | 12/2005 |

(Continued)

OTHER PUBLICATIONS

ASTM D256-10—Standard Test Methods for Determining the Izod Pendulum Impact Resistance of Plastics; Copyright ASTM International; Current edition approved May 1, 2010. Published Jun. 2010. Originally approved in 1926. Last previous edition approved in 2006 ad D256-06a. pp. 1-20.

(Continued)

*Primary Examiner* — Michael C Miggins
(74) *Attorney, Agent, or Firm* — Thomas J. Styslinger

(57) ABSTRACT

The present disclosure describes bottle closure assemblies which are made at least in part with a polyethylene composition having good processability, good organoleptic properties and good dimensional stability. The bottle closure assembly includes a cap portion, an elongated tether portion, and a retaining means portion. The retaining means portions engages a bottle neck or an upper portion of a bottle. The elongated tether portion connects at least one point on the cap portion to at least one point on the retaining means portion so as to prevent loss of the cap portion from a bottle.

9 Claims, 18 Drawing Sheets

(51) Int. Cl.

| | | |
|---|---|---|
| *C08L 23/08* | (2006.01) | |
| *B65D 41/48* | (2006.01) | |
| *B65D 1/02* | (2006.01) | |
| *B65D 53/02* | (2006.01) | |

(52) U.S. Cl.
CPC ......... *B65D 41/3428* (2013.01); *B65D 41/48* (2013.01); *B65D 53/02* (2013.01); *C08L 23/0815* (2013.01); *C08L 2203/10* (2013.01); *C08L 2205/025* (2013.01)

(58) Field of Classification Search
CPC ........... C08L 23/0815; C08L 2205/025; C08L 2203/10
See application file for complete search history.

(56) References Cited

U.S. PATENT DOCUMENTS

| | | |
|---|---|---|
| 4,474,302 A | 10/1984 | Goldberg et al. |
| 4,557,393 A | 12/1985 | Boik |
| 4,564,114 A | 1/1986 | Cole |
| 4,573,602 A | 3/1986 | Goldberg |
| 4,583,652 A | 4/1986 | Goldberg |
| 4,701,432 A | 10/1987 | Welborn, Jr. |
| 4,798,081 A | 1/1989 | Hazlitt et al. |
| 4,805,792 A | 2/1989 | Lecinski, Jr. |
| 4,808,561 A | 2/1989 | Welborn, Jr. |
| 4,935,397 A | 6/1990 | Chang |
| 4,937,301 A | 6/1990 | Chang |
| 5,055,438 A | 10/1991 | Canich |
| 5,057,475 A | 10/1991 | Canich et al. |
| 5,292,845 A | 3/1994 | Kawasaki et al. |
| 5,324,800 A | 6/1994 | Welborn, Jr. et al. |
| 5,342,868 A | 8/1994 | Kimura et al. |
| 5,376,439 A | 12/1994 | Hodgson et al. |
| 5,633,394 A | 5/1997 | Welborn, Jr. et al. |
| 5,703,187 A | 12/1997 | Timmers |
| 5,725,115 A | 3/1998 | Bosl et al. |
| 5,981,636 A | 11/1999 | Amos et al. |
| 6,002,033 A | 12/1999 | Razavi et al. |
| 6,034,021 A | 3/2000 | Wilson et al. |
| 6,063,879 A | 5/2000 | Stephan et al. |
| 6,114,481 A | 9/2000 | McMeeking et al. |
| 6,235,672 B1 | 5/2001 | McKay et al. |
| 6,277,931 B1 | 8/2001 | Jaber et al. |
| 6,342,463 B1 | 1/2002 | Stephan et al. |
| 6,372,864 B1 | 4/2002 | Brown |
| 6,465,551 B1 | 10/2002 | Zhao et al. |
| 6,489,413 B1 | 12/2002 | Floyd et al. |
| 6,599,971 B2 | 7/2003 | Dotson et al. |
| 6,689,847 B2 | 2/2004 | Mawson et al. |
| 6,777,509 B2 | 8/2004 | Brown et al. |
| 6,984,695 B2 | 1/2006 | Brown et al. |
| 8,022,143 B2 | 9/2011 | Wang |
| 8,443,994 B1 | 5/2013 | Desselle |
| 8,720,716 B2 | 5/2014 | Campbell |
| 8,962,755 B2 | 2/2015 | Wang et al. |
| 9,074,082 B2 | 7/2015 | Wang et al. |
| 9,371,442 B2 | 6/2016 | Wang |
| 9,475,927 B2 | 10/2016 | Wang et al. |
| 9,493,283 B2 | 11/2016 | Tuyn |
| 9,505,893 B2 | 11/2016 | Wang et al. |
| 9,637,628 B2 | 5/2017 | Wang |
| 9,758,653 B2 | 9/2017 | Wang et al. |
| 9,776,779 B2 | 10/2017 | Campbell |
| 9,783,663 B2 | 10/2017 | Wang |
| 9,783,664 B1 | 10/2017 | Wang |
| 2004/0016715 A1 | 1/2004 | Strikovic |
| 2006/0247373 A1 | 11/2006 | Goyal et al. |
| 2008/0197135 A1 | 8/2008 | Berman |
| 2014/0171582 A1† | 6/2014 | Wang |
| 2015/0251827 A1† | 9/2015 | Campbell |

FOREIGN PATENT DOCUMENTS

| | | |
|---|---|---|
| WO | 2011/050042 A1 | 4/2011 |
| WO | 2015/042561 A1 | 3/2015 |
| WO | 2015/042562 A1 | 3/2015 |
| WO | 2015/042563 A1 | 3/2015 |
| WO | 2015/061834 A1 | 5/2015 |

OTHER PUBLICATIONS

ASTM D638-14—Standard Test Method for Tensile Properties of Plastics; Copyright ASTM International; Current edition approved Dec. 15, 2014. Published Mar. 2015. Originally approved in 1941. Last previous edition approved in 2010 as D638-10. pp. 1-17.

ASTM D648-16—Standard Test Method for Deflection Temperature of Plastics Under Flexural Load in the Edgewise Position; Copyright ASTM International; Current edition approved Apr. 1, 2016. Published Apr. 2016. Originally approved in 1941. Last previous edition approved in 2007 as D648-07, which was withdrawn Jan. 2016 and reinstated in Apr. 2016. pp. 1-14.

ASTM D790-15—Standard Test Methods for Flexural Properties of Unreinforced and Reinforced Plastics and Electrical Insulating Materials; Copyright ASTM International; Current edition approved Dec. 1, 2015. Published Jan. 2016. Originally approved in 1970. Last previous edition approved in 2010 as D790-10. pp. 1-12.

ASTM D792-13; Standard Test Methods for Density and Specific Gravity (Relative Density) of Plastics by Displacement; Copyright ASTM International; Current edition approved Nov. 1, 2013. Published Nov. 2013. Originally approved in 1944. Last previous edition approved in 2008 as D792-08. pp. 1-6.

ASTM D1525-09; Standard Test Method for Vicat Softening Temperature of Plastics; Copyright ASTM International; Current edition approved Nov. 15, 2009. Published Dec. 2009. Originally approved in 1958. Last previous edition approved in 2007 as D1525-07. pp. 1-10.

ASTM D1693-15; Standard Test Method for Environmental stress-Cracking of Ethylene Plastics; Copyright ASTM International; Current Edition approved May 1, 2015. Published Jun. 2015. Originally approved in 1959. Last previous edition approved in 2013 as D1693-13. pp. 1-11.

ASTM D3124-98 (Reapproved 2011); Standard Test Method for Vinylidene Unsaturation in Polyethylene by Infrared Spectrophotometry; Copyright ASTM International; Current edition approved Feb. 1, 2011. Published Mar. 2011. Originally approved in 1972. Last previous edition approved in 2003 as D3124-98 (2003). pp. 1-4.

ASTM D5227-13; Standard Test Method for Measurement of Hexane Extractable Content of Polyolefins; Copyright ASTM International; Current edition approved Jun. 1, 2013. Published Jul. 2013. Originally approved in 1992. Last previous edition approved in 2008 as D5227-01 (2008). pp. 1-4.

ASTM D6474-99 (reapproved 2006); Standard Test Method for Determining Molecular Weight Distribution and Molecular Weight Averages of Polyolefins by High Temperature Gel Permeation Chromatography; Copyright ASTM International; Current edition approved Mar. 15, 2006. Published Apr. 2006. Originally approved in 1999. Last previous edition approved in 1999 as D6474-99. pp. 1-6.

ASTM D6645-01 (Reapproved 2010); Standard Test Method for Methyl (Comonomer) Content in Polyethylene by Infrared Spectrophotometry; Copyright ASTM International; Current enditon approved Jan. 1, 2010. Published Jan. 2010. Originally approved in 2001. Last previous edition approved in 2001 as D6645-01. pp. 1-4.

ASTM 1238-04; Standard Test Method for Melt Flow Rates of Thermoplastics by Extrusion Plastometer; Copyright ASTM International; Current edition approved Mar. 1, 2004. Published Apr. 2004. Originally approved in 1965. Last previous edition approved in 2001 as D 1238-01. pp. 1-13.

Soares, J.B.P. and Hamielec, A.E.; Copolymerization of Olefins in a Series of Continuous Stirred-Tank Slurry-Reactors Using Heterogeneous Ziegler-Natta and Metallocene Catalysts. I. General Dynamic Mathematical Model; Polymer Reaction Engineering, Copyright 1996 by Marcel Dekker, Inc.; 4(2&3), pp. 153-191.

(56) References Cited

OTHER PUBLICATIONS

Hamielec, Archie E.; Macgregor, John F. and Penlidis, Alex; Copolymerization; Comprehensive Polymer Science and Supplements, vol. 3, Chapter 2, Copyright 1996; pp. 17-31.
Wild, L; Ryle, T.R.; Knobeloch, D.C. and Peat, I.R.; Determination of branching distributions in Polyethylene and Ethylene Copolymers; Journal of Polymer Science: Polymer Physics Edition, vol. 20, (1982) pp. 441-455.
Randall, James C.; A Review of High Resolution Liquid 13Carbon Nuclear Magnetic Resonance Characterizations of Ethylene-Based Polymers; JMS-Rev. Macromol. Chem. Phys., C29(2 & 3), (1989), pp. 201-317.

† cited by third party

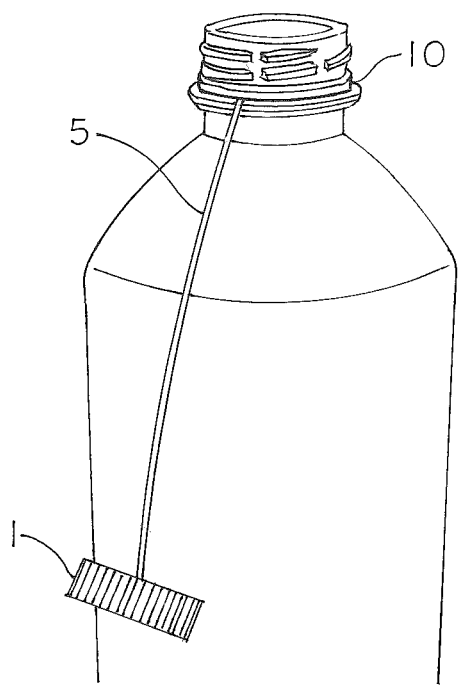

BOTTLE CLOSURE ASSEMBLY INCLUDING A POLYETHYLENE COMPOSITION

CROSS REFERENCE TO RELATED APPLICATIONS

This application claims the benefit of the filing date of U.S. Provisional Application No. 62/591,911, which was filed on Nov. 29, 2017. The contents of U.S. Provisional Application No. 62/591,911 are incorporated herein by reference in their entirety.

TECHNICAL FIELD

The present disclosure is directed to bottle closure assemblies which are made at least in part with a polyethylene composition having good processability, good organoleptic properties, and good dimensional stability. The bottle closure assembly includes a cap or closure portion, a tether portion, and a retaining means portion.

BACKGROUND

The manufacture of simple one-piece closures using high density polyethylene compositions is well known to persons skilled in the art.

Bottle closure systems and designs incorporating an integrated tethering means, which secures a cap portion to a bottle after the cap portion has been removed from a bottle opening are also well known. Such designs typically involve molding processes which present a more complicated and longer flow path for a chosen plastic material relative to simple one-piece closure designs. As such, it would be beneficial to make tethered closure systems using a thermoplastic material which shows good performance in molding applications, especially those which involve longer and more tortuous flow paths in a mold. It would also be advantageous to make a tethered closure system using a material that has sufficient stress crack resistance and flexibility, as the tethering portion would need to be both strong enough to prevent loss of the cap portion once it has been removed from a bottle opening, and flexible enough to allow the tethering portion to be formed or bent into suitable closure system designs.

SUMMARY

The present disclosure concerns bottle closure assemblies including a cap portion, a tether portion, and a retaining means portion, where the bottle closure assembly is made at least in part from a polyethylene composition having good processability, good organoleptic properties, good dimensional stability, and acceptable stress crack resistance.

Accordingly, an embodiment of the present disclosure provides a bottle closure assembly which includes a cap portion, a tether portion, and a retaining means portion, the bottle closure assembly being made at least in part from a polyethylene composition comprising: (1) 10 to 70 weight percent (wt. %) of a first ethylene copolymer having a melt index $I_2$, of 10 g/10 min or less; and a density of from 0.920 to 0.960 g/cm$^3$; and (2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

BRIEF DESCRIPTION OF THE DRAWINGS

FIG. 1C shows how an elongated tether portion connects at least one point on a cap portion to at least one point on a retaining collar portion once a cap portion has been removed from a bottle opening.

FIG. 2B also shows how an elongated tether portion connects at least one point on a cap portion to at least one point on a retaining collar portion once a cap portion has been removed from a bottle opening, thereby preventing its loss.

FIG. 3B also shows how an elongated tether portion connects at least one point on a cap portion to at least one point on a retaining collar portion once a cap portion has been removed from a bottle opening, thereby preventing its loss. FIG. 3C further shows that a bottle can be a carton, a container, or any other suitable containment vessel which has or is fitted with an aperture or opening which can be covered or sealed using a bottle closure assembly.

FIG. 4C shows an embodiment of a bottle closure assembly after a cap portion has been removed from a bottle opening.

FIG. 6B also shows how an elongated tether portion connects at least one point on a cap portion to at least one point on a retaining collar portion once a cap portion has been removed from a bottle opening.

FIG. 7B also shows how an elongated tether portion connects at least one point on a cap portion to at least one point on a retaining collar portion once a cap portion has been removed from a bottle opening.

In FIGS. 13A and 13B a tether proxy connects a cap portion to a tamper evident band.

In FIG. 14A a tether proxy connects a cap portion to the remaining section of the tamper evident band.

DETAILED DESCRIPTION OF THE DISCLOSURE

Figure 1A:
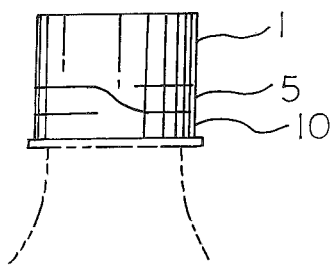
FIG. 1A shows an embodiment of a bottle closure assembly fitted to a bottle opening and in a "closed" or "sealed" position.

Any suitable bottle closure assembly design including a cap portion or a closure portion, a tether portion, and a retaining means portion is contemplated for use in the present disclosure, so long as it is made at least in part using a polyethylene composition as described herein. Some specific non-limiting examples of suitable bottle closure assemblies for use in the present disclosure are disclosed in U.S. Pat. Nos. 3,904,062; 4,474,302; 4,557,393; 4,564,114; 4,573,602; 4,583,652; 4,805,792; 5,725,115; 8,443,994; 8,720,716; 9,493,283; and 9,776,779; U.S. Application Publication Nos. 2004/0016715 and 2008/0197135; U.S. Design Pat. No. D593,856; and WO 2015/061834; all of which are incorporated herein by reference. For further reference, some bottle closure assembly designs which may be used in embodiments of the present disclosure are shown in FIGS. 1-7.

An embodiment of the disclosure is a bottle closure assembly including: a cap portion, a tether portion, and a retaining means portion, the cap portion being molded to reversibly engage and cover a bottle opening, the retaining means portion being molded to irreversibly engage a bottle neck or an upper portion of a bottle, and where the tether portion connects at least one point on the cap portion to at least one point on the retaining means portion, wherein the cap portion, optionally the tether portion, and optionally the retaining means portion are made from a polyethylene composition including: (1) 10 to 70 wt. % of a first ethylene copolymer having a melt index $I_2$, of 10 g/10 min or less; and a density of from 0.920 to 0.960 g/cm$^3$; and (2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including: a cap portion, an elongated tether portion, and a retaining means portion, the cap portion being molded to reversibly engage and cover a bottle opening, the retaining means portion being molded to irreversibly engage a bottle neck or an upper portion of a bottle, and the elongated tether portion being molded to connect at least one point on the cap portion to at least one point on the retaining means portion, wherein the cap portion, optionally the elongated tether portion, and optionally the retaining means portion are made from a polyethylene composition including: (1) 10 to 70 wt. % of a first ethylene copolymer having a melt index $I_2$, of 10 g/10 min or less; and a density of from 0.920 to 0.960 g/cm$^3$; and (2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including an integrally molded: cap portion, tether portion, and retaining means portion; the cap portion being molded to reversibly engage and cover a bottle opening, the retaining means portion being molded to irreversibly engage a bottle neck or an upper portion of a bottle, and the tether portion being molded to connect at least one point on the cap portion to at least one point on the retaining means portion; wherein the integrally molded: cap portion, tether portion and retaining means portion are made from a polyethylene composition including: (1) 10 to 70 wt. % of a first ethylene copolymer having a melt index $I_2$, of 10 g/10 min or less; and a density of from 0.920 to 0.960 g/cm$^3$; and (2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including an integrally molded: cap portion, elongated tether portion, and retaining means portion; the cap portion being molded to reversibly engage and cover a bottle opening, the retaining means portion being molded to irreversibly engage a bottle neck or an upper portion of a bottle, and the elongated tether portion being molded to connect at least one point on the cap portion to at least one point on the retaining means portion; wherein the integrally molded: cap portion, elongated tether portion, and retaining means portion are made from a polyethylene composition including: (1) 10 to 70 wt. % of a first ethylene copolymer having a melt index $I_2$, of 10 g/10 min or less; and a density of from 0.920 to 0.960 g/cm$^3$; and (2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including an integrally molded: cap portion, elongated tether portion, and retaining collar portion; the cap portion being molded to reversibly engage and cover a bottle opening, the retaining collar portion being molded to irreversibly engage a bottle neck or an upper portion of a bottle, and the elongated tether portion being molded to connect at least one point on the cap portion to at least one point on the retaining collar portion; wherein the integrally molded: cap portion, elongated tether portion, and retaining collar portion are made from a polyethylene composition including: (1) 10 to 70 wt. % of a first ethylene copolymer having a melt index $I_2$, of 10 g/10 min or less; and a density of from 0.920 to 0.960 g/cm$^3$; and (2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including: a cap portion, an elongated tether portion, and a retaining collar portion, the cap portion being molded to reversibly engage and cover a bottle opening, the retaining collar portion being molded to irreversibly engage a bottle neck or an upper portion of a bottle, the elongated tether portion including a tether strip which is frangibly connected along a portion of its upper edge to a descending annular edge of the cap portion and which is frangibly connected along a portion of its lower edge to an upper annular edge of the retaining collar portion, the tether strip being integrally formed with and connected at one end to at least one point on the cap portion and integrally formed with and connected at another end to at least one point on the retaining collar portion, the frangible sections being breakable when the cap portion is removed from a bottle opening, but where the cap portion remains connected to the retaining collar portion via the tether strip; wherein the cap portion, the elongated tether portion, and the retaining collar portion are integrally molded from a polyethylene composition including: (1) 10 to 70 wt. % of a first ethylene copolymer having a melt index $I_2$, of 10 g/10 min or less; and a density of from 0.920 to 0.960 g/cm$^3$; and (2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including: a cap portion, an elongated tether portion, and a retaining collar portion, the cap portion being molded to reversibly engage and cover a bottle opening, the elongated tether portion including a tether strip which is frangibly connected along a portion of its upper edge to a descending annular edge of the cap portion and which is frangibly connected along a portion of its lower edge to an upper annular edge of the retaining collar portion, the tether strip being integrally formed with and connected at one end to at least one point on the cap portion and integrally formed with and connected at another end to at least one point on the retaining collar portion, the frangible sections being breakable when the cap portion is removed from a bottle opening, but where the cap portion remains connected to the retaining collar portion via the tether strip; wherein the cap portion, the elongated tether portion, and the retaining collar portion are integrally molded from a polyethylene composition including: (1) 10 to 70 wt. % of a first ethylene copolymer having a melt index $I_2$, of 10 g/10 min or less; and a density of from 0.920 to 0.960 g/cm$^3$; and (2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including: a cap portion, a tether portion, and a retaining means portion, the cap portion being molded to reversibly engage and cover a bottle opening, the retaining means portion being molded to irreversibly engage a bottle neck or an upper portion of a bottle, and where the tether portion connects at least one point on the cap portion to at least one point on the retaining means portion, wherein the cap portion, optionally the tether portion, and optionally the retaining means portion are made from a polyethylene composition including: (1) 10 to 70 wt. % of a first ethylene copolymer having a melt index $I_2$, of from 0.1 to 10 g/10 min; a molecular weight distribution $M_w/M_n$, of less than 3.0; and a density of from 0.930 to 0.960 g/cm$^3$; and (2) 90 to 30 wt. % of a second ethylene copolymer having a melt index $I_2$, of from 50 to 10,000 g/10 min; a molecular weight distribution $M_w/M_n$, of less than 3.0; and a density higher than the density of the first ethylene copolymer, but less than 0.966 g/cm$^3$; wherein the density of the second ethylene copolymer is less than 0.037 g/cm³ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.0; and wherein the polyethylene composition has a molecular weight distribution $M_w/M_n$, of from 2 to 7; a density of at least 0.950 g/cm³; a high load melt index $I_{21}$, of from 150 to 400 g/10 min; a Z-average molecular weight $M_z$, of less than 300,000; a melt flow ratio $I_{21}/I_2$, of from 22 to 50; a stress exponent of less than 1.40; and an ESCR Condition B (100% IGEPAL® CO-630) of at least 3.5 hrs.

IGEPAL® CO-630 is a polyoxyethylene (9) nonylphenylether which has an average $M_n$ of 617 and the structure below and is available from SIGMA-ALDRICH®.

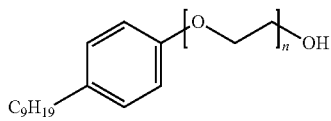

When integrally molded the bottle closure assembly presents long flow paths for a plastic material to fill during manufacturing. In the present disclosure, the term "integrally molded" means that that components referred to are molded in a single continuous mold.

Generally, the cap portion is molded to reversibly engage and cover a bottle opening or aperture from which a liquid or other type of foodstuffs can be dispensed and so is removable therefrom.

Generally, the retaining means portion, which may in an embodiment of the disclosure may be a retaining collar portion, is generally not to be removed, or is not easily removable from a bottle and in embodiments of the disclosure, the retaining collar engages a bottle neck, or an upper portion of a bottle.

Generally, the tether portion, which may in an embodiment of the disclosure be an elongated tether portion, connects at least one point of the cap portion to at least one point on the retaining means portion, so that when the cap portion is removed from a bottle opening, the cap portion remains flexibly fixed to the bottle via the tether portion and the retaining means portion.

In the present disclosure, the terms "bottle", "container", "jar", "carton", "pouch", "package" and the like may be used interchangeably. That is, a "bottle closure assembly" may also be considered a "container closure assembly", a "jar close assembly", a "carton closure assembly", a "pouch closure assembly", a "package closure assembly" and the like. A person skilled in the art will understand that a "bottle closure assembly" as described in the present disclosure can be used to close or seal a number of different types of structural containers having different designs and contours.

The terms "cap", "closure", "closure portion", "cap portion" and the like, are used in the present disclosure to connote any suitably shaped molded article for enclosing, sealing, closing, or covering etc., a suitably shaped opening, a suitably molded aperture, an open necked structure, or the like used in combination with a container, a bottle, a jar and the like.

In an embodiment of the disclosure, the retaining means portion can reversibly or irreversible engage a bottle neck, a shoulder section of a bottle, or an upper portion of a bottle, or a fitment (e.g., a fitment on a pouch or a carton).

In an embodiment of the disclosure, the retaining means portion can also serve as a tamper evident band (TEB).

In the present disclosure, the term "bottle neck" should be construed to mean a bottle neck per se but also any sort of similar or functionally equivalent structure such as a spout, a spigot, a fitment, or the like.

In an embodiment of the disclosure, the retaining means portion is molded or shaped to reversibly or irreversible engage a bottle neck, a shoulder section of a bottle, or an upper portion of a bottle.

In an embodiment of the disclosure, the retaining means portion is a retaining collar portion which reversibly or irreversibly engages a bottle neck, a shoulder section of a bottle, or an upper portion of a bottle.

In an embodiment of the disclosure, the retaining collar portion is circularly or annularly shaped so as to reversibly or irreversibly engage a bottle neck, a shoulder section of a bottle, or an upper portion of a bottle.

In an embodiment of the disclosure, the bottle closure assembly includes a cap portion, a tether portion, and a retaining means portion where the cap portion, the tether portion, and the retaining means portion are all integrally molded in one piece.

In an embodiment of the disclosure, the bottle closure assembly includes a cap portion, a tether portion, and a retaining collar portion where the cap portion, the tether portion, and the retaining collar portion are all integrally molded in one piece.

In an embodiment of the disclosure, the bottle closure assembly includes a cap portion, an elongated tether portion, and a retaining means portion where the cap portion, the elongated tether portion, and the retaining means portion are all integrally molded in one piece.

In an embodiment of the disclosure, the bottle closure assembly includes a cap portion, an elongated tether portion, and a retaining collar portion where the cap portion, the elongated tether portion, and the retaining collar portion are all integrally molded in one piece.

In an embodiment of the disclosure, the bottle closure assembly includes a cap portion, a tether portion, and a retaining means portion where the cap portion, the tether portion, and the retaining means portion are separately molded.

In an embodiment of the disclosure, the bottle closure assembly includes a cap portion, a tether portion, and a retaining collar portion where the cap portion, the tether portion, and the retaining collar portion are separately molded.

In an embodiment of the disclosure, the bottle closure assembly includes a cap portion, an elongated tether portion, and a retaining means portion where the cap portion, the elongated tether portion, and the retaining means portion are separately molded.

In an embodiment of the disclosure, the bottle closure assembly includes a cap portion, an elongated tether portion, and a retaining collar portion where the cap portion, the elongated tether portion, and the retaining collar portion are separately molded.

In embodiments of the disclosure, when separately molded the cap portion, the tether portion, and the retaining means portion may be fixed together using any means known in the art. For example, the cap portion, the tether portion, and the retaining means portion may be glued together, or welded together using applied heat, sonication or other methods known in the art for fusing plastic materials together.

In an embodiment of the disclosure, the bottle closure assembly includes a cap portion, a tether portion, and a retaining means portion where the cap portion, the tether portion, and the retaining means portion are made from the same or different materials.

In an embodiment of the disclosure, the bottle closure assembly includes a cap portion, a tether portion, and a retaining collar portion where the cap portion, the tether portion, and the retaining collar portion are made from the same or different materials.

In an embodiment of the disclosure, the bottle closure assembly includes a cap portion, an elongated tether portion, and a retaining means portion where the cap portion, the elongated tether portion, and the retaining means portion are made from the same or different materials.

In an embodiment of the disclosure, the bottle closure assembly includes a cap portion, an elongated tether portion, and a retaining collar portion where the cap portion, the elongated tether portion, and the retaining collar portion are made from the same or different materials.

In an embodiment of the present disclosure, the "tether portion" is of sufficient length and/or has a design which allows removal of a "cap portion" from a bottle opening while at the same time preventing the loss of the cap portion by maintaining a connection between the cap portion and a bottle, container, or the like by forming a connection between at least one point on the cap portion and at least one point on a "retaining means portion".

In an embodiment of the present disclosure, the tether portion may be an "elongated tether portion", where "elongated" means that the tether portion will have at least one dimension (length) which is larger than at least one other dimension (width or height/thickness) or vice versa. Or considered another way, "elongated" means that the tether has a length which is greater than its width and/or height/thickness.

In an embodiment of the present disclosure, the tether portion will have dimensions (e.g., width and/or height/thickness) which offer sufficient strength to prevent facile cleavage or breakage of the tether when placed under stress or duress, such as for example when the tether is subjected to bending or flexional forces. For example, in an embodiment of the disclosure, the tether will have sufficient width and/or height/thickness so as to prevent facile breakage of the tether when masticated.

In an embodiment of the present disclosure, the "elongated tether portion" is of sufficient length and/or has a design which allows removal of a "cap portion" from a bottle opening while at the same time preventing the loss of the cap portion by maintaining a connection between the cap portion and a bottle, container or the like by forming a connection between at least one point on the cap portion and at least one point on a "retaining means portion".

In embodiments of the disclosure, the retaining means portion may be a "retaining collar portion" which engages some portion of a bottle neck or an upper portion of a bottle, container, or the like.

In embodiments of the disclosure, the retaining means portion may be a "retaining collar portion" which irreversibly engages some portion of a bottle neck, a spout, a spigot, a fitment on a pouch, or the like.

Alternatively, the retaining means portion may be a "retaining collar portion" which engages a bottle neck, or an upper portion of a bottle, container or the like.

In an embodiment of the disclosure, the retaining collar portion may rotatably engage a bottle neck, or upper portion of a bottle, container, or the like.

In an embodiment of the disclosure, the retaining means portion is a retaining collar portion which is molded to irreversibly engage a bottle neck or an upper portion of a bottle, container, or the like.

In an embodiment of the disclosure, the retaining collar portion is annularly shaped or circularly shaped and can fit over and engage a bottle neck or an upper portion of a bottle, container, or the like.

The cap portion may be a single contiguous piece, or it may itself comprise one or more cap portion structures.

The tether portion in the present disclosure need not serve as a hinged connection between a cap portion or a closure portion and a retaining means portion (such as for example a retaining collar portion), and the tether portion need not comprise a hinged portion or area, but the tether portion may in some embodiments of the disclosure comprise a hinge and when present the hinge may be a so called "living hinge".

In an embodiment of the disclosure, the elongated tether portion has a length which is sufficient to allow the cap portion of the bottle closure assembly to swing or hang out of the way of a bottle opening, aperture, or the like so as not to interfere with the dispensation of the bottle contents, while at the same time tethering the cap portion to a bottle via the retaining means portion.

The cap portion may itself be a screw cap which threadingly engages a threaded system on a bottle neck, spigot, spout, valve, fitment on a pouch, or the like. The cap portion may alternatively be a snap cap which reversibly engages a bottle neck, spigot, spout, or the like. The cap portion may also reversibly engage a retaining collar portion in a snap fitting or in a complementary arrangement of threaded structures. The cap portion may comprise a first cap portion and a second cap portion, where the first cap portion engages the second cap portion in a snap fitting, and the second cap portion engages a bottle neck, or upper portion of a bottle in a reversible or irreversible manner. For example, a second cap portion may have a threaded structure which threadingly engages a threaded system on a bottle neck. Alternatively, the second cap portion may itself engage a bottle neck by any suitable type of snap fitting. The cap portion may also comprise more than two cap portions.

In an embodiment of the disclosure, the bottle closure assembly includes a cap portion adapted to close an opening in a bottle or the like by making a frictional engagement with the opening.

In an embodiment of the disclosure, the cap portion has internal threads which mate with external threads surrounding an opening in a bottle, such as on a bottle neck, spigot, or spout for example.

In an embodiment of the disclosure, the retaining collar portion is adapted to cooperate with a shoulder or a flange on the neck of a bottle or an upper portion of a bottle which is to be sealed by the cap portion.

In an embodiment of the disclosure, the retaining collar portion is annularly or cylindrically shaped and fits onto the neck of a bottle and is coupled to the same, using any suitable coupling means, such as a snap fitting, or a threaded engagement. In an embodiment, the retaining collar portion is molded to snap fit onto a bottle neck, bottle aperture, spigot, spout, or the like. In an embodiment, the retaining collar portion may be threaded onto a bottle neck, bottle aperture, spigot, spout, or the like. In an embodiment the retaining collar portion may itself have an internal threading system which mates with external threads on a bottle neck, bottle aperture, spigot, spout or the like. In an embodiment, the retaining collar portion is dimensioned to be engaged beneath a flange or shoulder molded into a bottle neck or an upper portion of a bottle. For example, the retaining collar portion may have an annular radial dimension which prevents it from moving past an annular shoulder integrally molded into a bottle neck or into an upper portion of a bottle. In this case the annular outwardly extending shoulder on a bottle neck or on an upper portion of a bottle acts as a camming surface which prevents movement of the retaining collar toward a bottle opening. Such a shoulder on a bottle could for example have a tapered outer annular edge which allows the retaining collar portion to be slipped onto the bottle in an irreversible manner. In an embodiment of the disclosure, there may be outwardly extending annularly spaced bosses or the like on a bottle neck or an upper portion of a bottle, against which the retaining collar abuts to hold it on to a bottle neck, bottle aperture, spigot, spout, or the like. Persons skilled in the art will appreciate that other means could be used to secure the retaining collar portion to a bottle neck, the upper portion of a bottle, a spout, and the like.

In an embodiment of the disclosure, the elongated tether portion includes a connecting strip having a first end connected to a least one point of the cap portion and a second end connected to at least one point of the retaining collar portion, a lower edge, and an upper edge, wherein when the cap portion is fitted on to a bottle opening, the connecting strip at least partially encircles a bottle neck, spout, or the like between the cap portion and the retaining collar portion, and where at least a portion of the upper edge of the connecting strip is frangibly connected to a lower edge of the cap portion, and where at least a portion of the lower edge of the connecting strip is frangibly connected to an upper edge of the retaining collar portion, and where when the cap portion is removed from a bottle opening by breaking the frangible connections between the cap portion, the connecting strip, and the retaining collar portion, the cap portion remains secured to retaining collar portion and the bottle via the connecting strip.

In an embodiment, the elongated tether portion is a cylindrically adapted connecting strip which at least partially encircles a bottle neck, spout, or the like and is located between the cap portion and the retaining collar portion prior to removal of the cap portion form a bottle opening.

In an embodiment, the elongated tether portion has a first end which is connected to at least one point on the cap portion and a second end which is connected to at least one point on the retaining collar portion.

In an embodiment, the cap portion, the elongated tether portion, and the retaining collar portion are integrally molded so that the elongated tether portion has a first end which is connected to at least one point on the cap portion and a second end which is connected to at least one point on the retaining collar.

In an embodiment, the cap portion, the elongated tether portion, and the retaining collar portion are integrally molded so that the elongated tether portion has a first end which is connected to at least one point on the cap portion and a second end which is connected to at least one point on the retaining collar portion, and wherein the elongated tether portion has an upper edge and a lower edge, where at least a portion of the upper edge is frangibly connected to a lower edge of the cap portion, and at least a portion of the lower edge is frangibly connected to an upper edge of the retaining collar portion, the frangibly connected portions being breakable when the closure is removed from a bottle opening.

In an embodiment of the disclosure, the frangible connections or frangibly connected portions are regularly or irregularly spaced molded sections (e.g., pins) having a dimension suitably small to allow facile breakage.

Frangible connections or frangibly connected portions can also be thought of as defining a weakening line along which the elongated tethering portion can be separated from the cap portion and the retaining collar portion. Such weakening lines can be generally defined as open sections alternating with bridging sections, where the bridging sections have a dimension suitably small to allow facile breakage. Alternatively, the weakening lines are defined by lines of plastic which have been made thin enough to break under stress.

In an embodiment of the disclosure, a single piece of a molded plastic having a suitable shape, is purposely weakened (by for example, regular or irregularly spaced cuts) along predetermined lines to define a cap portion, an elongated tether portion, and a retaining collar portion, wherein the cap portion is shaped to reversibly engage and cover a bottle opening, the retaining means portion is shaped to irreversibly engage a bottle neck or an upper portion of a bottle, and where the elongated tether portion connects at least one point on the cap portion to at least one point on the retaining means portion.

In an embodiment of the disclosure, the bottle closure assembly includes an upper cap portion, an intermediate elongate tethering portion, and a lower retaining collar portion, where the intermediate elongate tethering portion has a first end permanently connected to at least one point of the upper cap portion and a second end permanently connected to at least one point on the lower retaining collar portion, wherein the intermediate elongate tethering portion is partially joined to a lower annular edge of the upper cap portion along a first peripheral weakening line and the intermediate elongate tethering portion is partially joined to an upper annular edge of the lower retaining collar portion along a second peripheral weakening line, wherein removal of the upper cap portion from a bottle separates the upper cap portion from the intermediate elongate tethering portion along the first peripheral weakening line and separates the lower retaining collar portion from the intermediate elongate tethering portion along the second weakening line, while maintaining a linkage between the upper cap portion and the lower retaining collar portion through the intermediate elongate tethering portion.

Figure 1B:
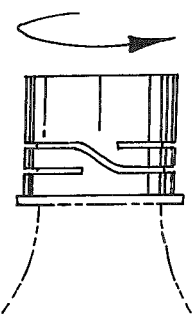
FIG. 1B shows an embodiment of a bottle closure assembly as a cap portion is rotated in order to bring about its removal from a bottle opening.
Figure 1C:
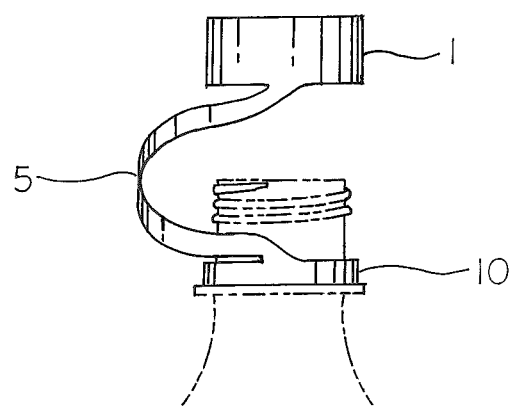
FIG. 1C shows an embodiment of a bottle closure assembly after a cap portion has been removed from a bottle opening.

In an embodiment of the disclosure, and with reference to FIGS. 1A-1C, the bottle closure assembly includes: an upper cap portion, 1 dimensioned to reversibly cover and close a bottle opening, a lower retaining collar portion, 10 dimensioned to irreversibly engage a bottle neck, or an upper portion of a bottle, and an elongated tether portion, 5 being dimensioned as a strip which at least partially encircles a bottle neck between the upper cap portion and the lower retaining collar portion, the strip including a first end, a second end, an upper edge, and a lower edge, the upper edge of which is in part contiguous with the upper cap portion, the lower edge of which is in part contiguous with the lower retaining collar portion, whereby removal of the upper cap portion from a bottle (by for example rotation about a threaded system on the bottle neck) separates the elongated tether portion from the upper cap portion and the lower retaining collar portion, while at the same leaving the upper cap portion attached to the lower retaining collar via the elongated tether portion.

Figure 2A:
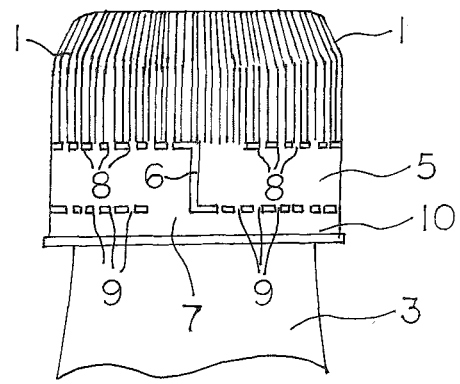
FIG. 2A shows an embodiment of a bottle closure assembly fitted over a bottle opening and before a cap portion has been removed from a bottle.
Figure 2B:
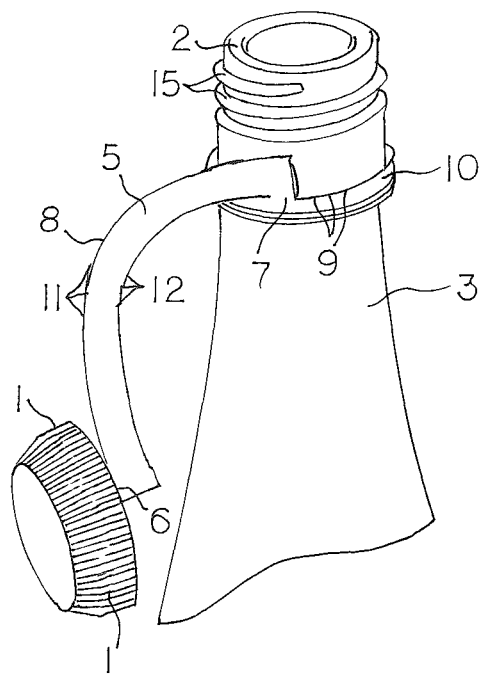
FIG. 2B shows an embodiment of a bottle closure assembly after a cap portion has been removed from a bottle opening.

In an embodiment of the disclosure, and with reference to FIGS. 2A and 2B, the bottle closure assembly includes: an upper cap portion, 1 dimensioned to reversibly cover and close a bottle opening, 2 a lower retaining collar portion, 10 dimensioned to irreversibly engage a bottle neck, 3 or an upper portion of a bottle, and an elongated tether portion, 5 being dimensioned as a strip which at least partially encircles a bottle neck between the upper cap portion and the lower retaining collar portion, the strip including a first end, 6 a second end, 7 an upper edge, 11 and a lower edge, 12, the upper edge of which is in part frangibly attached, 8 to the upper cap portion, and in part contiguous with the upper cap portion, the lower edge of which is in part frangibly attached, 9 to the lower retaining collar portion and in part contiguous with the lower retaining collar portion, whereby removal of the upper cap portion from a bottle will rupture the frangible attachments while leaving the upper cap portion attached to the lower retaining collar portion via the elongated tether portion. In an embodiment and with reference to FIG. 2B, the bottle opening may have peripheral threads, 15 which engage threads on the inside of the cap portion.

Figure 3A:
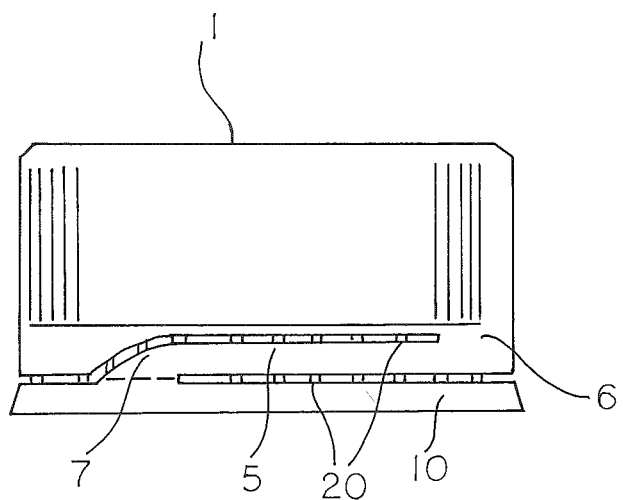
FIG. 3A shows an embodiment of a bottle closure assembly.
Figure 3B:
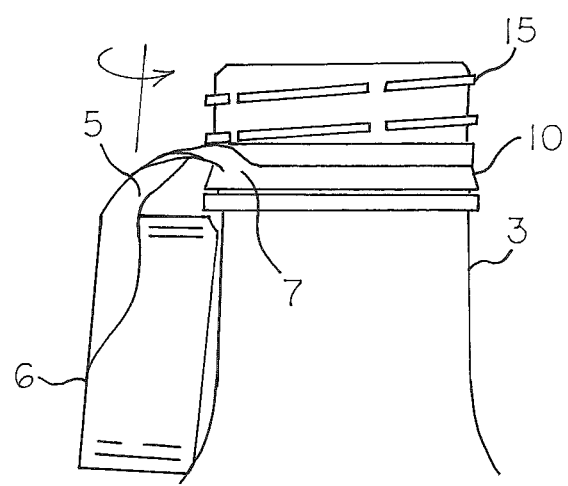
FIG. 3B shows an embodiment of a bottle closure assembly after a cap portion has been removed from a bottle opening.
Figure 3C:
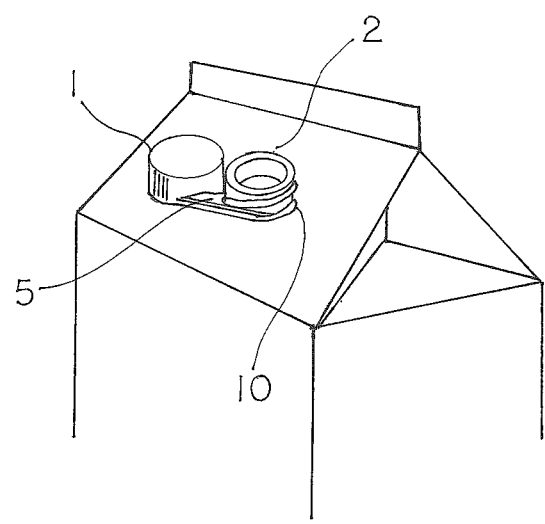
FIG. 3C shows how an elongated tether portion connects at least one point on a cap portion to at least one point on a retaining collar portion once a cap portion has been removed from a bottle opening.

In an embodiment of the disclosure, and with reference to FIGS. 3A-3C, the bottle closure assembly includes: an opening, 2, an upper cap portion, 1 dimensioned to reversibly cover and close a bottle opening, a lower retaining collar portion, 10 dimensioned to irreversibly engage a bottle neck, 3 or an upper portion of a bottle, and an elongated tether portion, 5 being dimensioned as a strip which at least partially encircles a bottle neck between the upper cap portion and the lower retaining collar portion, the strip having a first end, 6 a second end, 7 an upper edge, and a lower edge, the upper edge of which is in part frangibly attached to the upper cap portion by frangible elements, 20 (such as for example breakable pins), and in part contiguous with the upper cap portion, the lower edge of which is in part frangibly attached to the lower retaining collar portion by frangible elements, 20 (such as for example breakable pins) and in part contiguous with the lower retaining collar portion, whereby removal of the upper cap portion from a bottle opening will rupture the frangible attachments while leaving the upper cap portion attached to the lower retaining collar portion via the elongated tether portion, 5. In an embodiment and with reference to FIG. 3B, the bottle neck and opening may have peripheral threads, 15 which engage threads on the inside of the cap portion.

Figure 4A:
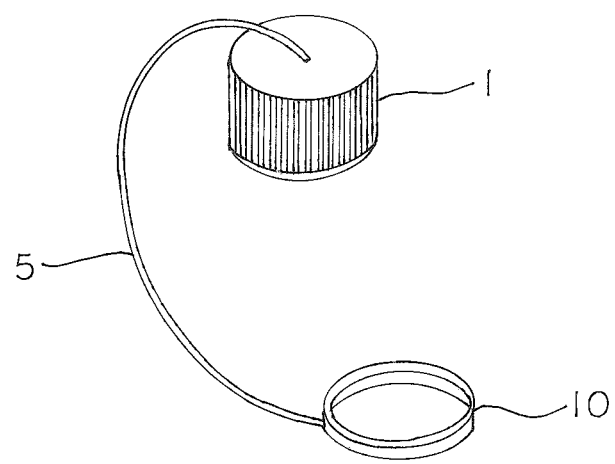
FIG. 4A shows an embodiment of a bottle closure assembly in the absence of a bottle. The bottle closure assembly has a cap portion, an elongated tether portion, and a retaining collar portion.
Figure 4B:
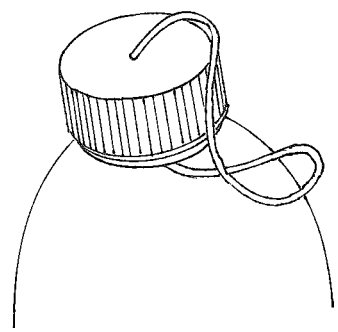
FIG. 4B shows an embodiment of a bottle closure assembly fitted over a bottle opening and before a cap portion has been removed from a bottle opening.

In an embodiment of the disclosure, and with reference to FIGS. 4A-4C, the bottle closure assembly includes a cap portion, 1, an elongated tether portion, 5, and a retaining collar portion, 10.

Figure 5A:
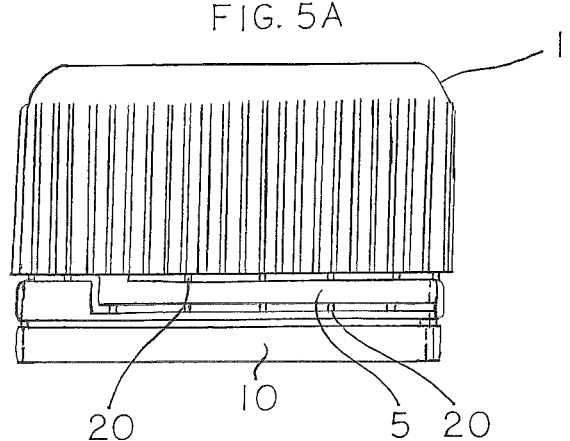
FIG. 5A shows an embodiment of a bottle closure assembly in the absence of a bottle.
Figure 5B:
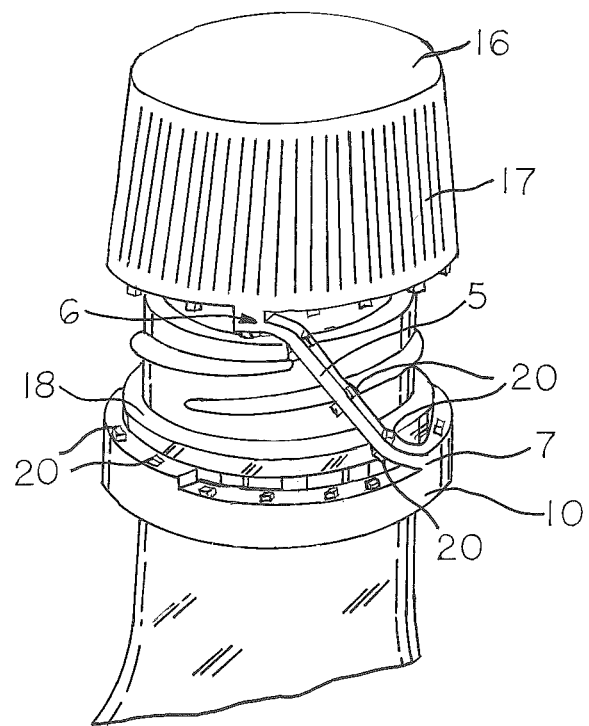
FIG. 5B shows an embodiment of a bottle closure assembly as a cap portion is rotated in order to bring about its removal from a bottle opening.

In an embodiment of the disclosure, and with reference to FIGS. 5A and 5B, the bottle closure assembly includes: a cap portion, 1 an elongated tether portion, 5 and a retaining means portion, 10 the cap portion being molded to reversibly engage and cover a bottle opening, the retaining means portion being molded to irreversibly engage a bottle neck or an upper portion of a bottle, 18 and the elongated tether portion being molded to connect at least one point on the cap portion to at least one point on the retaining means portion, the cap portion and the retaining collar portion extending coaxially with each other, the elongated tethering portion including a tabbed tether strip which is integrally formed with and secured at its respective ends (6 and 7) to the cap portion and the retaining collar portion, the tether strip being joined to the cap portion and the retaining collar along a preselected length of the tether strip to be manually separated from the cap portion and the retaining collar portion by frangible elements, 20 of a preselected thickness to permit the tether strip to be manually separated from the cap portion and the retaining collar portion along the pre-selected length, the tether strip being of such length so as to permit the cap portion to be removed from a bottle opening while at the same remaining attached to the bottle via the tethering strip and the retaining collar. In an embodiment and as shown in FIG. 5B, a cap portion may have a circular top wall, 16 and a descending annular side wall 17.

In an embodiment of the disclosure, the bottle closure assembly includes: a cap portion having a top wall and a side wall, an elongated tether portion, and a retaining collar portion, the cap portion being molded to reversibly engage and cover a bottle opening, the retaining collar portion being annular and being molded to irreversibly engage a ridge or flange on a bottle neck or on an upper portion of a bottle, and the elongated tether portion being integrally molded with the cap portion and the retaining collar portion to connect at least one point on the cap side wall to at least one point on the retaining collar portion, wherein the elongated tether portion runs between the cap side wall and the retaining collar portion along the circumference of the cap portion when the cap portion is on a bottle and the elongated tether portion connects at least one point on the cap side wall to at least one point on the retaining collar portion when the cap portion is removed from a bottle.

Figure 6A:
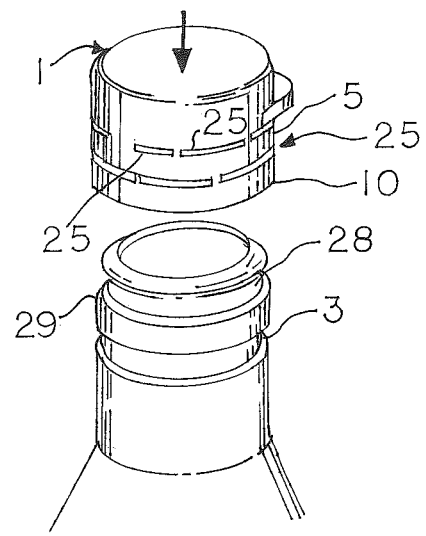
FIG. 6A shows an embodiment of a bottle closure assembly which fits over a bottle opening.
Figure 6B:
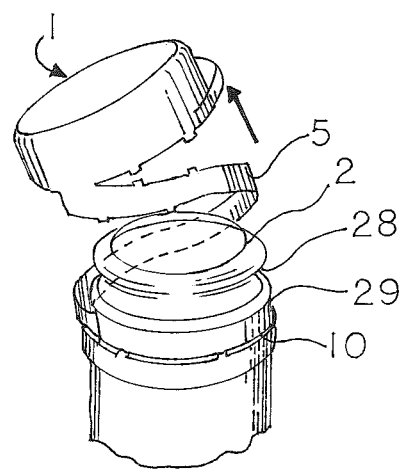
FIG. 6B show an embodiment of a bottle closure assembly after a cap portion has been removed from a bottle opening.

In an embodiment of the disclosure, and with reference to FIGS. 6A and 6B, the bottle closure assembly includes an opening, 2, an upper cap portion, 1 an intermediate elongate tethering portion, 5 and a lower retaining collar portion, 10 where the intermediate elongate tethering portion has a first end permanently connected to at least one point of the upper cap portion and a second end permanently connected to at least one point on the lower retaining collar portion, wherein the intermediate elongate tethering portion is partially joined to a lower annular edge of the upper cap portion along a first peripheral weakening line defined by perforations, 25 and the intermediate elongate tethering portion is partially joined to an upper annular edge of the lower retaining collar portion along a second peripheral weakening line defined by perforations, 25 wherein removal of the upper cap portion from a bottle separates the upper cap portion from the tethering portion along the first peripheral weakening line and separates the lower retaining collar portion from the tethering portion along the second weakening line, while maintaining a linkage between the upper cap portion and the lower retaining collar portion through the intermediate elongated tethering portion.

In an embodiment of the disclosure, and with reference to FIGS. 6A and 6B, a bottle neck 3, may have an annular groove 28, which presents a flange onto which the cap portion, 1 may reversibly engage in a snap fit arrangement. In an embodiment and with reference to FIGS. 6A and 6B a bottle neck may have an outwardly extended annular flange, 29 which prevents a retaining collar portion, 10 from being removed from a bottle neck.

Figure 7A:
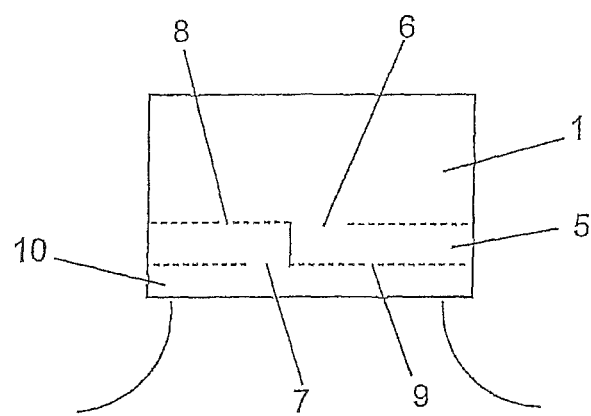
FIG. 7A shows an embodiment of a bottle closure assembly fitted to a bottle opening and in a "closed" or "sealed" position.
Figure 7B:
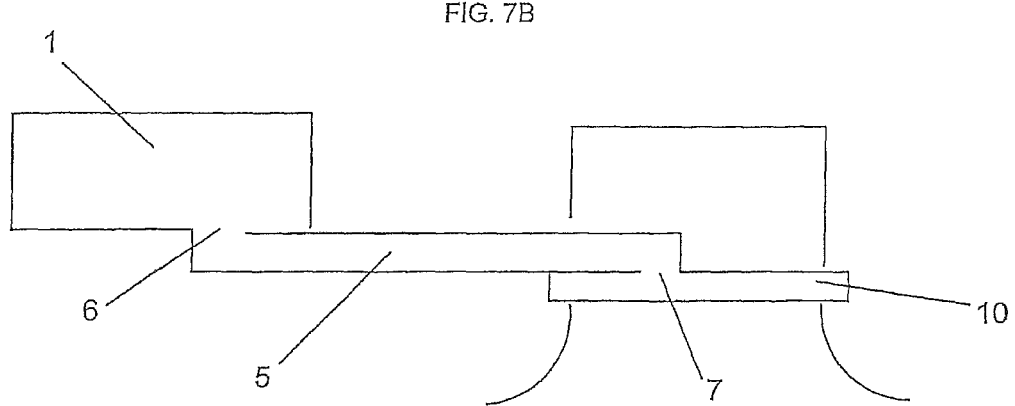
FIG. 7B shows an embodiment of a bottle closure assembly after a cap portion has been removed from a bottle opening.

In an embodiment of the disclosure, and with reference to FIGS. 7A and 7B, the bottle closure assembly includes a cap portion, 1, an elongated tether portion, 5, and a retaining collar portion, 10. The elongated tether portion connects at least one point of the cap portion at a first end, 6 to at least one point of the retaining collar portion at a second end, 7. The elongated tether portion may be further joined to the cap portion along a frangible connection 8. The elongated tether portion may be further joined to the retaining collar portion along a frangible connection 9. Separation of the cap portion from the elongated tether portion along a frangible connection 8 along with separation of the retaining collar portion from the elongated tether portion along a frangible connection 9, allows removal of the cap portion from a bottle opening while at the same time securing it to the bottle via the elongated tether portion and the retaining collar portion.

In an embodiment of the disclosure, the bottle closure assembly includes: a cap portion, the cap portion being dimensioned to cover and close a bottle opening, a retaining collar portion, and an elongated tether portion which forms an elastic connection between at least one point on the cap portion and at least one point on the retaining collar portion.

In an embodiment of the disclosure, the retaining means portion is integrally molded into a bottle, container, or the like.

In an embodiment of the disclosure, the retaining collar portion is integrally molded into a bottle, container, or the like.

In an embodiment of the disclosure, the tether portion fixes the cap portion to the retaining collar portion which remains secured to the bottle, making it difficult to separate the cap portion from the bottle, thereby preventing its loss, while at the same time allowing rotation of the cap portion for facile removal and replacement of the same from and onto a bottle opening.

In the present disclosure, the bottle closure assembly is made in part or in full using a polyethylene composition including: 1) 10 to 70 wt. % of a first ethylene copolymer having a melt index $I_2$, of 10 g/10 min or less; and a density of from 0.920 to 0.960 g/cm$^3$; and 2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

In an embodiment of the disclosure, the cap portion, optionally the tether portion, and optionally the retaining collar portion are made from a polyethylene composition including: 1) 10 to 70 wt. % of a first ethylene copolymer having a melt index $I_2$, of 10 g/10 min or less; and a density of from 0.920 to 0.960 g/cm$^3$; and 2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

In an embodiment of the disclosure, the cap portion, the tether portion, and the retaining collar portion are all integrally molded from a polyethylene composition including: 1) 10 to 70 wt. % of a first ethylene copolymer having a melt index $I_2$, of 10 g/10 min or less; and a density of from 0.920 to 0.960 g/cm$^3$; and 2) 90 to 30 wt. % of a second ethylene copolymer having a melt index $I_2$, of at least 50 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

Further polyethylene compositions suitable for use in the manufacture of part or all of the bottle closure assembly discussed above are disclosed in for example U.S. Pat. Nos. 8,022,143; 8,962,755; 9,074,082; 9,371,442; 9,505,893; 9,475,927; 9,637,628; 9,758,653; 9,783,663; and 9,783,664 all of which are incorporated, in their entirety, herein.

Suitable polyethylene compositions for use in the manufacture of part or all of the bottle closure assembly are described in more detail below.

The polyethylene compositions are composed of at least two ethylene copolymer components: a first ethylene copolymer and a second ethylene copolymer.

By the term "ethylene copolymer", it is meant that the copolymer includes both ethylene and at least one alpha-olefin comonomer.

The terms "homogeneous" or "homogeneously branched polymer" as used herein define homogeneously branched polyethylene which has a relatively narrow composition distribution, as indicated by a relatively high composition distribution breadth index (CDBI$_{50}$). That is, the comonomer is randomly distributed within a given polymer chain and a substantial portion of the polymer chains have same ethylene/comonomer ratio. It is well known that metallocene catalysts and other so called "single site catalysts" incorporate comonomer more evenly than traditional Ziegler-Natta catalysts when used for catalytic ethylene copolymerization with alpha olefins. This fact is often demonstrated by measuring the composition distribution breadth index (CDBI$_{50}$) for corresponding ethylene copolymers. The composition distribution of a polymer can be characterized by the short chain distribution index (SCDI) or composition distribution breadth index (CDBI$_{50}$). The definition of composition distribution breadth index (CDBI$_{50}$) can be found in PCT Application Publication No. WO 93/03093 and U.S. Pat. No. 5,206,075. The CDBI$_{50}$ is conveniently determined using techniques which isolate polymer fractions based on their solubility (and hence their comonomer content). For example, temperature rising elution fractionation (TREF) as described by Wild et al. J. Poly. Sci., Poly. Phys. Ed. Vol. 20, p 441, 1982 or in U.S. Pat. No. 4,798,081 can be employed. From the weight fraction versus composition distribution curve, the CDBI$_{50}$ is determined by establishing the weight percentage of a copolymer sample that has a comonomer content within 50% of the median comonomer content on each side of the median. Generally, Ziegler-Natta catalysts produce ethylene copolymers with a CDBI$_{50}$ of less than about 50 weight %, or less than about 55 weight %, consistent with a heterogeneously branched copolymer. In contrast, metallocenes and other single site catalysts will most often produce ethylene copolymers having a CDBI$_{50}$ of greater than about 55 weight %, or greater than about 60 weight %, consistent with a homogeneously branched copolymer.

In one embodiment of the disclosure, the polyethylene composition will comprise at least a first ethylene copolymer and at least a second ethylene copolymer which is different from the first ethylene polymer.

The First Ethylene Copolymer

In an embodiment of the disclosure, the first ethylene copolymer of the polyethylene composition has a density of from about 0.930 g/cm$^3$ to about 0.960 g/cm$^3$; a melt index, $I_2$, of more than 0.1 g/10 min; a molecular weight distribution, $M_w/M_n$, of below about 3.0 and a weight average molecular weight $M_w$, that is greater than the $M_w$ of the second ethylene copolymer. In one embodiment, the weight average molecular weight $M_w$, of the first ethylene copolymer is at least 50,000 g/mol.

By the term "ethylene copolymer" it is meant that the copolymer includes both polymerized ethylene and at least one polymerized alpha-olefin comonomer, with polymerized ethylene being the majority species.

In an embodiment of the disclosure, the first ethylene copolymer is made with a single site catalyst, such as, for example, a phosphinimine catalyst.

The comonomer (i.e., alpha-olefin) content in the first ethylene copolymer can be from about 0.05 to about 3.0 mole percent (mol %) as measured by $^{13}$C NMR, or FTIR or GPC-FTIR methods, or as calculated from a reactor model (see the Examples section). The comonomer is one or more suitable alpha olefin, which include, but are not limited to, 1-butene, 1-hexene, 1-octene, and the like. In one embodiment the alpha-olefin is 1-octene.

The short chain branching in the first ethylene copolymer can be from about 0.25 to about 15 short chain branches per thousand carbon atoms (SCB1/1000Cs). In further embodiments of the disclosure, the short chain branching in the first ethylene copolymer can be from 0.25 to 10, or from 0.25 to 7.5, or from 0.25 to 5, or from 0.25 to 3 branches per thousand carbon atoms (SCB1/1000Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The comonomer is one or more suitable alpha-olefin, which include, but are not limited to, 1-butene, 1-hexene, 1-octene, and the like. In one embodiment, the alpha olefin is 1-octene.

In an embodiment of the disclosure, the comonomer content in the first ethylene copolymer is greater than comonomer content of the second ethylene copolymer (as reported, for example, in mol %).

In an embodiment of the disclosure, the amount of short chain branching in the first ethylene copolymer is greater than the amount of short chain branching in the second ethylene copolymer (as reported in short chain branches, SCB per thousand carbons in the polymer backbone, 1000 Cs).

In some embodiments of the disclosure, the melt index, $I_2$, of the first ethylene copolymer can be 10 g/10 min or less.

In some embodiments of the disclosure, the melt index, $I_2$, of the first ethylene copolymer can be from 0.1 to 10 g/10 min and including narrower ranges within this range and any numbers encompassed by these ranges. For example, the melt index $I_2$ of the first ethylene composition can be from above 0.1 to below 10 g/10 min, or can be from 0.1 to 7.5 g/10 min, or from 0.1 to 5.0 g/10 min, or from 0.1 to 3.0 g/10 min, or from 0.1 to 2.5 g/10 min, or from 0.1 to 1.0 g/10 min.

In an embodiment of the disclosure, the first ethylene copolymer has a weight average molecular weight $M_w$ of from about 50,000 to about 225,000 g/mol including narrower ranges and any numbers encompassed by these ranges. For example, in another embodiment of the disclosure, the first ethylene copolymer has a weight average molecular weight $M_w$ of from about 75,000 to about 200,000. In further embodiments of the disclosure, the first ethylene copolymer has a weight average molecular weight $M_w$ of from about 75,000 to about 175,000, or from about 85,000 to about 150,000, or from about 100,000 to about 150,000.

In some embodiments, the density of the first ethylene copolymer disclosed herein is from 0.920 to 0.960 g/cm³ or can be a narrower range within this range and any numbers encompassed by these ranges.

In some embodiments, the density of the first ethylene copolymer disclosed herein is from 0.930 to 0.960 g/cm³ or can be a narrower range within this range and any numbers encompassed by these ranges. For example, in further embodiments of the disclosure, the density of the first ethylene copolymer can be from 0.936 to 0.960 g/cm³, or can be from 0.938 to 0.960 g/cm³, or from 0.936 to 0.952 g/cm³, or from 0.938 to 0.952 g/cm³, or from 0.936 to 0.950 g/cm³, or from 0.938 to 0.950 g/cm³, or from 0.936 to 0.947 g/cm³, or from 0.938 to 0.947 g/cm³, or from 0.936 to 0.945 g/cm³, or from 0.938 to 0.945 g/cm³.

In embodiments of the disclosure, the first ethylene copolymer has a molecular weight distribution $M_w/M_n$ of <3.0, or ≤2.7, or <2.7, or ≤2.5, or <2.5, or ≤2.3, or from 1.8 to 2.3.

In an embodiment of the disclosure, the first ethylene copolymer of the polyethylene composition is produced with a single site catalyst and has a weight average molecular weight $M_w$, of at least 50,000 g/mol; a molecular weight distribution, $M_w/M_n$, of less than 3.0 and a density of from 0.936 to 0.950 g/cm³.

In an embodiment of the disclosure, a single site catalyst which gives an ethylene copolymer having a CDBI(50) of at least 65% by weight, or at least 70%, or at least 75%, or at least 80%, or at least 85%, during solution phase polymerization in a single reactor, is used in the preparation of the first ethylene copolymer.

In an embodiment of the present disclosure, the first ethylene copolymer is an ethylene copolymer which has a CDBI(50) of greater than about 60% by weight, or greater than about 65%, or greater than about 70%, or greater than about 75%, or greater than about 80%, or greater than about 85%.

In an embodiment of the disclosure, the first ethylene copolymer can comprise from about 10 to about 90 weight percent (wt. %) of the total weight of the first and second ethylene copolymers. In an embodiment of the disclosure, the first ethylene copolymer can comprise from about 10 to about 80 weight percent (wt. %) of the total weight of the first and second ethylene copolymers. In an embodiment of the disclosure, the first ethylene copolymer can comprise from about 10 to about 70 weight percent (wt %) of the total weight of the first and second ethylene copolymers. In an embodiment of the disclosure, the first ethylene copolymer includes from 20 to about 60 weight percent (wt. %) of the total weight of the first and second ethylene copolymers. In an embodiment of the disclosure, the first ethylene copolymer includes from about 25 to about 60 weight percent (wt %) of the total weight of the first and second ethylene copolymers. In an embodiment of the disclosure, the first ethylene copolymer includes from about 30 to about 60 weight percent (wt. %) of the total weight of the first and second ethylene copolymers. In an embodiment of the disclosure, the first ethylene copolymer includes from about 40 to about 50 weight percent (wt %) of the total weight of the first and second ethylene copolymers.

The Second Ethylene Copolymer

In an embodiment of the disclosure, the second ethylene copolymer has a density which is higher than the density of the first ethylene copolymer.

In an embodiment of the disclosure, the second ethylene copolymer of the polyethylene composition of the current disclosure has a density below 0.967 g/cm³ but which is higher than the density of the first ethylene copolymer; a melt index $I_2$, of from about 50 to 10,000 g/10 min; a molecular weight distribution, $M_w/M_n$, of below about 3.0 and a weight average molecular weight $M_w$ that is less than the $M_w$ of the first ethylene copolymer. In one embodiment, the weight average molecular weight, $M_w$ of the second ethylene copolymer will be below 45,000 g/mole.

In an embodiment of the disclosure, the second ethylene copolymer is made with a single site catalyst, such as for example a phosphinimine catalyst.

The comonomer content in the second ethylene copolymer can be from about 0.05 to about 3 mol % as measured by $^{13}$C NMR, or FTIR or GPC-FTIR methods, or as calculated from a reactor model (see Examples section). The comonomer is one or more suitable alpha olefins, which include, but are not limited to, 1-butene, 1-hexene, 1-octene, and the like. In one embodiment the alpha olefin is 1-octene.

The short chain branching in the second ethylene copolymer can be from about 0.25 to about 15 short chain branches per thousand carbon atoms (SCB1/1000Cs). In further embodiments of the disclosure, the short chain branching in the first ethylene copolymer can be from 0.10 to 10, or from 0.15 to 10, or from 0.20 to 10, or from 0.25 to 10, or from 0.25 to 7.5, or from 0.25 to 5, or from 0.25 to 3, or from 0.10 to 3, or from 0.15 to 3, or from 0.20 to 3 branches per thousand carbon atoms (SCB1/1000Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The comonomer is one or more suitable alpha olefin. Examples of alpha olefins include, but are not limited to 1-butene, 1-hexene, 1-octene, and the like. In one embodiment the alpha olefin is 1-octene.

In an embodiment of the disclosure, the comonomer content in the second ethylene copolymer is less than the comonomer content of the first ethylene copolymer (as reported for example in mol %).

In an embodiment of the disclosure, the amount of short chain branching in the second ethylene copolymer is less than the amount of short chain branching in the first ethylene copolymer (as reported in short chain branches, SCB per thousand carbons in the polymer backbone, 1000 Cs).

In some embodiments, the density of the second ethylene copolymer is less than 0.970 g/cm$^3$.

In some embodiments the density of the second ethylene copolymer is less than 0.967 g/cm$^3$. In another embodiment of the disclosure, the density of the second ethylene copolymer is less than 0.966 g/cm$^3$. In another embodiment of the disclosure, the density of the second ethylene copolymer is less than 0.965 g/cm$^3$. In another embodiment of the disclosure, the density of the second ethylene copolymer is less than 0.964 g/cm$^3$. In an embodiment of the disclosure, the density of the second ethylene copolymer is from 0.952 to 0.967 g/cm$^3$ or can be a narrower range within this range, including all the number encompassed within these ranges. In further embodiments of the disclosure, the density of the second ethylene copolymer is from 0.950 to 0.965 g/cm$^3$, or from 0.952 to 0.965 g/cm$^3$, or from 0.950 to below 0.965 g/cm$^3$, or from 0.952 to below 0.965 g/cm$^3$; or from 0.950 to 0.964 g/cm$^3$, or from 0.952 to 0.964 g/cm$^3$, or from 0.954 to 0.964 g/cm$^3$.

In some embodiments of the disclosure, the density of the second ethylene copolymer is higher than the density of the first ethylene copolymer, but is less than 0.970 g/cm$^3$.

In some embodiments, the second ethylene copolymer has a density which is higher than the density of the first ethylene copolymer, but less than about 0.037 g/cm$^3$ higher than the density of the first ethylene copolymer. In an embodiment of the disclosure, the second ethylene copolymer has a density which is higher than the density of the first ethylene copolymer, but less than about 0.035 g/cm$^3$ higher than the density of the first ethylene copolymer. In another embodiment of the disclosure, the second ethylene copolymer has a density which is higher than the density of the first ethylene copolymer, but less than about 0.030 g/cm$^3$ higher than the density of the first ethylene copolymer. In still another embodiment of the disclosure, the second ethylene copolymer has a density which is higher than the density of the first ethylene copolymer, but less than about 0.027 g/cm$^3$ higher than the density of the first ethylene copolymer. In still another embodiment of the disclosure, the second ethylene copolymer has a density which is higher than the density of the first ethylene copolymer, but less than about 0.025 g/cm$^3$ higher than the density of the first ethylene copolymer.

In an embodiment of the disclosure, the second ethylene copolymer has a weight average molecular weight $M_w$ of less than 45,000 g/mol. In another embodiment of the disclosure, the second ethylene copolymer has a weight average molecular weight $M_w$ of from about 7,500 to about 40,000. In further embodiments of the disclosure, the second ethylene copolymer has a weight average molecular weight $M_w$ of from about 9,000 to about 35,000, or from about 10,000 to about 30,000, or from about 10,000 to 25,000.

In embodiments of the disclosure, the second ethylene copolymer has a molecular weight distribution ($M_w/M_n$) of <3.0, or ≤2.7, or <2.7, or ≤2.5, or <2.5, or ≤2.3, or from 1.8 to 2.3.

In an embodiment of the disclosure, the melt index $I_2$ of the second ethylene copolymer can be at least 50 g/10 min.

In an embodiment of the disclosure, the melt index $I_2$ of the second ethylene copolymer can be from 50 to 10,000 g/10 min. In another embodiment of the disclosure, the melt index $I_2$ of the second ethylene copolymer can be from 100 to 5,000 g/10 min. In another embodiment of the disclosure, the melt index $I_2$ of the second ethylene copolymer can be from 50 to 3,500 g/10 min. In another embodiment of the disclosure, the melt index $I_2$ of the second ethylene copolymer can be from 100 to 10,000 g/10 min. In yet another embodiment of the disclosure, the melt index $I_2$ of the second ethylene copolymer can be from 1000 to 7000 g/10 min. In yet another embodiment of the disclosure, the melt index $I_2$ of the second ethylene copolymer can be from 1200 to 10,000 g/10 min. In yet another embodiment of the disclosure, the melt index $I_2$ of the second ethylene copolymer can be from 1200 to 7,000 g/10 min. In yet another embodiment of the disclosure, the melt index $I_2$ of the second ethylene copolymer can be greater than 1200, but less than 5000 g/10 min. In still yet another embodiment of the disclosure, the melt index $I_2$ of the second ethylene copolymer can be greater than 1000, but less than 3000 g/10 min. In still yet another embodiment of the disclosure, the melt index $I_2$ of the second ethylene copolymer can be greater than 500, but less than 3000 g/10 min. In still yet another embodiment of the disclosure, the melt index $I_2$ of the second ethylene copolymer can be greater than 250, but less than 2700 g/10 min. In still yet another embodiment of the disclosure, the melt index $I_2$ of the second ethylene copolymer can be greater than 150, but less than 2700 g/10 min.

In an embodiment of the disclosure, the melt index $I_2$ of the second ethylene copolymer is greater than 100 g/10 min. In an embodiment of the disclosure, the melt index $I_2$ of the second ethylene copolymer is greater than 200 g/10 min. In an embodiment of the disclosure, the melt index $I_2$ of the second ethylene copolymer is greater than 500 g/10 min. In an embodiment of the disclosure, the melt index $I_2$ of the second ethylene copolymer is greater than 1000 g/10 min. In an embodiment of the disclosure, the melt index $I_2$ of the second ethylene copolymer is greater than 1200 g/10 min. In an embodiment of the disclosure, the melt index $I_2$ of the second ethylene copolymer is greater than 1500 g/10 min.

In an embodiment of the disclosure, the second ethylene copolymer of the polyethylene composition is made with a single site catalyst and has a weight average molecular weight, $M_w$, of at most 45,000; a molecular weight distribution, $M_w/M_n$, of less than 3.0 and a density higher than the density of the first ethylene copolymer, but less than 0.967 g/cm$^3$.

In an embodiment of the disclosure, a single site catalyst which gives an ethylene copolymer having a CDBI(50) of at least 65% by weight, or at least 70%, or at least 75%, or at least 80%, or at least 85%, during solution phase polymerization in a single reactor, is used in the preparation of the second ethylene copolymer.

In an embodiment of the present disclosure, the second ethylene copolymer has a CDBI(50) of greater than about 60% by weight, or greater than about 65%, or greater than about 70%, or greater than about 75%, or greater than about 80%, or greater than about 85%.

In an embodiment of the disclosure, the second ethylene copolymer can comprise from about 90 to about 10 wt. % of the total weight of the first and second ethylene copolymers. In an embodiment of the disclosure, the second ethylene copolymer can comprise from about 90 to about 20 wt. % of the total weight of the first and second ethylene copolymers. In an embodiment of the disclosure, the second ethylene copolymer can comprise from about 90 to about 30 wt. % of the total weight of the first and second ethylene copolymers. In an embodiment of the disclosure, the second ethylene copolymer includes from about 80 to about 40 wt. % of the total weight of the first and second ethylene copolymers. In an embodiment of the disclosure, the second ethylene copolymer includes from about 75 to about 40 wt. % of the total weight of the first and second ethylene copolymers. In an embodiment of the disclosure, the second ethylene copolymer includes from about 70 to about 40 wt. % of the total weight of the first and second ethylene copolymers. In an embodiment of the disclosure, the second ethylene copolymer includes from about 60 to about 50 wt. % of the total weight of the first and second ethylene copolymers.

In embodiments of the disclosure, the melt index $I_2$ of the second ethylene copolymer is at least 10 times, or at least 50 times, or at least 100 times, or at least 1,000 times the melt index $I_2$ of the first ethylene copolymer.

The Polyethylene Composition

In some embodiments of the disclosure, the polyethylene composition has a unimodal, broad unimodal, bimodal or multimodal molecular weight distribution as determined by gel permeation chromatography.

In an embodiment of the disclosure, the polyethylene composition that includes a first ethylene copolymer and a second ethylene copolymer (as defined above) will have a ratio (SCB1/SCB2) of the number of short chain branches per thousand carbon atoms in the first ethylene copolymer (i.e., SCB1) to the number of short chain branches per thousand carbon atoms in the second ethylene copolymer (i.e., SCB2) of greater than 0.5 (i.e., SCB1/SCB2>0.5).

In an embodiment of the disclosure, the polyethylene composition that includes a first ethylene copolymer and a second ethylene copolymer (as defined above) will have a ratio (SCB1/SCB2) of the number of short chain branches per thousand carbon atoms in the first ethylene copolymer (i.e., SCB1) to the number of short chain branches per thousand carbon atoms in the second ethylene copolymer (i.e., SCB2) of greater than 1.0 (i.e., SCB1/SCB2>1.0).

In further embodiments of the disclosure, the ratio of the short chain branching in the first ethylene copolymer (SCB1) to the short chain branching in the second ethylene copolymer (SCB2) is at least 1.25. In still another embodiment of the disclosure, the ratio of the short chain branching in the first ethylene copolymer (SCB1) to the short chain branching in the second ethylene copolymer (SCB2) is at least 1.5.

In embodiments of the disclosure, the ratio (SCB1/SCB2) of the short chain branching in the first ethylene copolymer (SCB1) to the short chain branching in the second ethylene copolymer (SCB2) will be from greater than 1.0 to about 12.0, or from greater than 1.0 to about 10, or from greater than 1.0 to about 7.0, or from greater than 1.0 to about 5.0, or from greater than 1.0 to about 3.0.

In an embodiment of the disclosure, the polyethylene composition is bimodal as determined by GPC.

A bimodal or multimodal polyethylene composition can be identified by using gel permeation chromatography (GPC). A GPC chromatograph may exhibit two or more component ethylene copolymers, where the number of component ethylene copolymers corresponds to the number of discernible peaks. One or more component ethylene copolymers may also exist as a hump, shoulder or tail relative to the molecular weight distribution of the other ethylene copolymer component. By the phrase "bimodal as determined by GPC", it is meant that in addition to a first peak, there will be a secondary peak or shoulder which represents a higher or lower molecular weight component (i.e., the molecular weight distribution, can be said to have two maxima in a molecular weight distribution curve). Alternatively, the phrase "bimodal as determined by GPC" connotes the presence of two maxima in a molecular weight distribution curve generated according to the method of ASTM D6474-99.

In an embodiment of the present disclosure, the polyethylene composition has a density of greater than or equal to 0.950 g/cm$^3$, as measured according to ASTM D792; a melt index $I_2$, of from about 2 to about 22 g/10 min, as measured according to ASTM D1238 (when conducted at 190° C., using a 2.16 kg weight); a molecular weight distribution, $M_w/M_n$, of from about 2 to about 7, a Z-average molecular weight $M_z$, of less than about 300,000; a stress exponent of less than 1.40; and an ESCR Condition B at 100% IGEPAL® CO-630 of at least about 3 hours.

In embodiments of the disclosure, the polyethylene composition has a comonomer content of less than about 0.75 mol %, or less than about 0.70 mol %, or less than about 0.65 mol %, or less than about 0.60 mol %, or less than about 0.55 mol %, or less than about 0.50 mol % as measured by FTIR or $^{13}$C NMR methods, where the comonomer is one or more suitable alpha olefins, which include, but are not limited to, 1-butene, 1-hexene, 1-octene, and the like. In one embodiment the alpha olefin is 1-octene.

In some embodiments the polyethylene composition has a density of at least 0.950 g/cm$^3$. In further embodiments of the disclosure, the polyethylene composition has a density of >0.952 g/cm$^3$, or >0.953 g/cm$^3$, or >0.955 g/cm$^3$.

In an embodiment of the disclosure, the polyethylene composition has a density in the range of 0.950 to 0.970 g/cm$^3$. In an embodiment of the current disclosure, the polyethylene composition has a density in the range of 0.950 to 0.965 g/cm$^3$.

In an embodiment of the disclosure, the polyethylene composition has a density in the range of 0.950 to 0.962 g/cm³.

In an embodiment of the disclosure, the polyethylene composition has a density in the range of 0.952 to 0.960 g/cm³.

In an embodiment of the disclosure, the polyethylene composition has a density in the range of 0.950 to 0.960 g/cm³.

In an embodiment of the disclosure, the polyethylene composition has a density in the range of 0.950 to 0.959 g/cm³.

In an embodiment of the disclosure, the polyethylene composition has a density in the range of 0.951 to 0.957 g/cm³.

In an embodiment of the disclosure, the polyethylene composition has a density in the range of 0.952 to 0.957 g/cm³.

In an embodiment of the disclosure, the polyethylene composition has a melt index $I_2$, of from 0.5 to 35 g/10 min according to ASTM D1238 (when conducted at 190° C., using a 2.16 kg weight) and including narrower ranges within this range and all numbers encompassed by these ranges.

In an embodiment of the disclosure, the polyethylene composition has a melt index $I_2$, of from 2 to 22 g/10 min according to ASTM D1238 (when conducted at 190° C., using a 2.16 kg weight) and including narrower ranges within this range and all numbers encompassed by these ranges. For example, in further embodiments of the disclosure, the polyethylene composition has a melt index $I_2$, of greater than 2, but less than 22 g/10 min, or from 2 to 15.0 g/10 min, or from 3 to 12.5 g/10 min, or from 4 to 12.5 g/10 min, or from greater than 4 to less than 20 g/10 min, or from 4.5 to 10 g/10 min, or from 5 to 20 g/10 min, or from greater than 5.0 to less than 20 g/10 min, or from 3 to 15.0 g/10 min, or from 6.0 to 12.0 g/10 min, or from 6.0 to about 10.0 g/10 min, or from about 5.0 to about 12.0 g/10 min, or from more than about 5.0 to less than about 10.0 g 10/min.

In an embodiment of the disclosure, the polyethylene composition has a melt index $I_2$, of ≤10.0 g/10 min, or less than 10 g/10 min, or from greater than 4.5 to 10 g/10 min, or from 4.0 to 10 g/10 min, or from 3.0 to 10 g/10 min, or from 2.0 to 10 g/10 min, or from 1.0 to 10.0 g/10 min according to ASTM D1238 (when conducted at 190° C., using a 2.16 kg weight) and including narrower ranges within this range and all numbers encompassed by these ranges.

In an embodiment of the disclosure, the polyethylene composition has a "medium load" melt index, $I_5$, of at least about 2.5 g/10 min according to ASTM D1238 (when conducted at 190° C., using a 5 kg weight). In another embodiment of the disclosure, the polyethylene composition has a medium load melt index, $I_5$, of greater than about 5.0 g/10 min, as measured according to ASTM D1238 (when conducted at 190° C., using a 5 kg weight). In further embodiments of the disclosure, the polyethylene composition has a medium load melt index, $I_5$, of at least about 10.0 g/10 min, or at least about 4.0 g/10 min. In still further embodiments of the disclosure, the polyethylene composition has a medium load melt index, $I_5$, of from about 5.0 to about 25.0 g/10 min, or from about 5.0 to about 20.0 g/10 min, or from about 5.0 to about 17.5 g/10 min, or from about 5.0 to about 15.0 g/10 min.

In an embodiment of the disclosure, the polyethylene composition has a "high load" melt index $I_{21}$ of at least about 100 g/10 min according to ASTM D1238 (when conducted at 190° C., using a 21 kg weight). In another embodiment of the disclosure, the polyethylene composition has a high load melt index $I_{21}$, of greater than about 150 g/10 min.

In an embodiment of the disclosure, the polyethylene composition has a high load melt index $I_{21}$, of from 125 to 500 g/10 min, or from 150 to 450 g/10 min, or from 150 to 400 g/10 min.

In an embodiment of the disclosure, the polyethylene composition has a number average molecular weight $M_n$, of below about 30,000 g/mol. In another embodiment of the disclosure, the polyethylene composition has a number average molecular weight $M_n$, of below about 25,000 g/mol. In yet another embodiment of the disclosure, the polyethylene composition has a number average molecular weight $M_n$, of below about 20,000 g/mol.

In an embodiment of the present disclosure, the polyethylene composition has a molecular weight distribution $M_w/M_n$, of from 2.0 to 7.0 or a narrower range within this range, including all the numbers encompassed within these ranges. For example, in further embodiments of the disclosure, the polyethylene composition has molecular weight distribution $M_w/M_n$, of from 3.0 to 7.0, or from 3.5 to 6.0, or from 3.5 to 5.5, or from 2.5 to 6.5, or from 2.5 to 6.0, or from 2.0 to 6.0 or from 2.0 to 5.5, or from 2.0 to 5.0, or from 2.0 to 4.5, or from 2.5 to 4.25, or from 2.25 to 4.25, In an embodiment of the disclosure, the polyethylene composition has a Z-average molecular weight, $M_z$, of below about 300,000 g/mole. In another embodiment of the disclosure, the polyethylene composition has a Z-average molecular weight, $M_z$, of below about 250,000 g/mole. In yet another embodiment of the disclosure, the polyethylene composition has a Z-average molecular weight, $M_z$, of below about 200,000 g/mole.

In embodiments of the disclosure, the polyethylene composition has a ratio of Z-average molecular weight to weight average molecular weight $M_z/M_w$, of from 2.0 to 4.0, or from 2.0 to 3.75, or from 2.25 to 3.75, or from 2.50 to 3.5.

In embodiments of the disclosure, the polyethylene composition has a melt flow ratio defined as $I_{21}/I_2$, of from about 15 to about 50, or from about 20 to 50, or from about 22 to 50, or from about 25 to 45, or from about 30 to 45, or from about 30 to 50, or from 22 to 50, or from about 22 to less than 50.

In embodiments of the disclosure, the polyethylene composition has a melt flow ratio defined as $I_{21}/I_2$, of less than 41, or less than 40, or less than 38, or less than 36, or from about 22 to about 40, or from about 22 to 38, or from 24 to 38, of from 24 to 40, or from about 24 to 36, or from about 26 to about 38, or from about 28 to about 36, or from about 28 to about 38, or from about 28 to about 40.

In an embodiment of the disclosure, the polyethylene composition has a melt flow rate defined as $I_{21}/I_5$, of less than 25. In another embodiment of the disclosure, the polyethylene composition has a melt flow rate defined as $I_{21}/I_5$, of less than 20. In another embodiment of the disclosure, the polyethylene composition has a melt flow rate defined as $I_{21}/I_5$, of less than 15.

In an embodiment of the disclosure, the polyethylene composition has a shear viscosity at about $10^5$ s$^{-1}$ (240° C.) of less than about 10 (Pa.$). In further embodiments of the disclosure, the polyethylene composition has a shear viscosity at about $10^5$ s$^{-1}$ (240° C.) of less than 7.5 Pa·s, or less than 6.8 Pa·s. Simultaneously, the polyethylene composition may have a shear viscosity at about 100 s$^{-1}$ (240° C.) of less than about 600 Pa·s, a shear viscosity at about 200 s$^{-1}$ (240° C.) of less than about 500 Pa·s and a shear viscosity at about 300 s$^{-1}$ (240° C.) of less than about 400 Pa·s.

In an embodiment of the disclosure, the polyethylene composition has at least one type of alpha-olefin that has at least 4 carbon atoms and its content is less than about 0.75 mol % as determined by $^{13}$C NMR. In an embodiment of the disclosure, the polyethylene composition has at least one type of alpha-olefin that has at least 4 carbon atoms and its content is less than about 0.65 mol % as determined by $^{13}$C NMR. In an embodiment of the disclosure, the polyethylene composition has at least one type of alpha-olefin that has at least 4 carbon atoms and its content is less than about 0.55 mol % as determined by $^{13}$C NMR. In an embodiment of the disclosure, the polyethylene composition has at least one type of alpha-olefin that has at least 4 carbon atoms and its content is less than about 0.50 mol % as determined by $^{13}$C NMR. In an embodiment of the disclosure, the polyethylene composition has at least one type of alpha-olefin that has at least 4 carbon atoms and its content is greater than about 0.20 to less than about 0.55 mol % as determined by $^{13}$C NMR.

In an embodiment of the disclosure, the shear viscosity ratio, $SVR_{(100, 100000)}$ at 240° C. of the polyethylene composition can be from about 50 to about 90, or can be from about 55 to about 90, or from about 50 to about 85, or from greater than about 50 to about 75. The shear viscosity ratio $SVR_{(100, 100000)}$ is determined by taking the ratio of shear viscosity at shear rate of 100 s$^{-1}$ and shear viscosity at shear rate of 100000 s$^{-1}$ as measured with a capillary rheometer at constant temperature (e.g., 240° C.), and two dies with L/D ratio of 20 and diameter of 0.06" (from about 3 to 1000 s$^{-1}$) and L/D ratio of 20 and diameter of 0.012" (from about 1000 to 100000 s$^{-1}$) respectively.

In an embodiment of the disclosure, the polyethylene composition or a molded article made from the polyethylene composition, has an environmental stress crack resistance ESCR Condition B at 100% of at least about 3 hours, as measured according to ASTM D1693 (at 50° C. using 100% IGEPAL® CO-630, condition B).

In an embodiment of the disclosure, the polyethylene composition or a molded article made from the polyethylene composition, has an environmental stress crack resistance ESCR Condition B at 100% of at least about 3.5 hours, as measured according to ASTM D1693 (at 50° C. using 100% IGEPAL® CO-630, condition B).

In an embodiment of the disclosure, the polyethylene composition or a molded article made from the polyethylene composition, has an environmental stress crack resistance ESCR Condition B at 100% of at least about 4.0 hours, as measured according to ASTM D1693 (at 50° C. using 100% IGEPAL® CO-630, condition B).

In an embodiment of the disclosure, the polyethylene composition or a molded article made from the polyethylene composition, has an environmental stress crack resistance ESCR Condition B at 100% of from about 3.5 to about 15 hours, as measured according to ASTM D1693 (at 50° C. using 100% IGEPAL® CO-630, condition B).

In embodiments of the disclosure, the polyethylene composition or a molded article (e.g., a plaque) made from the polyethylene composition, has a tensile ultimate elongation of at least 600 percent, or at least 700 percent, or at least 800 percent, or at least 850 percent, or at least 900 percent, or at least 950 percent, or at least 1000 percent. In an embodiment of the disclosure, the polyethylene composition or a molded article (e.g., a plaque) made from the polyethylene composition, has a tensile ultimate elongation of from 900 to 1400 percent.

In embodiments of the disclosure, the polyethylene composition or a molded article (e.g., a plaque) made from the polyethylene composition, has a tensile ultimate strength of at least 16 MPa, or at least 17 MPa, or at least 18 MPa, or at least 19 MPa, or at least 20 MPa, or at least 21 MPa, or at least 22 MPa. In an embodiment of the disclosure, the polyethylene composition or a molded article (e.g., a plaque) made from the polyethylene composition, has a tensile ultimate strength of from 17 to 28 MPa.

In embodiments of the disclosure, the polyethylene composition has a "processability indicator" of at least 15, or at least 16, or at least 17, or at least 18, or at least 19, or at least 20. In an embodiment of the disclosure, the polyethylene composition has a "processability indicator" of from 15 to 25.

In an embodiment of the disclosure, the polyethylene composition has a molecular weight distribution $M_w/M_n$, of from 2.0 to 7.0; a density of at least 0.950 g/cm$^3$; a melt index $I_2$ of $\leq$10 g/10 min; a Z-average molecular weight $M_z$, of less than about 300,000; and a melt flow ratio $I_{21}/I_2$, less than 41.

In an embodiment of the disclosure, the polyethylene composition or a molded article made from the polyethylene composition, has an environmental stress crack resistance ESCR Condition B at 100% of from about 3.5 to about 12 hours, as measured according to ASTM D1693 (at 50° C. using 100% IGEPAL® CO-630, condition B).

In an embodiment of the disclosure, the polyethylene composition or a molded article made from the polyethylene composition has a Notched Izod impact strength of at least about 40 J/m, as measured according to ASTM D256.

In embodiments of the disclosure, the polyethylene composition has a TD/MD shrinkage ratio (for an injection molded disk at about 48 hrs post molding) of from about 0.90 to about 1.20, or from about 0.90 to about 1.15, or from about 0.95 to about 1.15, or from about 0.90 to about 1.10, or from about 0.95 to about 1.10, or from about 0.95 to about 1.05 when measured according to the Dimensional Stability Test (DST).

In embodiments of the disclosure, the polyethylene composition has a TD shrinkage—MD shrinkage (for an injection molded disk at about 48 hour post molding time) of from about 0.25 to about 0.25, or from about 0.20 to about 0.20, or from about 0.15 to about 0.15, or from about 0.10 to about 0.10, or from about 0.075 to about 0.075, or from about 0.05 to about 0.05, when measured according to the Dimensional Stability Test (DST).

In an embodiment of the disclosure, the polyethylene composition of the current disclosure has a density of from 0.950 to 0.960 g/cm$^3$; a melt index $I_2$, of from 3 to 12 g/10 min; a molecular weight distribution $M_w/M_n$, of from 2.0 to 7.0; a number average molecular weight $M_n$, of below 30,000; a shear viscosity at 10$^5$ s$^{-1}$ (240° C.) of less than 10 (Pa·s), a hexane extractables of less than 0.55%, a notched Izod impact strength of more than 40 J/m, and an ESCR B at 100% of at least about 3.5 hours.

In an embodiment of the disclosure, the polyethylene composition has a hexanes extractables of less than about 0.55%. In further embodiments of the disclosure, the polyethylene composition has a hexane extractables of less than about 0.50%, or less than about 0.45%, or less than about 0.40%, or less than about 0.35%.

In an embodiment of the disclosure, the polyethylene composition has a stress exponent, defined as $Log_{10}[I_6/I_2]/Log_{10}[6.48/2.16]$, which is $\leq$1.40 or <1.40. In further embodiments of the disclosure, the polyethylene composition has a stress exponent, $Log_{10}[I_6/I_2]/Log_{10}[6.48/2.16]$ of from 1.22 to 1.40, or from 1.22 to 1.38, or from 1.24 to 1.36.

In an embodiment of the disclosure, the polyethylene composition has a composition distribution breadth index (CDBI(50)), as determined by temperature elution fractionation (TREF), of ≥ about 60 weight percent. In further embodiments of the disclosure, the polyethylene composition will have a CDBI(50) of greater than about 65%, or greater than about 70%, or greater than about 75%, or greater than about 80%, or greater than about 85%.

In an embodiment of the disclosure, the polyethylene composition has a composition distribution breadth index (CDBI(25)), as determined by temperature elution fractionation (TREF), of ≥ about 55 weight percent. In further embodiments of the disclosure, the polyethylene composition will have a CDBI(25) of greater than about 60%, or greater than about 65%, or from about 55 to about 75%, or from about 60 to about 75%.

The polyethylene composition of this disclosure can be made using any conventional blending method such as but not limited to physical blending and in-situ blending by polymerization in multi reactor systems. For example, it is possible to perform the mixing of the first ethylene copolymer with the second ethylene copolymer by molten mixing of the two preformed polymers. One embodiment uses processes in which the first and second ethylene copolymers are prepared in at least two sequential polymerization stages, however, both in-series or an in-parallel dual reactor process are contemplated for use in the current disclosure. Gas phase, slurry phase or solution phase reactor systems may be used. In one embodiment a solution phase reactor systems is used.

In some embodiments mixed catalyst single reactor systems may also be employed to make the polymer compositions disclosed herein.

In an embodiment of the current disclosure, a dual reactor solution polymerization process is used as has been described in for example U.S. Pat. No. 6,372,864 and U.S. Application Publication No. 20060247373A1.

In some embodiments the catalysts used in the current disclosure will be so called single site catalysts based on a group 4 metal having at least one cyclopentadienyl ligand. Examples of such catalysts include metallocenes, constrained geometry catalysts, and phosphinimine catalysts used, for example, in combination with activators selected from methylaluminoxanes, boranes, or ionic borate salts and are further described in U.S. Pat. Nos. 3,645,992; 5,324,800; 5,064,802; 5,055,438; 6,689,847; 6,114,481, and 6,063,879. Such single site catalysts are distinguished from traditional Ziegler-Natta or Phillips catalysts which are also well known in the art. In some embodiments single site catalysts produce ethylene copolymers having a molecular weight distribution ($M_w/M_n$) of less than about 3.0 and a composition distribution breadth index CDBI(50) of greater than about 65%.

In an embodiment of the disclosure, a single site catalyst is used to make an ethylene copolymer having a CDBI(50) of at least about 65% by weight, or at least about 70%, or at least about 75%, or at least about 80%, or at least about 85%, during solution phase polymerization in a single reactor, for the preparation of each of the first and the second ethylene copolymers.

In an embodiment of the disclosure, homogeneously branched ethylene copolymers are prepared using an organometallic complex of a group 3, 4 or 5 metal that is further characterized as having a phosphinimine ligand. Such a complex, when active toward olefin polymerization, is known generally as a phosphinimine (polymerization) catalyst. Some non-limiting examples of phosphinimine catalysts can be found in U.S. Pat. Nos. 6,342,463; 6,235,672; 6,372,864; 6,984,695; 6,063,879; 6,777,509, and 6,277,931.

Some non-limiting examples of metallocene catalysts can be found in U.S. Pat. Nos. 4,808,561; 4,701,432; 4,937,301; 5,324,800; 5,633,394; 4,935,397; 6,002,033, and 6,489,413. Some non-limiting examples of constrained geometry catalysts can be found in U.S. Pat. Nos. 5,057,475; 5,096,867; 5,064,802; 5,132,380; 5,703,187, and 6,034,021.

In an embodiment of the disclosure, use of a single site catalyst that does not produce long chain branching (LCB) is used. Hexyl (C6) branches detected by NMR are excluded from the definition of a long chain branch as disclosed herein.

Without wishing to be bound by any single theory, long chain branching can increase viscosity at low shear rates, thereby negatively impacting cycle times during the manufacture of bottle closure assemblies, such as during the processes of injection molding or compression molding. Long chain branching may be determined using $^{13}C$ NMR methods and may be quantitatively assessed using the method disclosed by Randall in Rev. Macromol. Chem. Phys. C29 (2 and 3), p. 285.

In an embodiment of the disclosure, the polyethylene composition will contain fewer than 0.3 long chain branches per 1000 carbon atoms. In another embodiment of the disclosure, the polyethylene composition will contain fewer than 0.01 long chain branches per 1000 carbon atoms.

In an embodiment of the disclosure, the polyethylene composition is prepared by contacting ethylene and at least one alpha-olefin with a polymerization catalyst under solution phase polymerization conditions in at least two polymerization reactors (for an example of solution phase polymerization conditions see for example U.S. Pat. Nos. 6,372,864 and 6,984,695 and U.S. Patent Application 20060247373A1).

In an embodiment of the disclosure, the polyethylene composition is prepared by contacting at least one single site polymerization catalyst system (including at least one single site catalyst and at least one activator) with ethylene and a least one comonomer (e.g., a C3-C8 alpha-olefin) under solution polymerization conditions in at least two polymerization reactors.

In an embodiment of the disclosure, a group 4 single site catalyst system, including a single site catalyst and an activator, is used in a solution phase dual reactor system to prepare a polyethylene composition by polymerization of ethylene in the presence of an alpha-olefin comonomer.

In an embodiment of the disclosure, a group 4 single site catalyst system, including a single site catalyst and an activator, is used in a solution phase dual reactor system to prepare a polyethylene composition by polymerization of ethylene in the presence of 1-octene.

In an embodiment of the disclosure, a group 4 phosphinimine catalyst system, including a phosphinimine catalyst and an activator, is used in a solution phase dual reactor system to prepare a polyethylene composition by polymerization of ethylene in the presence of an alpha-olefin comonomer.

In an embodiment of the disclosure, a group 4 phosphinimine catalyst system, including a phosphinimine catalyst and an activator, is used in a solution phase dual reactor system to prepare a polyethylene composition by polymerization of ethylene in the presence of 1-octene.

In an embodiment of the disclosure, a solution phase dual reactor system includes two solution phase reactors connected in series.

In an embodiment of the disclosure, a polymerization process to prepare the polyethylene composition includes contacting at least one single site polymerization catalyst system (including at least one single site catalyst and at least one activator) with ethylene and at least one alpha-olefin comonomer under solution polymerization conditions in at least two polymerization reactors.

In an embodiment of the disclosure, a polymerization process to prepare the polyethylene composition includes contacting at least one single site polymerization catalyst system with ethylene and at least one alpha-olefin comonomer under solution polymerization conditions in a first reactor and a second reactor configured in series.

In an embodiment of the disclosure, a polymerization process to prepare the polyethylene composition includes contacting at least one single site polymerization catalyst system with ethylene and at least one alpha-olefin comonomer under solution polymerization conditions in a first reactor and a second reactor configured in series, with the at least one alpha-olefin comonomer being fed exclusively to the first reactor.

In one embodiment, the production of the polyethylene composition as disclosed herein may include an extrusion or compounding step. Such steps are well known in the art.

In one embodiment, the polyethylene composition can comprise further polymer components in addition to the first and second ethylene polymers. Such polymer components include polymers made in situ or polymers added to the polymer composition during an extrusion or compounding step.

Optionally, additives can be added to the polyethylene composition. Additives can be added to the polyethylene composition during an extrusion or compounding step, but other suitable known methods will be apparent to a person skilled in the art. The additives can be added as is or as part of a separate polymer component (i.e. not the first or second ethylene polymers described above) added during an extrusion or compounding step. Suitable additives are known in the art and include but are not-limited to antioxidants, phosphites and phosphonites, nitrones, antacids, UV light stabilizers, UV absorbers, metal deactivators, dyes, fillers and reinforcing agents, nano-scale organic or inorganic materials, antistatic agents, lubricating agents such as calcium stearates, slip additives such as erucimide or behenamide, and nucleating agents (including nucleators, pigments or any other chemicals which may provide a nucleating effect to the polyethylene composition). The additives that can be optionally added may be added in amount of up to about 20 weight percent (wt. %).

In an embodiment of the disclosure, one or more nucleating agent(s) may be introduced into the polyethylene composition by kneading a mixture of the polymer, usually in powder or pellet form, with the nucleating agent, which may be utilized alone or in the form of a concentrate containing further additives such as stabilizers, pigments, antistatics, UV stabilizers and fillers. In an embodiment, a nucleating agent is a material which is wetted or absorbed by the polymer, is insoluble in the polymer, has a melting point higher than that of the polymer, and it is homogeneously dispersible in the polymer melt in as fine a form as possible (about 1 to about 10 pm). Compounds known to have a nucleating capacity for polyolefins include salts of aliphatic monobasic or dibasic acids or arylalkyl acids, such as sodium succinate or aluminum phenylacetate; and alkali metal or aluminum salts of aromatic or alicyclic carboxylic acids such as sodium β-naphthoate. Another compound known to have nucleating capacity is sodium benzoate. Another compound known to have nucleating capacity is talc. The effectiveness of nucleation may be monitored microscopically by observation of the degree of reduction in size of the spherulites into which the crystallites are aggregated.

Examples of nucleating agents which are commercially available and which may be added to the polyethylene composition are dibenzylidene sorbital esters (such as the products sold under the trademark Millad™ 3988 by Milliken Chemical and Irgaclear by Ciba Specialty Chemicals). Further examples of nucleating agents which may added to the polyethylene composition include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophtalic acid structure (or "HHPA" structure) as disclosed in U.S. Pat. No. 6,599,971 (Dotson et al., to Milliken); and phosphate esters, such as those disclosed in U.S. Pat. No. 5,342,868 and those sold under the trade names NA-11 and NA-21 by Asahi Denka Kogyo, cyclic dicarboxylates and the salts thereof, such as the divalent metal or metalloid salts, (particularly, calcium salts) of the HHPA structures disclosed in U.S. Pat. No. 6,599,971. For clarity, the HHPA structure includes a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further examples of nucleating agents which may added to the polyethylene composition include those disclosed in WO2015042561, WO2015042563, WO2015042562, and WO 2011050042.

Many of the above described nucleating agents may be difficult to mix with the polyethylene composition that is being nucleated and it is known to use dispersion aids, such as for example, zinc stearate, to mitigate this problem.

In an embodiment of the disclosure, the nucleating agents are well dispersed in the polyethylene composition.

In an embodiment of the disclosure, the amount of nucleating agent used is comparatively small (from 100 to 3000 parts by million per weight (based on the weight of the polyethylene composition)) so it will be appreciated by those skilled in the art that some care must be taken to ensure that the nucleating agent is well dispersed. In an embodiment of the disclosure, the nucleating agent is added in finely divided form (less than 50 microns, especially less than 10 microns) to the polyethylene composition to facilitate mixing. This type of "physical blend" (i.e., a mixture of the nucleating agent and the resin in solid form) is, in some embodiments, preferable to the use of a "masterbatch" of the nucleator (where the term "masterbatch" refers to the practice of first melt mixing the additive—the nucleator, in this case—with a small amount of the polyethylene composition resin—then melt mixing the "masterbatch" with the remaining bulk of the polyethylene composition resin).

In an embodiment of the disclosure, an additive such as nucleating agent may be added to the polyethylene composition by way of a "masterbatch", where the term "masterbatch" refers to the practice of first melt mixing the additive (e.g., a nucleator) with a small amount of the polyethylene composition, followed by melt mixing the "masterbatch" with the remaining bulk of the polyethylene composition.

In an embodiment of the disclosure, the polyethylene composition further includes a nucleating agent or a mixture of nucleating agents.

In an embodiment of the disclosure, homogeneously branched polyethylene copolymers are prepared using an organometallic complex of a group 3, 4 or 5 metal that is further characterized as having a phosphinimine ligand. Such a complex, when active toward olefin polymerization, is known generally as a phosphinimine (polymerization) catalyst.

In an embodiment of the disclosure, the polyethylene compositions described above are used in the formation of molded articles. For example, articles formed by compression molding and injection molding are contemplated.

The polyethylene compositions described above are used in the formation of bottle closure assemblies. For example, bottle closure assemblies formed in part on in whole by compression molding or injection molding are contemplated.

In one embodiment, the bottle closure assembly includes the polyethylene composition described above which have very good dimensional stability, good organoleptic properties, good toughness, and reasonable ESCR values. The bottle closure assemblies are well suited for sealing bottles, containers, and the like, for examples bottles that may contain drinkable water, and other foodstuffs, including but not limited to liquids that are pressurized (e.g., carbonated beverages or appropriately pressurized drinkable liquids). The bottle closure assemblies may also be used for sealing bottles containing drinkable water or non-carbonated beverages (e.g., juice). Other applications, include bottle closure assemblies for bottles and containers containing foodstuffs, such as for example ketchup bottles and the like.

The bottle closure assemblies of the current disclosure can be made according to any known method, including for example injection molding or compression molding techniques that are well known to persons skilled in the art. Hence, in an embodiment of the disclosure, a bottle closure assembly including the polyethylene composition (defined above) is prepared with a process including at least one compression molding step and/or at least one injection molding step.

The disclosure is further illustrated by the following non-limiting examples.

EXAMPLES

Melt indexes, $I_2$, $I_5$, $I_6$, and $I_{21}$ for the polyethylene composition were measured according to ASTM D1238 (when conducted at 190° C., using a 2.16 kg, a 5 kg, a 6.48 kg and a 21 kg weight respectively).

$M_n$, $M_w$, and $M_z$ (g/mol) were determined by high temperature Gel Permeation Chromatography with differential refractive index detection using universal calibration (e.g., ASTM-D6474-99). GPC data was obtained using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("$M_n$") and 5.0% for the weight average molecular weight ("$M_w$"). The molecular weight distribution (MWD) is the weight average molecular weight divided by the number average molecular weight, $M_w/M_n$. The z-average molecular weight distribution is $M_z/M_n$. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

Primary melting peak (° C.), heat of fusion (J/g), and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC Tm, heat of fusion, and crystallinity are reported from the $2^{nd}$ heating cycle.

The short chain branch frequency (SCB per 1000 carbon atoms) of the polyethylene composition was determined by Fourier Transform Infrared Spectroscopy (FTIR) as per the ASTM-D6645-01 method. A Thermo-Nicolet 750 Magna-IR Spectrophotometer equipped with OMNIC version 7.2a software was used for the measurements. Unsaturations in the polyethylene composition were also determined by Fourier Transform Infrared Spectroscopy (FTIR) as per ASTM-D3124-98. Comonomer content can also be measured using $^{13}C$ NMR techniques as discussed in Randall, Rev. Macromol. Chem. Phys., C29 (2&3), p 285; U.S. Pat. No. 5,292,845, and WO 2005/121239.

Polyethylene composition density (g/cm$^3$) was measured according to ASTM D792.

Hexane extractables were determined according to ASTM D5227.

Shear viscosity was measured by using a Kayeness WinKARS Capillary Rheometer (model #D5052M-115). For the shear viscosity at lower shear rates, a die having a die diameter of 0.06 inch and L/D ratio of 20 and an entrance angle of 180 degrees was used. For the shear viscosity at higher shear rates, a die having a die diameter of 0.012 inch and L/D ratio of 20 was used.

The "processability indicator" as used herein is defined as: Processability Indicator=100/η(10$^5$ s$^{-1}$, 240° C.); where η is the shear viscosity measured at 10$^5$ s$^{-1}$ at 240° C.

To determine CDBI(50), a solubility distribution curve is first generated for the polyethylene composition. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI(50) is determined by establishing the weight percentage of a copolymer sample that has a comonomer content within 50% of the median comonomer content on each side of the median (see WO 93/03093 and U.S. Pat. No. 5,376,439). The CDBI(25) is determined by establishing the weight percentage of a copolymer sample that has a comonomer content within 25% of the median comonomer content on each side of the median The temperature rising elution fractionation (TREF) method used herein was as follows. Polymer samples (50 to 150 mg) were introduced into the reactor vessel of a crystallization-TREF unit (Polymer Char™). The reactor vessel was filled with 20 to 40 ml 1,2,4-trichlorobenzene (TCB), and heated to the desired dissolution temperature (e.g., 150° C.) for 1 to 3 hours. The solution (0.5 to 1.5 ml) was then loaded into the TREF column filled with stainless steel beads. After equilibration at a given stabilization temperature (e.g., 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer Char software, Excel spreadsheet and TREF software developed in-house.

High temperature GPC equipped with an online FTIR detector (GPC-FTIR) was used to measure the comonomer content as the function of molecular weight.

Plaques molded from the polyethylene compositions were tested according to the following ASTM methods: Bent Strip Environmental Stress Crack Resistance (ESCR) at Condition B at 100% IGEPAL® CO-630 at 50° C., ASTM D1693; notched Izod impact properties, ASTM D256; Flexural Properties, ASTM D 790; Tensile properties, ASTM-D 638; Vicat softening point, ASTM-D 1525; Heat deflection temperature, ASTM-D 648.

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G''), complex modulus (G*) and complex viscosity ($\eta$*) were obtained as a function of frequency. The same rheological data can also be obtained by using a 25 mm diameter parallel plate geometry at 190° C. under nitrogen atmosphere.

The dimensional stability of the polyethylene compositions was determined as follows: A 150-ton×12-Oz Cincinnati Milacron injection molding machine (Hydradamp 150T 12 oz PC-111, serial #4001 A21/79-38) with a 2 inch (50.8 mm) screw was used to produce parts according to the conditions listed in Table 1. The mold was an ASTM test mold, which makes tensile test specimens with an overall length of 1.30 inches, an overall width of 0.75 inch, and a thickness of 0.12 inch; tensile test specimens with an overall length of 1.375 inch, an overall width of 0.375 inch, and a thickness of 0.12 inch; tensile test specimens with an overall length of 2.5 inch, an overall width of 0.375 inch, and a thickness of 0.12 inch; flexural modulus bars with a length of 5 inch, a width of 0.50 inch, and a thickness of either 0.12 inch or 0.75 inch, and an impact round disk with a diameter of 2 inch and a thickness of 0.12 inch. Immediately after molding, the injection-molded disk was removed from the runner (note: an injection molded disk with a 2 inch diameter and a thickness of 0.12 inches was used for measurements disclosed herein). The diameters in both the machine (or in-flow) direction (MD) and transverse-flow direction (TD) are then measured at room temperature (23±2° C.) after 1, 24, and 48 hours of molding. Shrinkage at time t is defined as the percentage change in dimension at measurement time from the original mold dimensions:

Shrinkage percent=(Mold dimension−Specimen dimension at time $t$)×100/Mold dimension Thus, MD shrinkage is the shrinkage measured on the disk in the flow direction, and Transverse direction (TD) shrinkage is the shrinkage measured in the cross-flow direction. Here, the isotropic shrinkage is defined as the equal shrinkage in both the flow direction (in-flow) and the transverse direction. Differential shrinkage is defined as TD shrinkage minus MD shrinkage (an indication of part planarity or flatness or the extent of part warpage). The smaller the difference it is, the better the part planarity. A TD/MD shrinkage ratio, the TD shrinkage divided by MD shrinkage, can also be used as a measure of the extent of isotropic shrinkage (the closer to unity it is, the better the part planarity). The molding parameters used are summarized in Table 1.

TABLE 1

| | |
|---|---|
| Barrel Temperature (° C.), feed Section | 215.5 |
| Barrel Temperature (° C.), Trans. Section | 237.8 |
| Barrel Temperature (° C.), Metering Section | 237.8 |
| Barrel Temperature (° C.), Nozzle | 237.8 |
| Injection Time-High (s) | 6 |
| Injection Time-Low (s) | 23 |
| Cooling Time (s) | 30 |
| Decompression Time (s) | 0.07 |
| Clamp Open Time (s) | 0.02 |
| Mold Close Time (s) | 60 |
| Cycle Time (s) | 62 |
| Screw Speed (rpm) | 20 |
| Injection rate | Max |
| Shot size (inch) | 1.5 |
| Cushion (inch) | 0.2 |
| Injection Pressure-High (psi) | 5250 |
| Injection Pressure-Low (psi) | 5000 |
| Back Pressure (psi) | 1000 |
| Clamp Pressure-High (psi) | 1850 |
| Clamp Pressure-Low (psi) | 1000 |
| Mold Temperature (° C.), represented by cooling water | 11.7 |
| Cycle | Auto |

Examples of the polyethylene compositions were produced in a dual reactor solution polymerization process in which the contents of the first reactor flow into the second reactor. This in-series "dual reactor" process produces an "in-situ" polyethylene blend (i.e., the polyethylene composition). Note, that when an in-series reactor configuration is used, un-reacted ethylene monomer, and un-reacted alpha-olefin comonomer present in the first reactor will flow into the downstream second reactor for further polymerization.

For the polyethylene compositions of Examples 1-6, although no co-monomer is fed directly to the downstream second reactor, an ethylene copolymer is nevertheless formed in second reactor due to the significant presence of un-reacted 1-octene flowing from the first reactor to the second reactor where it is copolymerized with ethylene. Each reactor is sufficiently agitated to give conditions in which components are well mixed. The volume of the first reactor was 12 liters and the volume of the second reactor was 22 liters. These are the pilot plant scales. The first reactor was operated at a pressure of 10500 to 35000 kPa and the second reactor was operated at a lower pressure to facilitate continuous flow from the first reactor to the second. The solvent employed was methylpentane. The process operates using continuous feed streams. The catalyst employed in the dual reactor solution process experiments was a phosphinimine catalyst, which was a titanium complex having a phosphinimine ligand (e.g., (tert-butyl)$_3$P=N), a cyclopentadienide ligand (e.g., Cp) and two activatable ligands, such as but not limited to chloride ligands (note: "activatable ligands" are removed, by for example electrophilic abstraction using a co-catalyst or activator to generate an active metal center). A boron based co-catalyst (e.g., Ph$_3$CB(C$_6$F$_5$)$_4$) was used in approximately stoichiometric amounts relative to the titanium complex. Commercially available methylaluminoxane (MAO) was included as a scavenger at an Al:Ti of about 40:1. In addition, 2,6-di-tert-butylhydroxy-4-ethylbenzene was added to scavenge free trimethylaluminum within the MAO in a ratio of Al:OH of about 0.5:1.

Polyethylene resins Examples A, B, and C are made using a single site phosphinimine catalyst in a dual reactor solution process in which all the comonomer is fed to the second reactor.

Polyethylene resin Example D is an injection molding grade believed to be an ethylene homopolymer made with a traditional polymerization catalyst (e.g., a Ziegler-Natta polymerization catalyst) and which is commercially available from INEOS as J60-800-178.

Polyethylene resin Example E is an injection molding grade polyethylene homopolymer, commercially available resin from NOVA Chemicals® as IG-454-A.

The polyethylene compositions of Examples 1-6 are made using a single site phosphinimine catalyst in a dual reactor solution process as described above and have an ESCR at condition B100 of greater than 3.5 hours and a SCB1/SCB2 ratio of greater than 1.0. Examples 1-6 also have a Mz value of less than 300,000.

The polymerization conditions used to make the polyethylene compositions are provided in Table 2.

Polyethylene composition properties are described in Tables 3.

Calculated properties for the first ethylene copolymer and the second ethylene copolymer for selected polyethylene compositions are provided in Table 4 (see "Copolymerization Reactor Modeling" below for methods).

The properties of pressed plaques made from polyethylene compositions are provided in Table 5.

Information on dimensional stability for polyethylene compositions resins is provided in Table 6.

Copolymerization Reactor Modeling

For multicomponent (or bimodal resins) polyethylene polymers with very low comonomer content, it can be difficult to reliably estimate the short chain branching (and subsequently polyethylene resin density by combining other information) of each polymer component by mathematical deconvolution of GPC-FTIR data, as was done in, for example, U.S. Pat. No. 8,022,143. Instead, the $M_w$, $M_n$, $M_z$, $M_w/M_n$, and the short chain branching per thousand carbons (SCB/1000C) of the first and second copolymers were calculated herein, by using a reactor model simulation using the input conditions which were employed for actual pilot scale run conditions (for references on relevant reactor modeling methods, see "Copolymerization" by A. Hamielec, J. MacGregor, and A. Penlidis in *Comprehensive Polymer Science and Supplements*, volume 3, Chapter 2, page 17, Elsevier, 1996 and "Copolymerization of Olefins in a Series of Continuous Stirred-Tank Slurry-Reactors using Heterogeneous Ziegler-Natta and Metallocene Catalysts. I. General Dynamic Mathematical Model" by J. B. P Soares and A. E Hamielec in *Polymer Reaction Engineering*, 4(2&3), p 153, 1996.) This type of model is considered reliable for the estimate of comonomer (e.g., 1-octene) content even at low comonomer incorporation levels, since the ethylene conversion, ethylene input flow and comonomer input flow can be obtained directly from the experimental conditions and because the reactive ratio (see below) can be reliably estimated for the catalyst systems disclosed herein. For clarity, the "monomer" or "monomer 1" represent ethylene, while the terms "comonomer" or "monomer 2", represent 1-octene.

The model takes for input the flow of several reactive species (e.g., catalyst, monomer such as ethylene, comonomer such as 1-octene, hydrogen, and solvent) going to each reactor, the temperature (in each reactor), and the conversion of monomer (in each reactor), and calculates the polymer properties (of the polymer made in each reactor, i.e., the first and second ethylene copolymers) using a terminal kinetic model for continuously stirred tank reactors (CSTRs) connected in series. The "terminal kinetic model" assumes that the kinetics depend upon the monomer unit within the polymer chain on which the active catalyst site is located (see "Copolymerization" by A. Hamielec, J. MacGregor, and A. Penlidis in *Comprehensive Polymer Science and Supplements*, Volume 3, Chapter 2, page 17, Elsevier, 1996). In the model, the copolymer chains are assumed to be of reasonably large molecular weight to ensure that the statistics of monomer/comonomer unit insertion at the active catalyst center is valid and that monomers/comonomers consumed in routes other than propagation are negligible. This is known as the "long chain" approximation.

The terminal kinetic model for polymerization includes reaction rate equations for activation, initiation, propagation, chain transfer, and deactivation pathways. This model solves the steady-state conservation equations (e.g., the total mass balance and heat balance) for the reactive fluid which includes the reactive species identified above.

The total mass balance for a generic CSTR with a given number of inlets and outlets is given by:

$$0 = \Sigma_i \dot{m}_i \quad (1)$$

where $\dot{m}_i$ represents the mass flow rate of individual streams with index i indicating the inlet and outlet streams.

Equation (1) can be further expanded to show the individual species and reactions:

$$0 = \frac{\sum_i m \dot{x}_{ij} / M_i}{\rho_{mix}^V} + R_j / \rho_{mix} \quad (2)$$

where $M_i$ is the average molar weight of the fluid inlet or outlet (i), $x_{ij}$ is the mass fraction of species j in stream i, $\rho_{mix}$ is the molar density of the reactor mixture, V is the reactor volume, $R_j$ is the reaction rate for species j, which has units of kmol/m$^3$s.

The total heat balance is solved for an adiabatic reactor and is given by:

$$0 = (\Sigma \dot{m}_i \Delta H_i + q_{Rx} V + \dot{W} - \dot{Q}) \quad (3)$$

where, $\dot{m}_i$ is the mass flow rate of stream i (inlet or outlet), $\Delta H_i$ is the difference in enthalpy of stream i versus a reference state, $q_{Rx}$ is the heat released by reaction(s), V is the reactor volume, $\dot{W}$ is the work input (i.e., agitator), $\dot{Q}$ is the heat input/loss.

The catalyst concentration input to each reactor is adjusted to match the experimentally determined ethylene conversion and reactor temperature values in order solve the equations of the kinetic model (e.g., propagation rates, heat balance, and mass balance).

The $H_2$ concentration input to each reactor may be likewise adjusted so that the calculated molecular weight distribution of a polymer made over both reactors (and, hence, the molecular weight of polymer made in each reactor) matches that which is observed experimentally.

The degree of polymerization (DPN) for a polymerization reaction is given by the ratio of the rate of chain propagation reactions over the rate of chain transfer/termination reactions:

$$DPN = \frac{k_{p11}\phi_1[m_1] + k_{p12}\phi_1[m_2] + k_{p21}\phi_2[m_2]}{k_{tm11}[m_1]\phi_1 + k_{tm12}[m_2]\phi_1 + k_{tm21}[m_2]\phi_2 + k_{ts2}\phi_1 + k_{ts2}\phi_2 + k_{tH1}[H] + k_{tH2}[H]} \quad (4)$$

where $k_{p12}$ is the propagation rate constant for adding monomer 2 to a growing polymer chain ending with monomer 1, $[m_1]$ is the molar concentration of monomer 1 (ethylene) in the reactor, $[m_2]$ is the molar concentration of monomer 2 (1-octene) in the reactor, $k_{tm12}$ the termination rate constant for chain transfer to monomer 2 for a growing chain ending with monomer 1, $k_{ts1}$ is rate constant for the spontaneous chain termination for a chain ending with monomer 1, $k_{tH1}$ is the rate constant for the chain termination by hydrogen for a chain ending with monomer 1. $\phi_1$ and $\phi_2$ and the fraction of catalyst sites occupied by a chain ending with monomer 1 or monomer 2 respectively.

The number average molecular weight (Mn) for a polymer follows from the degree of polymerization and the molecular weight of a monomer unit. From the number average molecular weight of polymer in each reactor, and assuming a Flory distribution for a single site catalyst, the molecular weight distribution is determined for the polymer formed in each reactor:

$$w(n) = \tau^2 n e^{-\tau n} \quad (5)$$

where $$\tau = \frac{1}{DPN},$$

and w(n) is the weight fraction of polymer having a chain length n.

The Flory distribution can be transformed into the common log scaled GPC trace by applying:

$$\frac{dW}{d\log(M)} = \ln(10)\frac{n^2}{DPN^2} e^{\left(-\frac{n}{DPN}\right)} \quad (6)$$

where $$\frac{dW}{d\log(MW)}$$

is the differential weight fraction of polymer with a chain length n (n=MW/28 where 28 is the molecular weight of the polymer segment corresponding to a $C_2H_4$ unit) and DPN is the degree of polymerization as calculated by Equation (4). From the Flory model, the $M_w$ and the $M_z$ of the polymer made in each reactor are: $M_w = 2 \times M_n$ and $M_z = 1.5 \times M_w$.

The overall molecular weight distribution over both reactors is simply the sum of the molecular weight distribution of polymer made in each reactor, and where each Flory distribution is multiplied by the weight fraction of polymer made in each reactor:

$$\frac{d\overline{W}}{d\log(MW)} = \quad (7)$$

-continued $$W_{R1}\left(\ln(10)\frac{n^2}{DPN_{R1}^2}e^{\left(-\frac{n}{DPN_{R1}}\right)}\right) + W_{R2}\left(\ln(10)\frac{n^2}{DPN_{R2}^2}e^{\left(-\frac{n}{DPN_{R2}}\right)}\right)$$

where $\overline{dW}/d\log(MW)$ is the overall molecular weight distribution function, $w_{R1}$ and $w_{R2}$ are the weight fraction of polymer made in each reactor, $DPN_1$ and $DPN_2$ is the average chain length of the polymer made in each reactor (i.e. $DPN_1 = M_{nR1}/28$). The weight fraction of material made in each reactor is determined from knowing the mass flow of monomer and comonomer into each reactor along with knowing the conversions for monomer and comonomer in each reactor.

The moments of the overall molecular weight distribution (or the molecular weight distribution of polymer made in each reactor) can be calculated using equations 8a, 8b and 8c (a Flory Model is assumed above, but the below generic formula apply to other model distributions as well):

$$\overline{M_n} = \frac{\sum_i w_i}{\sum_i \frac{w_i}{M_i}} \quad (8a)$$

$$\overline{M_w} = \frac{\sum_i w_i M_i}{\sum_i w_i} \quad (8b)$$

$$\overline{M_z} = \frac{\sum_i w_i M_i^2}{\sum_i w_i M_i} \quad (8c)$$

The comonomer content in the polymer product (in each reactor) may also be calculated using the terminal kinetic model and long chain approximations discussed above (see A. Hamielec, J. MacGregor, and A. Penlidis. Comprehensive Polymer Science and Supplements, volume 3, chapter Copolymerization, page 17, Elsevier, 1996).

For a given catalyst system, the comonomer (e.g., 1-octene) incorporation is a function of the monomer (e.g., ethylene) conversion, the comonomer to monomer ratio in the reactor (γ) and the reactivity ratio of monomer 1 (e.g., ethylene) over monomer 2 (e.g., 1-octene):

$$r_1 = k_{p11}/k_{p12}.$$

For a CSTR, the molar ratio of ethylene to comonomer in the polymer (Y) can be estimated knowing the reactivity ratio $r_1$ of the catalyst system and knowing the ethylene conversion in the reactor ($Q_{m1}$). A quadratic equation can be derived using the May and Lewis equation for instantaneous comonomer incorporation (see "Copolymerization" by A. Hamielec, J. MacGregor, and A. Penlidis in *Comprehensive Polymer Science and Supplements*, Volume 3, Chapter 2, page 17, Elsevier, 1996) and solving the mass balance around the reaction. The molar ratio of ethylene to 1-octene in the polymer is the negative root of the following quadratic equation:

$$-Y^2 \frac{\gamma}{4} + \left[r_1 + Q_{m1}(1 - r_1) + \frac{\gamma}{4}\right] Y - Q_{m1} = 0 \quad (9)$$

where Y is the molar ratio of ethylene to 1-octene in the polymer, γ is the mass flow ratio of 1-octene to ethylene going the reactor, $r_1$ is the reactivity ratio of monomer 1 to monomer 2 for the catalyst system ($r_1 = k_{p11}/k_{p12}$) and $Q_{m1}$ is the ethylene monomer fractional conversion.

The branching frequency can then be calculated knowing the molar ratio of monomer 1 to monomer 2 in the polymer:

$$BF = \frac{500}{Y + 1} \quad (10)$$

where Y, is the molar ratio of monomer 1 (ethylene) over monomer 2 (1-octene) in the polymer, and BF is the branching frequency (branches per 1000 carbon atoms).

The overall branching frequency distribution (BFD) of the ethylene composition can be calculated by knowing the molecular weight distribution and weight fraction of polymer made in each reactor, and the average branching frequency (BF) of the ethylene copolymer made in each reactor. The fraction of polymer made in each reactor can be calculated from the experimental mass flows and conversion of monomer and comonomer in each reactor. The branching frequency distribution function is obtained by calculating the average branch content for each molecular weight value of the overall molecular weight distribution function made from the two Flory distributions:

$$BF_{MW} = \frac{w_{R1} BF_{R1} F_1(MW_{R1}) + w_{R2} BF_{R2} F_2(MW_{R2})}{w_{R1} F_1(MW_{R1}) + w_{R2} F_2(MW_{R2})} \quad (11)$$

where $BF_{MW}$ is the branching at molecular weight (MW), $w_{R1}$ and $w_{R2}$ are the weight fraction of polymer made in Reactor 1 and Reactor 2, $BF_{R1}$ and $BF_{R2}$ are the average branching frequency of polymer made in R1 and R2 (from Equations 9 and 10), $F_1(MW_{R1})$ and $F_2(MW_{R2})$ are Flory distribution function from Reactor 1 and Reactor 2.

The overall branching frequency of the polyethylene composition is given by the weighted average of the branching frequency of the polymer made in each reactor:

$$BF_{avg} = w_1 BF_1 + w_2 BF_2 \quad (12)$$

where, $BF_{avg}$ is the average branching frequency for the total polymer (e.g. the polyethylene composition), $w_1$ and $w_2$ are the weight fraction of material made in each reactor, $BF_1$ and $BF_2$ are the branching frequency of material made in each reactor (e.g., the branching frequency of the first and second ethylene copolymers).

For the polymer obtained in each reactor, the resin parameters which can be obtained from the above described kinetic model are the molecular weights $M_n$, $M_w$, and $M_z$, the molecular weight distributions $M_w/M_n$ and $M_z/M_w$ and the branching frequency (SCB/1000 Cs). With this information in hand, a component (or composition) density model and a component (or composition) melt index, $I_2$, model was used according to the following equations, which were empirically determined, to calculate the density and melt index $I_2$ of each of the first and second ethylene copolymers:

Density:

$$\frac{1}{\rho} = 1.0142 + 0.0033(1.22 \cdot BF)^{0.8346} + \frac{0.0303 k^{0.9804}}{1 + \frac{0.3712}{e^{1.22 BF}}}$$

where, BF is the branching frequency, $k = \text{Log}_{10}(M_n/1000)$

Melt Index, $I_2$ (MI):

$$\text{Log}_{10}(MI) = 7.8998 - 3.9089 \text{Log}_{10}\left(\frac{M_w}{1000}\right) - 0.2799 \frac{M_n}{M_w}$$

Hence, the above models were used to estimate the branch frequency, weight fraction (or weight percent), melt index $I_2$, and the density of the polyethylene composition components, which were formed in each of reactor 1 and 2 (i.e. the first and second ethylene copolymers).

TABLE 2

Reactor Conditions for Examples

| | Example No. | | | | | |
|---|---|---|---|---|---|---|
| | Example 1 | Example 2 | Example 3 | Example 4 | Example 5 | Example 6 |
| Reactor 1 | | | | | | |
| Ethylene (kg/h) | 40.4 | 35.7 | 35.6 | 35.6 | 35.7 | 24.5 |
| Octene (kg/h) | 1.7 | 1.5 | 1.9 | 1.4 | 2 | 0.6 |
| Hydrogen (g/h) | 1.04 | 0.7 | 0.6 | 0.6 | 0.7 | 0.4 |
| Solvent (kg/h) | 282 | 252.8 | 252.5 | 253.1 | 252.3 | 171 |
| Reactor feed inlet temperature (° C.) | 30 | 30 | 30 | 30 | 30 | 30 |

TABLE 2-continued

Reactor Conditions for Examples

| | Example 1 | Example 2 | Example 3 | Example 4 | Example 5 | Example 6 |
|---|---|---|---|---|---|---|
| Reactor Temperature (° C.) | 163 | 162.3 | 162 | 161.7 | 162 | 162 |
| Catalyst (ppm) | 0.1 | 0.11 | 0.12 | 0.12 | 0.14 | 0.12 |
| Reactor 2 | | | | | | |
| Ethylene (kg/h) | 40.4 | 43.6 | 43.6 | 43.5 | 43.5 | 57 |
| Octene (kg/h) | 0 | 0 | 0 | 0 | 0 | 0 |
| Hydrogen (g/h) | 14.30 | 13.90 | 19.20 | 11.50 | 14.30 | 6.6 |
| Solvent (kg/h) | 102 | 132 | 131 | 131 | 131 | 222 |
| Reactor feed inlet temperature (° C.) | 30 | 30 | 30 | 30 | 30 | 30 |
| Reactor Temperature (° C.) | 205 | 202 | 202 | 202 | 202 | 203 |
| Catalyst (ppm) | 0.72 | 0.56 | 0.59 | 0.56 | 0.57 | 0.42 |

TABLE 3

Resin Properties

| | Ex. 1 | Ex. 2 | Ex. 3 | Ex. 4 | Ex. 5 | Ex. 6 |
|---|---|---|---|---|---|---|
| Density (g/cm$^3$) | 0.9569 | 0.955 | 0.9575 | 0.9559 | 0.9555 | 0.9555 |
| Rheology/Flow Properties | | | | | | |
| Melt Index $I_2$ (g/10 min) | 7.66 | 7.21 | 7.29 | 4.54 | 7.17 | 8.1 |
| $I_5$ | | 21.9 | | 13.2 | | 23.5 |
| $I_{21}$ | 239 | 237 | 312 | 171 | 268 | 228 |
| Melt Flow Ratio ($I_{21}/I_2$) | 31.2 | 32.8 | 42.8 | 37.8 | 37.4 | 28.9 |
| Stress Exponent | 1.28 | 1.31 | 1.35 | 1.32 | 1.33 | 1.32 |
| Shear Viscosity ($\eta$) at $10^5$ s$^{-1}$ (240° C., Pa-s) | 5.9 | 6.3 | 4.8 | 6.2 | 5.6 | 6.9 |
| 100/$\eta$ at $10^5$ s$^{-1}$ (240° C.), Processability Indicator | 16.95 | 15.87 | 20.83 | 16.13 | 17.86 | 14.49 |
| Shear viscosity Ratio ($\eta_{100}/\eta_{100000}$, 240° C.) | 66.4 | 60.9 | 79.6 | 84.5 | 70 | 51.78 |
| GPC | | | | | | |
| $M_n$ | 13088 | 16127 | 11001 | 16505 | 14020 | 23319 |
| $M_w$ | 61162 | 59330 | 57976 | 68596 | 58484 | 63204 |
| $M_z$ | 153222 | 144200 | 163371 | 187835 | 149424 | 148799 |
| Polydispersity Index ($M_w/M_n$) | 4.67 | 3.68 | 5.27 | 4.16 | 4.17 | 2.71 |
| TREF | | | | | | |
| CDBI (50) | 71.1 | 80.3 | 72 | 79.5 | 78 | 78.9 |
| CDBI (25) | 59.5 | 70.6 | 62.4 | 68.1 | 68.7 | 67.2 |
| Branch Frequency - FTIR (uncorrected for chain end —CH$_3$) | | | | | | |
| Uncorrected SCB/1000 C | 1.7 | 1.4 | 2.1 | 1.5 | 1.8 | 0.9 |
| Uncorrected comonomer content (mol %) | 0.3 | 0.3 | 0.4 | 0.3 | 0.4 | 0.2 |
| Comonomer ID | 1-octene | 1-octene | 1-octene | 1-octene | 1-octene | 1-octene |
| Terminal unsaturation/1000 C | 0.21 | 0.08 | 0.09 | 0.09 | 0.08 | 0.12 |
| Internal unsaturation/1000 C | 0.09 | 0.16 | 0.13 | 0.14 | 0.14 | 0.11 |
| Side chain unsaturation/1000 C | 0 | 0.01 | 0.01 | 0.00 | 0.01 | 0 |
| Total unsaturations/1000 C | 0.30 | 0.25 | 0.23 | 0.23 | 0.23 | 0.23 |

TABLE 3-continued

| Resin Properties | | | | | | |
|---|---|---|---|---|---|---|
| Comonomer mol % measured by $^{13}$C-NMR | | | | | | |
| Hexyl+ branches (>=4 C atoms), mol % | | 0.29 | | 0.31 | | |
| DSC | | | | | | |
| Primary Melting Peak (° C.) | 129.77 | 129.72 | 129.71 | 130.0 | 129.46 | 131.5 |
| Heat of Fusion (J/g) | 217.6 | 214.2 | 218.8 | 216.4 | 215.7 | 215.6 |
| Crystallinity (%) | 75.04 | 73.88 | 75.44 | 74.63 | 74.37 | 74.33 |
| Hexane Extractables (%) | 0.33 | | | | | |

| | Resin | | | | |
|---|---|---|---|---|---|
| | Example A | Example B | Example C | Example D | Example E |
| Density (g/cm$^3$) | 0.9584 | 0.9585 | 0.9591 | 0.960 | 0.9540 |
| Rheology/Flow Properties | | | | | |
| Melt Index I$_2$ (g/10 min) | 7.18 | 7.51 | 8.56 | 8.52 | 9.00 |
| I$_5$ | | | | | |
| I$_{21}$ | 229 | 234 | 258 | 222 | 191 |
| Melt Flow Ratio (I$_{21}$/I$_2$) | 32 | 31.2 | 30.1 | 26.1 | 21.2 |
| Stress Exponent | 1.28 | 1.27 | 1.26 | 1.29 | 1.22 |
| Shear Viscosity ($\eta$) at 10$^5$ s$^{-1}$ (240° C., Pa-s) | 5.8 | 5.7 | | 6.9 | 7.9 |
| 100/$\eta$ at 10$^5$ s$^{-1}$ (240° C.), Processability Indicator | 17.24 | 17.54 | | 14.49 | 12.66 |
| Shear viscosity Ratio ($\eta_{100}/\eta_{100000}$, 240° C.) | | | | 54.6 | 47.9 |
| GPC | | | | | |
| M$_n$ | 14526 | 13771 | 13469 | 17022 | 20519 |
| M$_w$ | 64533 | 62612 | 59226 | 63567 | 59812 |
| M$_z$ | 166380 | 157914 | 144926 | 181472 | 140168 |
| Polydispersity Index (M$_w$/M$_n$) | 4.44 | 4.55 | 4.40 | 3.73 | 2.91 |
| TREF | | | | | |
| CDBI (50) | 46.6 | 45.2 | — | 68.5 | 74.6 |
| CDBI (25) | 32.4 | 29.4 | — | 53.6 | 50.7 |
| Branch Frequency - FTIR (uncorrected for chain end —CH$_3$) | | | | | |
| Uncorrected SCB/1000 C | 2.0 | 2 | | | 1.0 |
| Uncorrected comonomer content (mol %) | 0.4 | 0.4 | <0.1 | | 0.2 |
| Comonomer ID | 1-octene | 1-octene | 1-octene | 1-butene | 1-octene |
| Terminal unsaturation/1000 C | 0.16 | 0.12 | 0.14 | 0.17 | 0.50 |
| Internal unsaturation/1000 C | 0.08 | 0.09 | 0.08 | 0.04 | 0 |
| Side chain unsaturation/1000 C | 0.01 | 0.01 | 0.01 | 0 | 0.01 |
| Total unsaturations/1000 C | 0.25 | 0.22 | 0.23 | 0.21 | 0.51 |
| Total unsaturations per number average molecule | 0.26 | 0.22 | 0.22 | 0.26 | 0.75 |
| Comonomer mol % measured by $^{13}$C-NMR | | | | | |
| Hexyl+ branches (>=4 carbon atoms), mol % | — | — | — | — | — |
| DSC | | | | | |
| Primary Melting Peak (° C.) | 130.79 | 130.02 | | 132.3 | 130.8 |
| Heat of Fusion (J/g) | 220.9 | 220.3 | | 217.9 | 208.7 |
| Crystallinity (%) | 76.17 | 75.96 | | 75.14 | 72.0 |
| Hexane Extractables (%) | 0.44 | 0.38 | 0.37 | | |

TABLE 4

| Polyethylene Component Properties | | | | | | |
|---|---|---|---|---|---|---|
| | Resin | | | | | |
| | Ex. 1 | Ex. 2 | Ex. 3 | Ex. 4 | Ex. 5 | Ex. 6 |
| Density (g/cm$^3$) | 0.9569 | 0.955 | 0.9575 | 0.9559 | 0.9555 | 0.9559 |
| $I_2$ (g/10 min.) | 7.66 | 7.21 | 7.29 | 4.54 | 7.17 | 8.2 |
| Stress Exponent | 1.28 | 1.31 | 1.35 | 1.32 | 1.33 | 1.31 |
| MFR ($I_{21}/I_2$) | 31.2 | 32.8 | 42.8 | 37.8 | 37.4 | 28.6 |
| Mw/Mn | 4.67 | 3.68 | 5.27 | 4.16 | 4.17 | 2.71 |
| First Ethylene Polymer | | | | | | |
| Weight fraction | 0.5 | 0.48 | 0.48 | 0.47 | 0.47 | 0.32 |
| Mw | 107939 | 101355 | 109586 | 117645 | 105809 | 125184 |
| $I_2$ (g/10 min.) | 0.65 | 0.83 | 0.61 | 0.46 | 0.70 | 0.36 |
| Density, d1 (g/cm$^3$) | 0.9421 | 0.9414 | 0.9395 | 0.9420 | 0.9402 | 0.9426 |
| SCB1/1000 C | 0.66 | 0.8 | 0.93 | 0.59 | 0.88 | 0.48 |
| Second Ethylene Polymer | | | | | | |
| Weight fraction | 0.5 | 0.52 | 0.52 | 0.53 | 0.53 | 0.68 |
| Mw | 15056 | 19854 | 12425 | 19110 | 15903 | 32391 |
| $I_2$ (g/10 min.) | 1433 | 486 | 3036 | 564 | 1157 | 72 |
| Density, d2 (g/cm$^3$) | 0.9630 | 0.9615 | 0.9653 | 0.9621 | 0.9626 | 0.9593 |
| SCB2/1000 C | 0.49 | 0.34 | 0.43 | 0.31 | 0.47 | 0.111 |
| Estimated (d2 − d1), g/cm$^3$ | 0.021 | 0.020 | 0.026 | 0.020 | 0.022 | 0.017 |
| Estimated SCB1/SCB2 | 1.35 | 2.35 | 2.16 | 1.90 | 1.87 | 4.32 |

| | Resin | | |
|---|---|---|---|
| | Example A | Example B | Example C |
| Density (g/cm$^3$) | 0.9584 | 0.9585 | 0.9591 |
| $I_2$ (g/10 min.) | 7.18 | 7.51 | 8.56 |
| Stress Exponent | 1.28 | 1.27 | 1.26 |
| MFR ($I_{21}/I_2$) | 32 | 31.2 | 30.1 |
| Mw/Mn | 4.44 | 4.55 | 4.4 |
| First Ethylene Polymer | | | |
| Weight fraction | 0.5 | 0.5 | 0.5 |
| Mw | 110512 | 108978 | 103442 |
| $I_2$ (g/10 min.) | 0.59 | 0.63 | 0.77 |
| Density, d1 (g/cm$^3$) | 0.9503 | 0.9504 | 0.9509 |
| SCB1/1000 C | 0 | 0 | 0 |
| Second Ethylene Polymer | | | |
| Weight fraction | 0.5 | 0.5 | 0.5 |
| Mw | 14593 | 14618 | 14581 |
| $I_2$ (g/10 min.) | 1619 | 1608 | 1625 |
| Density, d2 (g/cm$^3$) | 0.9552 | 0.9553 | 0.9553 |
| SCB2/1000 C | 2.1 | 2.07 | 2.07 |
| Estimated (d2 − d1), g/cm$^3$ | 0.005 | 0.005 | 0.004 |
| Estimated SCB1/SCB2 | 0.00 | 0.00 | 0.00 |

TABLE 5

| Plaque Properties | | | | | |
|---|---|---|---|---|---|
| Resin | Ex. 1 | Ex. 2 | Ex. 3 | Ex. 4 | Ex. 5 |
| Environmental Stress Crack Resistance | | | | | |
| ESCR Cond. B at 100% (hrs.) | 4 | 5 | 6 | 7 | 5 |
| Flexural Properties (Plaques) | | | | | |
| Flex Secant Mod. 1% (MPa) | 1352 | 1369 | 1460 | 1352 | 1308 |
| Flex Sec Mod 1% (MPa) Dev. | 58 | 37 | 33 | 76 | 51 |
| Flex Secant Mod. 2% (MPa) | 1135 | 1151 | 1245 | 1152 | 1114 |
| Flex Sec Mod 2% (MPa) Dev. | 35 | 18 | 17 | 52 | 34 |
| Flexural Strength (MPa) | 39.5 | 40.1 | 42.5 | 40.2 | 39.2 |
| Flexural Strength Dev. (MPa) | 0.4 | 0.4 | 0.5 | 1.1 | 0.7 |

TABLE 5-continued

Plaque Properties

Tensile Properties (Plaques)

| | | | | | |
|---|---|---|---|---|---|
| Elongation at Yield (%) | 8 | 9 | 8 | 9 | 8 |
| Elongation at Yield Dev. (%) | 0 | 0 | 1 | 0 | 0 |
| Yield Strength (MPa) | 28.2 | 29.6 | 31 | 29.8 | 29.8 |
| Yield Strength Dev. (MPa) | 0.8 | 0.2 | 0.1 | 0.2 | 0.2 |
| Ultimate Elongation (%) | 1018 | 1033 | 491 | 1042 | 995 |
| Ultimate Elongation Dev. (%) | 39 | 36 | 523 | 105 | 32 |
| Ultimate Strength (MPa) | 18.8 | 18.8 | 20 | 23.4 | 19.1 |
| Ultimate Strength Dev. (MPa) | 0.8 | 0.9 | 4.7 | 4.4 | 0.6 |
| Sec Mod 1% (MPa) | 1702 | 1372 | 1644 | 1505 | 1531 |
| Sec Mod 1% (MPa) Dev. | 222 | 81 | 143 | 94 | 111 |
| Sec Mod 2% (MPa) | 1077 | 1022 | 1135 | 1069 | 1065 |
| Sec Mod 2% (MPa) Dev. | 67 | 47 | 57 | 37 | 19 |

Impact Properties (Plaques)

| | | | | | |
|---|---|---|---|---|---|
| Notched Izod Impact (ft-lb/in) | 0.8 | 0.9 | 0.8 | 1 | 0.9 |
| Notched Izod Impact (J/m) | 42.72 | 48.06 | 42.72 | 53.4 | 48.06 |

| Resin | Example A | Example B | Example C | Example D | Example E |
|---|---|---|---|---|---|
| Environmental Stress Crack Resistance | | | | | |
| ESCR Cond. B at 100% (hrs.) | 1 | 1 | 1 | 5 | 5 |
| Flexural Properties (Plaques) | | | | | |
| Flex Secant Mod. 1% (MPa) | 1349 | 1374 | | | 1280 |
| Flex Sec Mod 1% (MPa) Dev. | 65 | 49 | | | 62 |
| Flex Secant Mod. 2% (MPa) | 1142 | 1149 | | | 1083 |
| Flex Sec Mod 2% (MPa) Dev. | 43 | 33 | | | 50 |
| Flexural Strength (MPa) | 40.4 | 40.6 | | | 37.9 |
| Flexural Strength Dev. (MPa) | 0.7 | 0.6 | | | 1 |
| Tensile Properties (Plaques) | | | | | |
| Elongation at Yield (%) | 9 | 8 | | | 10 |
| Elongation at Yield Dev. (%) | 0 | 1 | | | 1 |
| Yield Strength (MPa) | 29 | 29.1 | | | 27.9 |
| Yield Strength Dev. (MPa) | 0.4 | 0.3 | | | 0.5 |
| Ultimate Elongation (%) | 450 | 11 (very brittle failure) | | | 1433 |
| Ultimate Elongation Dev. (%) | 165 | 1 | | | 200 |
| Ultimate Strength (MPa) | 14.8 | 29.1 (very brittle failure) | | | 23.9 |
| Ultimate Strength Dev. (MPa) | 0.9 | 0.3 | | | 3.7 |
| Sec Mod 1% (MPa) | 1728 | 1405 | | | 1263 |
| Sec Mod 1% (MPa) Dev. | 292 | 359 | | | 404 |
| Sec Mod 2% (MPa) | 1106 | 1038 | | | 904 |
| Sec Mod 2% (MPa) Dev. | 69 | 102 | | | 116 |
| Impact Properties (Plaques) | | | | | |
| Notched Izod Impact (ft-lb/in) | 0.6 | 0.6 | | | 1 |
| Notched Izod Impact (J/m) | 32.04 | 32.04 | | | 53.4 |

TABLE 6

Dimensional Stability

| | Resin | | | | | | | |
|---|---|---|---|---|---|---|---|---|
| | Ex. 1 | Ex. 2 | Ex 3 | Ex. 4 | Ex. 5 | Ex. 6 | Example D | Example E |
| TD shrinkage, IM disk, 48 hr. | 1.67 | 1.87 | 1.93 | 1.71 | 1.79 | 1.84 | 1.82 | 1.69 |
| MD shrinkage, IM disk, 48 hr. | 1.62 | 1.72 | 1.93 | 1.77 | 1.77 | 1.89 | 1.68 | 1.31 |
| (TD shrinkage − MD shrinkage), IM disk, 48 hr. | 0.05 | 0.15 | 0 | −0.06 | 0.02 | −0.05 | 0.14 | 0.38 |
| TD/MD shrinkage ratio, isotropy indicator, IM disk, 48 hr. | 1.03 | 1.09 | 1.00 | 0.97 | 1.09 | 0.97 | 1.08 | 1.29 |

Figure 8:
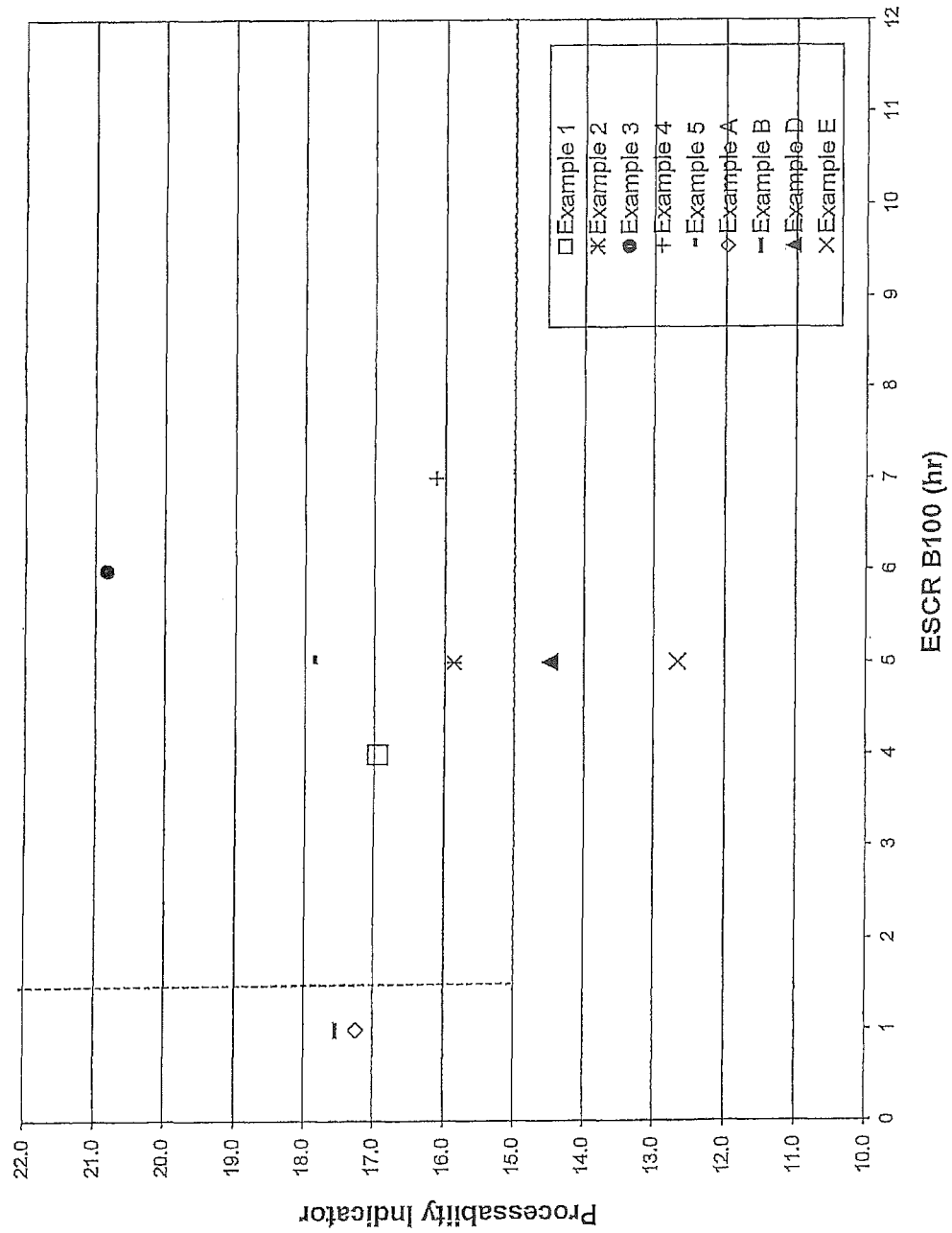
FIG. 8 shows the balance of processability and environmental stress cracking resistance (ESCR) for various polyethylene compositions and other resins as demonstrated by a plot of the processability indicator ($100/\eta$ at $10^5$ s$^{-1}$ and 240° C.) against the ESCR B100.
Figure 9:
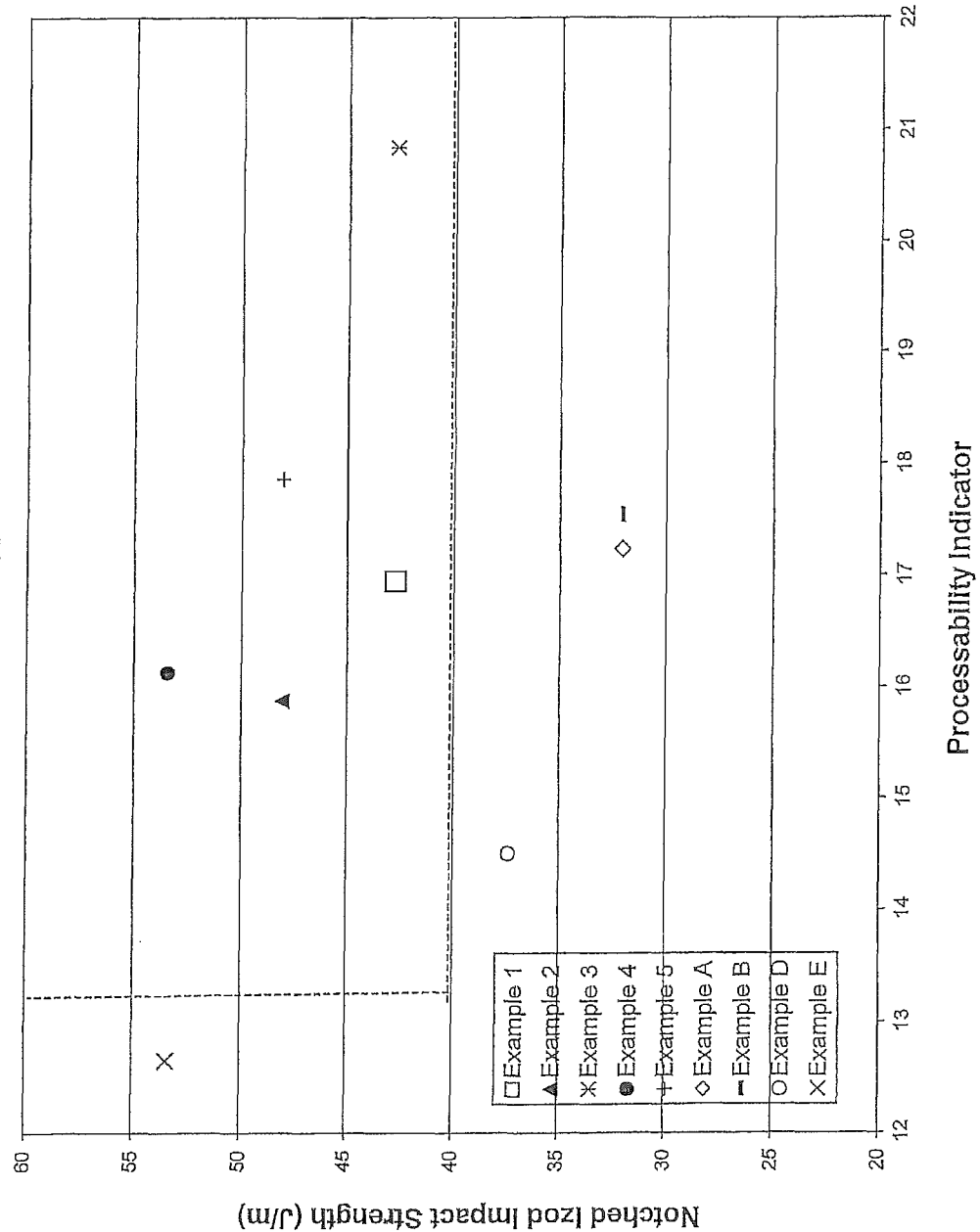
FIG. 9 shows the balance of processability and impact strength for various polyolefin compositions and other resins as demonstrated by a plot of the Notched Izod Impact Strength (J/m) against the processability indicator ($100/\eta$ at $10^5$ s$^{-1}$ and 240° C.).
Figure 10:
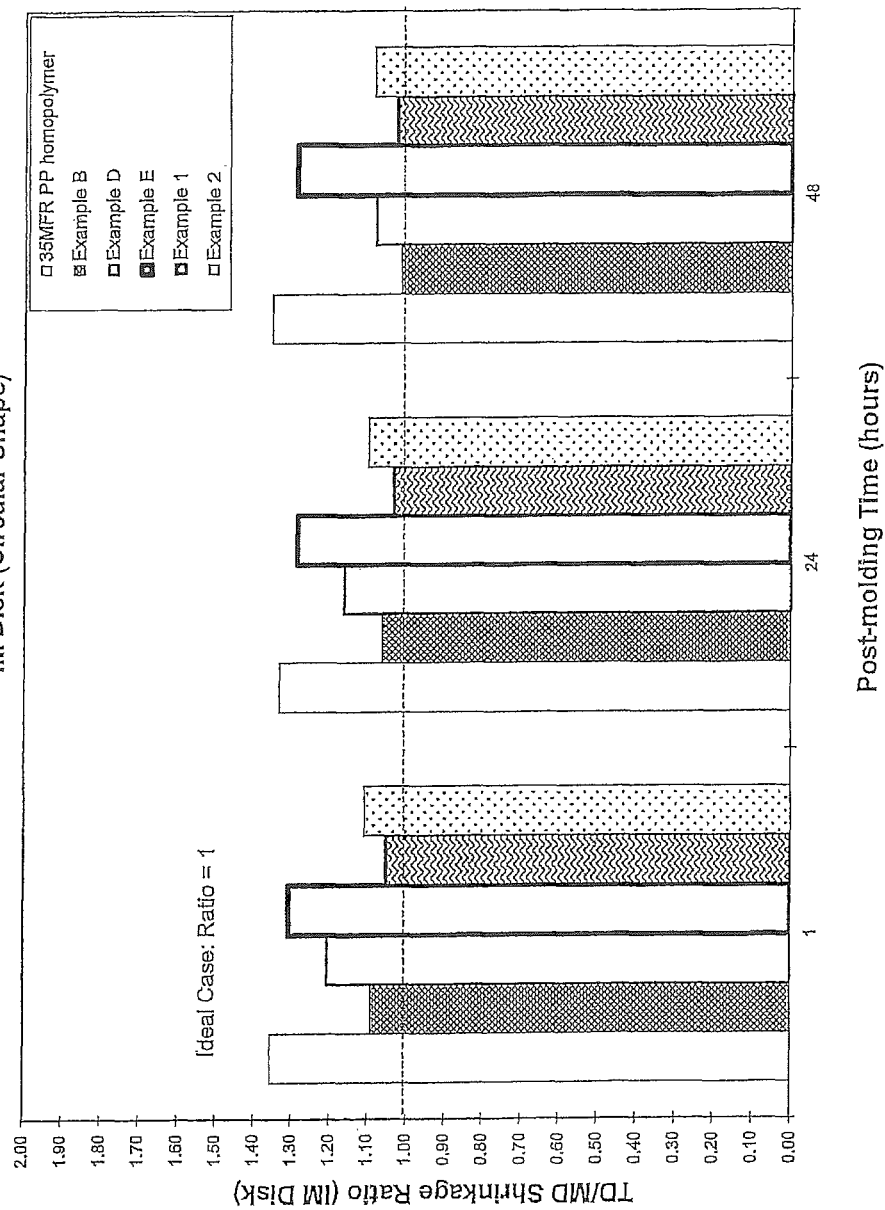
FIG. 10 shows a graph of the dimensional stability of various polyolefin compositions and other resins, where dimensional stability is demonstrated by a plot of the TD/MD shrinkage ratio (for an injection molded disk of circular shape) against post-molding time (in hours).

As can be seen from the data provided in Tables 3-6 and FIGS. 8-10, the polyethylene compositions Example 1-6 have very good dimensional stability, are easy to process (e.g., have good injectability when making an injection molded part), show good organoleptic properties and impact resistance and have useful ESCR for applications such as bottle closure assemblies. For example, FIG. 8 shows that relative to polyethylene resins A, B, D (J60-800-178) and E (IG454-A), the polyethylene compositions 1-5 have an improved balance of processability and ESCR. Also, as shown in FIG. 9, the polyethylene compositions 1-5 have a better balance of processability and impact strength when compared to polyethylene resins A, B, D (J60-800-178) and E (IG454-A). The processability comparison is made on the basis of a "processability indicator," which as used herein, is defined as $100/\eta$ at $10^5$ s$^{-1}$ (240° C.), where $\eta$ is the Shear Viscosity ($\eta$) at $10^5$ s$^{-1}$ (240° C., Pa-s) as defined above.

FIG. 10 shows that polyethylene compositions 1 and 2 have a better dimensional stability (the TD/MD shrinkage isotropy indicator) than a polypropylene homopolymer having a melt flow rate of 35 g/10 min (tested at 230° C. under 2.16 kg). Also polyethylene compositions 1 and 2 have comparable or better dimensional stability than the polyethylene resin D (J60-800-178) and E (IG454-A).

Figure 11:
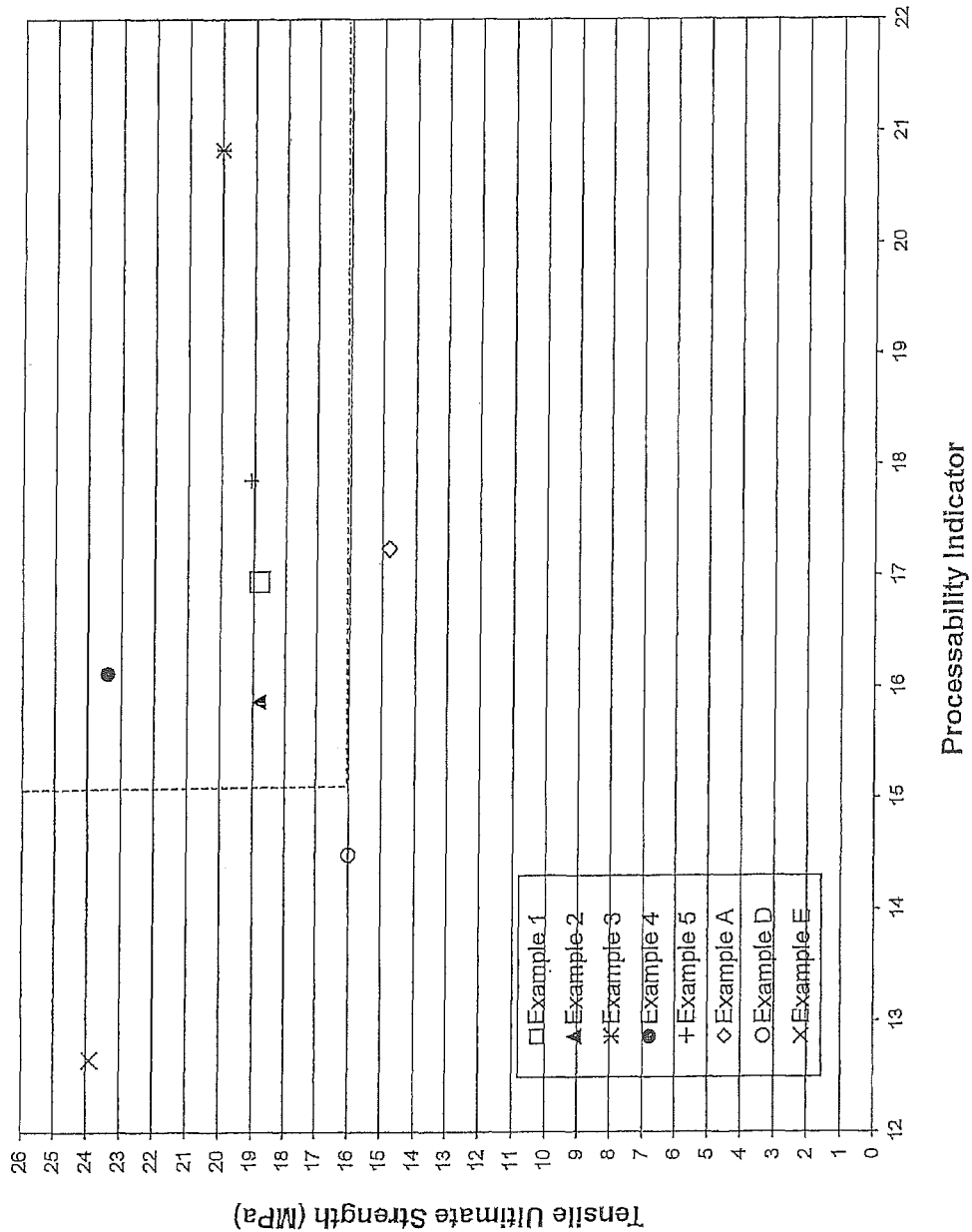
FIG. 11 shows the balance of tensile strength and processability for various polyolefin compositions and other resins as demonstrated by a plot of the tensile ultimate strength (MPa) against the processability indicator ($100/\eta$ at $10^5$ s$^{-1}$ and 240° C.).
Figure 12:
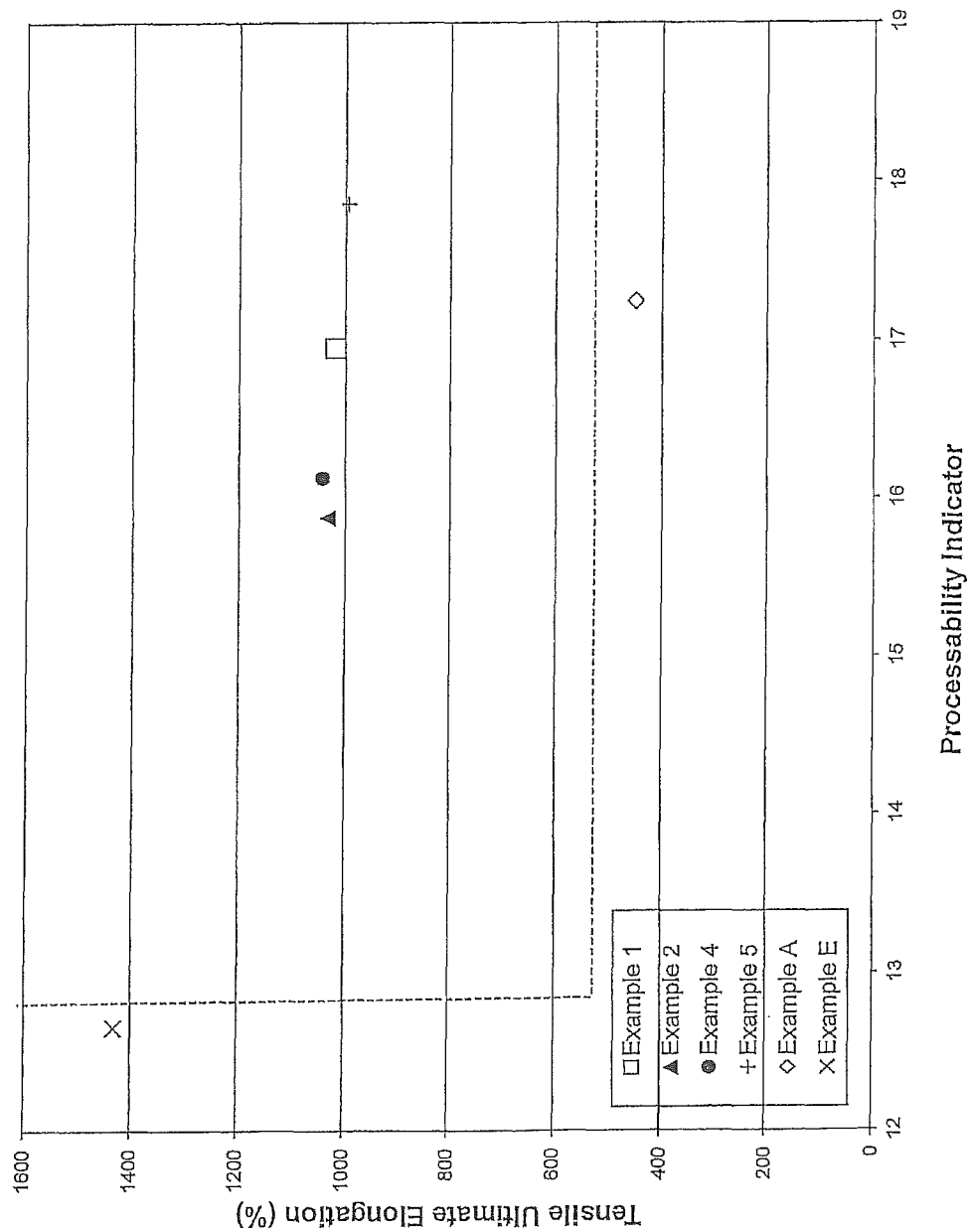
FIG. 12 shows the balance of tensile elongation and processability for various polyolefin compositions and other resins as demonstrated by a plot of the tensile ultimate elongation (in percent) against the processability indicator ($100/\eta$ at $10^5$ s$^{-1}$ and 240° C.).

FIGS. 11 and 12 show that the compositions 1-5 have a good balance of tensile strength or tensile elongation and processability (as indicated by the "processability indicator") when compared to polyethylene resins A, D, and E. Without wishing to be bound by theory, a plastic material having good processability while at the same time having high tensile strength and elongation at break would be useful in the manufacture of a closure assembly where a tether portion should be strong enough to withstand normal use and resist abuse without breaking or deforming inappropriately.

Table 6 shows that polyethylene compositions 1-6 generally have better dimensional stability than resins D and E. Compare, for example, polyethylene compositions 1, 2, 3, 4, 5, and 6 which have a TD shrinkage—MD shrinkage of 0.05, 0.15, 0, −0.06, 0.02, and −0.05 respectively with resins D and E which have a TD shrinkage—MD shrinkage of 0.14 and 0.38 respectively. Also compare the TD/MD shrinkage ratio (the indicator of isotropy) for polyethylene compositions 1, 2, 3, 4, 5, and 6 at 1.03, 1.09, 1, 0.97, 1.09, and 0.97 respectively which are all fairly close to 1, with the TD/MD shrinkage ratio (the indicator of isotropy) for polyethylene resins D and E which are 1.08 and 1.29 respectively.

Four additional polyethylene compositions (Examples 7A, 7B, 8, and 9) were made using a single site phosphinimine catalyst in a dual reactor solution process. Examples 7A and 7B were made substantially as described above for Examples 1-6. Examples 8 and 9 were made using the conditions provided below in Table 7. Each of the Examples 7A, 7B, 8, and 9 have an ESCR (Condition B at 100% IGEPAL® CO-630 at 50° C.) of greater than 3.5 hours and a SCB1/SCB2 ratio of greater than 1.0. These examples also have a Mz value of less than 300,000. Examples 7A and 7B have a density of 0.957 g/cm$^3$, a melt index $I_2$ of less than 10 g/10 min, a melt flow ratio $I_{21}/I_2$ ratio of less than 41. Example 8 has a density of 0.954 g/cm$^3$, a melt index $I_2$ of less than 10 g/10 min and a melt flow ratio $I_{21}/I_2$ ratio of less than 41. Example 9 has a density of 0.955 g/cm$^3$, a melt index $I_2$ of 7.6 g/10 min, and a melt flow ratio $I_{21}/I_2$ of 42.4. Table 8 provides further polymer information and plaque data for Examples 7, 8, and 9. Table 9 provides the first and second ethylene copolymer component properties calculated for Examples 7A, 8, and 9 (see "Copolymerization Reactor Modeling" above for methods).

TABLE 7

Reactor Conditions

| Example | 8 | 9 |
|---|---|---|
| Reactor 1 | | |
| Ethylene (kg/h) | 37.16 | 38.07 |
| Octene (kg/h) | 1.00 | 2.02 |
| Hydrogen (g/h) | 0.68 | 0.70 |
| Solvent (kg/h) | 303.40 | 312.68 |
| Reactor feed inlet temperature (° C.) | 35.00 | 30.00 |
| Reactor Temperature (° C.) | 162.90 | 163.99 |
| Catalyst-Fresh Ti Feed to R1 (ppm) | 0.10 | 0.02 |
| Reactor 2 | | |
| Ethylene (kg/h) | 45.40 | 46.53 |
| Fresh Octene (kg/h) | 0.00 | 0.00 |
| Hydrogen (g/h) | 7.46 | 12.35 |
| Solvent (kg/h) | 186.80 | 188.65 |
| Reactor feed inlet temperature (° C.) | 35.00 | 31.02 |
| Reactor Temperature (° C.) | 202.50 | 202.63 |
| Catalyst-Fresh Ti Feed to R1 (ppm) | 0.05 | 0.06 |

TABLE 8

Polymer and Polymer Plaque Properties

| Example | 7A | 7B | 8 | 9 |
|---|---|---|---|---|
| Density (g/cm$^3$) | 0.957 | 0.957 | 0.9542 | 0.955 |
| Rheology/Flow Properties | | | | |
| Melt Index $I_2$ (g/10 min) | 7 | 7 | 7.28 | 7.55 |
| Melt Flow Ratio ($I_{21}/I_2$) | 34.4 | 36 | 32.4 | 42.4 |
| Stress Exponent | 1.30 | 1.29 | 1.35 | 1.38 |
| Shear Viscosity ($\eta$) at $10^5$ s$^{-1}$ (240° C., Pa-s) | 5.80 | 6.1 | 6.50 | 5.3 |
| Shear viscosity Ratio ($\eta_{100}/\eta_{100000}$, 240° C.) | 69.38 | 67.4 | 55.77 | 65.75 |
| GPC-conventional | | | | |
| $M_n$ | 17097 | 14710 | 21908 | 13852 |
| $M_w$ | 63337 | 63008 | 63412 | 61543 |
| $M_z$ | 154296 | 157796 | 146082 | 180184 |
| Polydispersity Index ($M_w/M_n$) | 3.70 | 4.28 | 2.89 | 4.44 |
| $M_z/M_w$ | 2.44 | 2.50 | 2.30 | 2.93 |

TABLE 8-continued

Polymer and Polymer Plaque Properties

| Example | 7A | 7B | 8 | 9 |
|---|---|---|---|---|
| Branch Frequency-FTIR (uncorrected for chain end —$CH_3$) | | | | |
| Uncorrected SCB/1000C | 1.4 | 1.7 | 1.3 | 1.7 |
| Uncorrected comonomer content (mol %) | 0.28 | 0.30 | 0.26 | 0.34 |
| Internal unsaturation (/1000C) | 0.050 | 0.05 | 0.09 | 0.07 |
| Side chain unsaturation (/1000C) | 0.010 | 0 | 0 | 0 |
| Terminal unsaturation (/1000C) | 0.100 | 0.10 | 0.14 | 0.12 |
| Comonomer ID | 1-octene | 1-octene | 1-octene | 1-octene |
| TREF | | | | |
| $CDBI_{50}$ (%) | 73.2 | 74.3 | 84.2 | 78.2 |
| $CDBI_{25}$ (%) | 60.9 | 62 | 74.8 | 67.6 |
| DSC | | | | |
| Primary Melting Peak (° C.) | 131.7 | 129.98 | 130.34 | 129.45 |
| Heat of Fusion (J/g) | 225.50 | 224.2 | 211.80 | 220.7 |
| Crystallinity (%) | 77.77 | 77.30 | 73.03 | 76.10 |
| Environmental Stress Crack Resistance | | | | |
| ESCR Cond. B at 100% (hrs) | 5 | 6 | 4 | 4 |
| ESCR Cond. B at 10% (hrs) | 3 | 3 | | |
| Flexural Properties (Plaques) | | | | |
| Flex Secant Mod. 2% (MPa) | 1209 | 1170 | 1051 | 1133 |
| Impact Properties (Plaques) | | | | |
| Izod Impact (ft-lb/in) | 1.0 | 0.9 | 1.0 | 0.8 |
| IZOD DV (ft-lb/inch) | | 0.1 | | |
| Other properties | | | | |
| Hexane Extractables (%) | 0.22 | 0.16 | 0.5 | 0.21 |
| VICAT Soft. Pt. (° C.)-Plaque | 127.8 | 128 | 128.3 | 126.5 |
| Heat Deflection Temp. [° C.] @ 66 PSI | 73.3 | 73 | 77.8 | 75.3 |

TABLE 9

Polyethylene Component Properties

| Example | 7A | 8 | 9 |
|---|---|---|---|
| Density (g/cm³) | 0.9581 | 0.9542 | 0.955 |
| $I_2$ (g/10 min) | 7.03 | 7.28 | 7.55 |
| Stress Exponent | 1.3 | 1.35 | 1.38 |
| MFR ($I_{21}/I_2$) | 34.4 | 32.4 | 42.4 |
| Mw/Mn | 3.70 | 2.89 | 4.44 |
| First Ethylene Polymer | | | |
| Weight fraction | 0.447 | 0.433 | 0.433 |
| Mw | 119379 | 115624 | 111125 |
| $I_2$ (g/10 min) | 0.44 | 0.5 | 0.58 |
| Density, d1 (g/cm³) | 0.9438 | 0.9420 | 0.9395 |
| SCB1/1000C | 0.44 | 0.6 | 0.91 |
| Second Ethylene Polymer | | | |
| Weight fraction | 0.553 | 0.567 | 0.567 |
| Mw | 18458 | 26168 | 18721 |
| $I_2$ (g/10 min.) | 646 | 165 | 611 |
| Density, d2 (g/cm³) | 0.9633 | 0.9594 | 0.9612 |
| SCB2/1000C | 0.23 | 0.29 | 0.45 |
| Estimated (d2-d1), g/cm³ | 0.0195 | 0.0174 | 0.0217 |
| Estimated SCB1/SCB2 | 1.91 | 2.07 | 2.02 |

The polyethylene compositions described above can be used in the formation of bottle closure assemblies. For example, bottle closure assemblies formed in part on in whole by compression molding and/or injection molding are contemplated.

In one embodiment, the bottle closure assembly includes the polyethylene composition described above which have a good balance of processability, organoleptic properties, dimensional stability, and ESCR values. Hence the bottle closure assemblies are well suited for sealing bottles, containers and the like, for examples bottles that may contain drinkable water, and other foodstuffs, including but not limited to liquids that are non-pressurized.

In an embodiment of the disclosure, a bottle closure assembly including a polyethylene composition defined as above is prepared with a process including at least one compression molding step and/or at least one injection molding step.

Preparation of a Tether Proxy for Deformation Testing

Figure 13A:
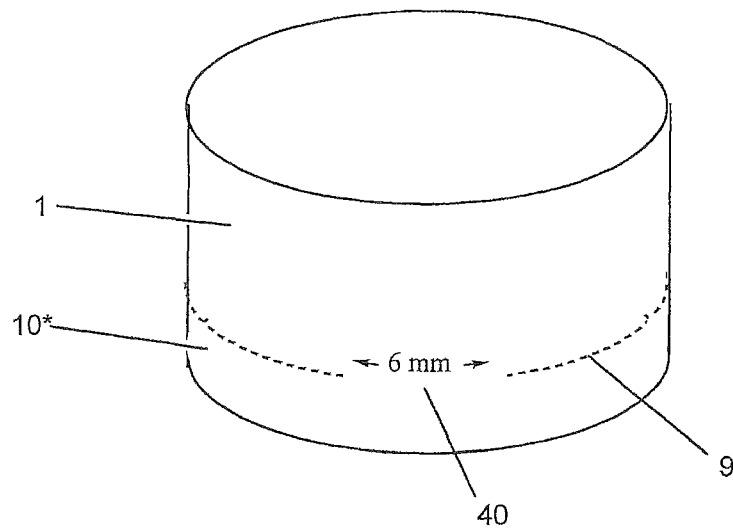
FIG. 13A shows a perspective view of a closure having a tether proxy.
Figure 13B:
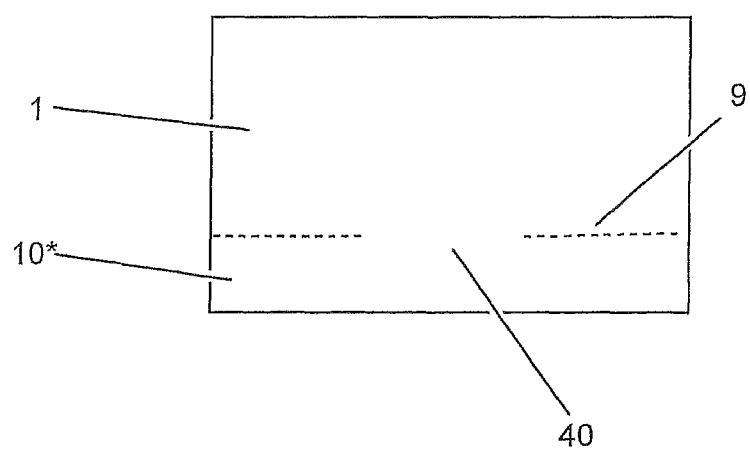
FIG. 13B shows a front elevation view of a closure having a tether proxy.

In order to provide a proxy of a tether portion which can be analyzed under conditions of shear, tear, and tensile deformation, a closure (see FIGS. 13A and 13B) was compression molded as described below and then a tamper evident band, 10* (a proxy for a retaining means portion, 10) was formed by folding in and cutting the bottom circular edge of the closure using a folding/slitting machine with a modified blade, so that a tamper evident band (10*) which was joined to the cap portion (1) by several narrow ("pin" like) connecting sections (marked by the frangible line, 9 in FIGS. 13A and 13B) and one larger continuous section (i.e. continuous with a portion of the cap portion side wall), with the larger continuous section serving as a proxy for a tether (the area marked as 40 in FIGS. 13A and 13B). The larger continuous section or "tether proxy" section was designed to have an arcuate length of 6 mm. The "tether proxy" section had a cross-sectional width (or thickness) of 0.6 mm as determined by the dimensions of the closure mold used for the compression molding process (see below). The "tether proxy" section, or simply "tether proxy" 40 was then subjected to shear and tear deformations and to tensile deformation using a toque tester unit and tensile tester unit respectively (see below).

Method of Making a Closure by Compression Molding

A SACMI Compression molding machine (model CCM24SB) and a PCO (plastic closure only) 1881 carbonated soft drink (CSD) closure mold was used to prepare the closures. Depending on material density, melt index ($I_2$) and chosen plug size, the closure weight varied between 2.15 g and 2.45 grams, with the process conditions adjusted to target a closure having a weight of about 2.3 grams. During the closure preparation process, the overall closure dimensions, such as, for the example, the closure diameter and the closure height were measured and maintained within desired "quality-controlled" specifications. Closures with poor circularity or with significant deformation away from the pre-defined specifications were rejected by an automatic vision system installed on the compression molding machine. Once the closure had been compression molded, a tamper evident band, inclusive of one larger continuous section (a proxy for a tether portion) was cut into the closure bottom edge using a folding/slitting machine fitted with a modified blade. Both experimental and simulated data confirmed that 99% of any closure weight differences were due to differences in the top panel thickness of the cap portion (see FIG. 13A) for each of the compression molded closures. For example, in the closures prepared by compression molding, the top panel thickness values of closures having a weight ranging from 2.15 grams to 2.45 grams were found to be slightly different, but each of the closure side wall thicknesses were found to be identical. As a result, any small differences in the compression molded cap weight were expected to have no impact on the dimensions of the tamper evident band or the tether proxy section (see above): in each case, the tether proxy had an arcuate length of 6 mm and a cross-sectional thickness of 0.6 mm.

Type 1 closures were compression molded from the polyethylene composition of Example 7B which had a melt index, $I_2$ of 7 g/10 min and a density of 0.957 g/cm³.

Type 2 closures (Comparative) were compression molded from a unimodal polyethylene copolymer of ethylene and 1-butene having a melt index $I_2$ of 32 g/10 min, a density of 0.951 g/cm³, and a molecular weight distribution, Mw/Mn of 2.88, and which is made using a Ziegler-Natta catalyst in a solution olefin polymerization process. This resin is commercially available from NOVA Chemicals Corporation as SCLAIR 2712.

The compression molding conditions used to make each closure type are provided in Table 10.

TABLE 10

| Compression Molding Processing Conditions | | |
|---|---|---|
| Closure Type No. | 1 | 2 |
| Closure Weight (g) | 2.32 | 2.39 |
| BT1 Temp (° C.) | 164 | 163 |
| BT2 Temp (° C.) | 166 | 164 |

TABLE 10-continued

| Compression Molding Processing Conditions | | |
|---|---|---|
| Closure Type No. | 1 | 2 |
| BT3 Temp (° C.) | 160 | 163 |
| BT4 Temp (° C.) | 162 | 161 |
| BT6 Temp (° C.) | 170 | 170 |
| BT7 Temp (° C.) | 182 | 187 |
| BT8 Temp (° C.) | 183 | 184 |
| BT9 Temp (° C.) | 182 | 184 |
| BT15 Temp (° C.) | 170 | 170 |
| BT16 Temp (° C.) | 165 | 165 |
| BT17 Temp (° C.) | 174 | 174 |
| Metering Pump Set Press (bar) | 50 | 50 |
| Metering Pump Actual Press 1 (bar) IN | 48.5 | 50 |
| Metering Pump Actual Press 2 (bar) OUT | 52.4 | 30.6 |
| Pump Speed (%) | 56 | 57 |
| Hydraulic Operating Temp (° C.) | 46 | 46 |
| Punch Cooling BT18 (° C.) | 20 | 20 |
| Cavity Cooling BT19 (° C.) | 20 | 20 |
| Ausiliari Cooling BT20 (° C.) | 30 | 30 |

Shear Deformation of a Tether Proxy

Figure 14A:
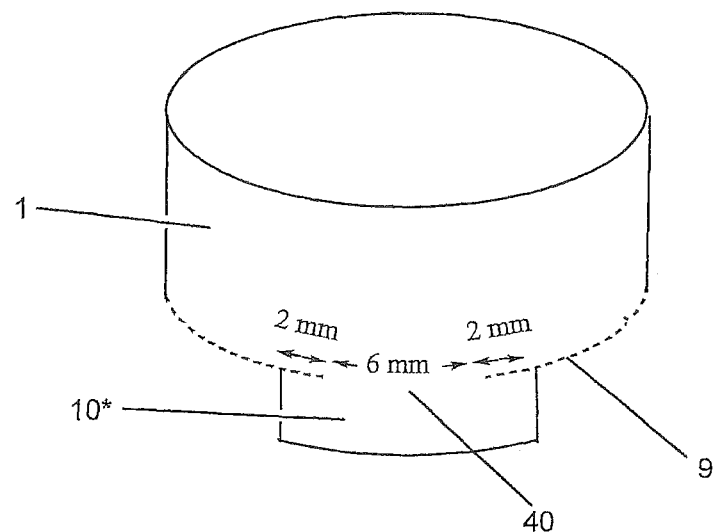
FIG. 14A shows a perspective view of a closure having a tether proxy after much of the tamper evident band has been removed.
Figure 14B:
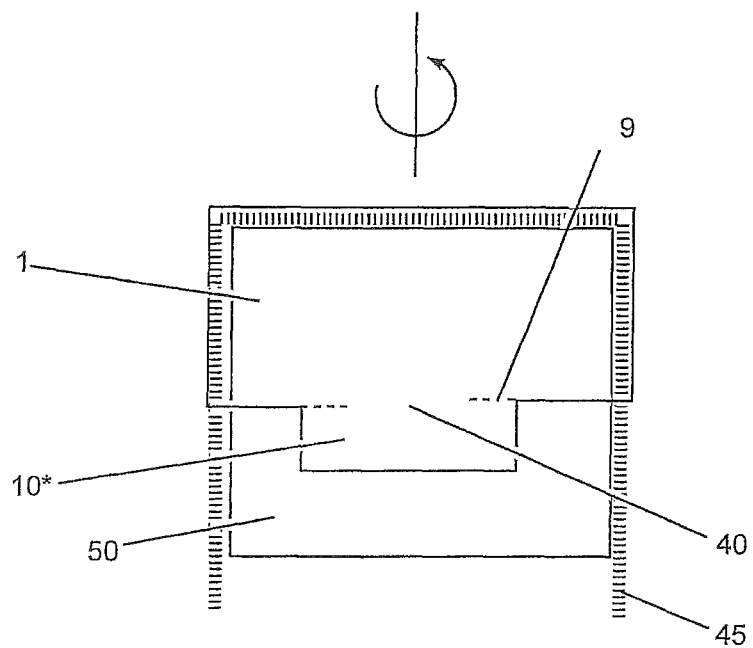
FIG. 14B shows a front elevation partial cross-sectional schematic view of a closure having a tether proxy and being mounted on a pre-form for shear deformation testing. Prior to mounting the closure on the pre-form, much of the tamper evident band was removed. The tether proxy connects a cap portion to the remaining section of the tamper evident band. To measure shear deformation of the tether proxy, the remaining section of the tamper evident band is clamped in a stationary position to the pre-form, while the cap portion is rotated within a torque tester, as shown.

A TMS 5000 Torque Tester unit manufactured by Steinfurth was used to carry out the tether proxy shear deformation testing. The unit was adjusted to operate in "removal torque mode". A closure having a tether proxy section (area 40 in FIGS. 13A and 13B) with a 6 mm arcuate length and a 0.6 mm cross-sectional width connecting a cap portion (1) to a tamper evident band 10* (a proxy for a retaining means portion, 10) and suitable for mating with a PCO 1881 bottle finish was employed. Prior to testing, the tamper evident band (10*) was unfolded and then almost entirely removed, by cutting through the tamper evident band at a distance of approximately 2 mm from each end of the tether proxy section. The remaining portion of the tamper evident band (as shown in FIGS. 14A and 14B) then, includes the tether proxy section having an arcuate length of 6 mm, and a further 2 mm arcuate length section on either side of the tether proxy section, all of which has a cross sectional width of 0.6 mm. Adding 2 mm to either side of the tether proxy section provides a larger surface area to grip when carrying out the shear deformation testing. In order to support the closure for testing in the Torque Tester unit, a modified tubular preform was used (item 45 in FIG. 14B). The tubular pre-form 45 was made of polyethylene terephthalate and was modified to have smooth outer walls. Following this, a brass rod (50), having a diameter which fit snuggly within the preform (45) was inserted as a plug to afford rigidity to the pre-form and to prevent its deformation during testing. Next, the closure was placed on top of the pre-form and the remaining section of the tamper evident band (10*) was clamped to the preform using vice grips. The closure and preform were then mounted within the Torque Tester. The cap portion (1) was gripped from above within a suitably designed chuck and rotated at a removal torque speed of 0.8 rpm, relative to the clamped section of the tamper evident band, using the Torque Tester. The shear strength of the tether proxy (40) is defined as the maximum torque (in inches·pounds) required to separate the cap portion (1) from the remaining section of the tamper evident band section (10*) by breaking the tether proxy (40). The reported shear strength in Table 11 is the average of at least 5 such shear deformation tests.

Tear Deformation of a Tether Proxy

Figure 14C:
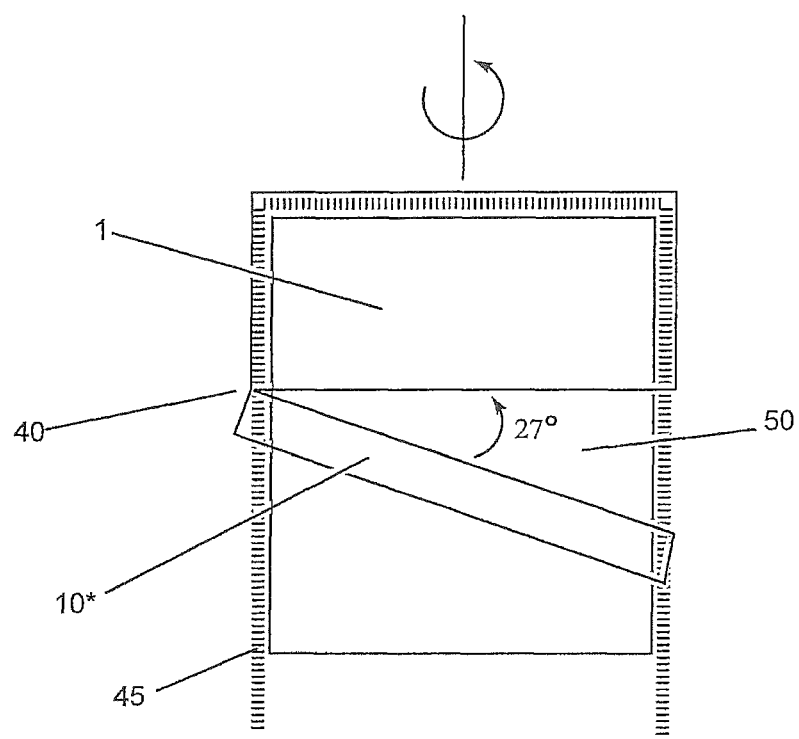
FIG. 14C shows a side elevation partial cross-sectional schematic view of a closure having a tether proxy and being mounted on a pre-form for tear deformation testing. The tamper evident band was deflected down and away from the cap portion, while leaving the tether proxy intact. The tether proxy connects the cap portion to the downwardly deflected tamper evident band. To measure tear deformation of the tether proxy, the downwardly deflected tamper evident band is clamped in a stationary position to the pre-form, while the cap portion is rotated within a torque tester, as shown.

A TMS 5000 Torque Tester unit manufactured by Steinfurth was used to carry out the tether proxy shear deformation testing. The unit was adjusted to operate in "removal torque mode". A closure having a tether proxy section (area 40 in FIGS. 13A and 13B) with a 6 mm arcuate length and a 0.6 mm cross-sectional width connecting a cap portion (1) to a tamper evident band 10* (a proxy for a retaining means portion, 10) and suitable for mating with a PCO 1881 bottle finish was employed. In order to support the closure for testing in the Torque Tester unit, a modified tubular pre-form was used (item 45 in FIG. 14C). The tubular pre-form 45 was made of polyethylene terephthalate and was modified to have smooth outer walls. Following this, a brass rod (50), having a diameter which fit snuggly within the pre-form (45) was inserted as a plug to afford rigidity to the pre-form and to prevent its deformation during testing. Next, the closure was placed on top of the preform. Prior to testing, the tamper evident band (10*) was deflected downward (on the opposite side of the tether proxy section) and away from the cap portion (1) as is shown in FIG. 14C. The downward deflection breaks all the narrow pin sections (the frangible line 9 in FIGS. 13A and 13B) joining the top edge of the tamper evident band to the lower edge of the cap portion while leaving the larger continuous section, the tether proxy section (40), intact. The tamper evident band (10*) is deflected downward and away from the cap portion (1) until the top edge of the tamper evident band makes an angle with the lower edge of the cap portion of about 27 degrees, while the tether portion remains intact along its 6 mm arcuate length (see FIG. 14C). The tamper evident band (10*) was then clamped to the pre-form in this downwardly deflected position using vice grips. The closure and pre-form were then mounted within the Torque Tester. The cap portion (1) was gripped from above within a suitably designed chuck and rotated at a removal torque speed of 0.8 rpm, relative to the clamped tamper evident band (10*), using the Torque Tester. The tear strength of the tether proxy (40) is defined as the maximum torque (in inches·pounds) required to separate the cap portion (1) from the downwardly deflected tamper evident band (10*) by breaking the tether proxy (40). The reported tear strength in Table 11 is the average of at least 5 such tear deformation tests.

Tensile Deformation of a Tether Proxy

Figure 15A:
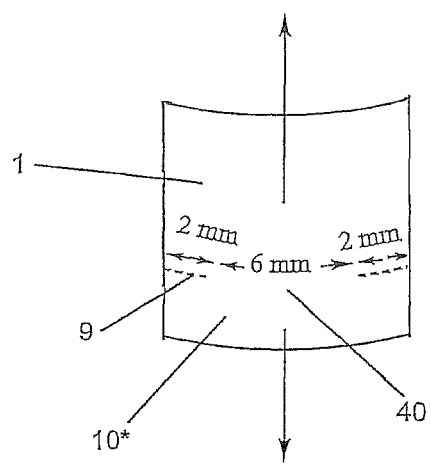
FIGS. 15A and 15B show a perspective view and a front elevation view respectively, of a tether proxy after much of the cap portion and much of the tamper evident band have been removed. To measure tensile deformation of the tether proxy, the remaining section of the cap portion and the remaining section of the tamper evident band are each clamped and then drawn apart in a vertical direction, within a tensile tester, as shown.
Figure 15:
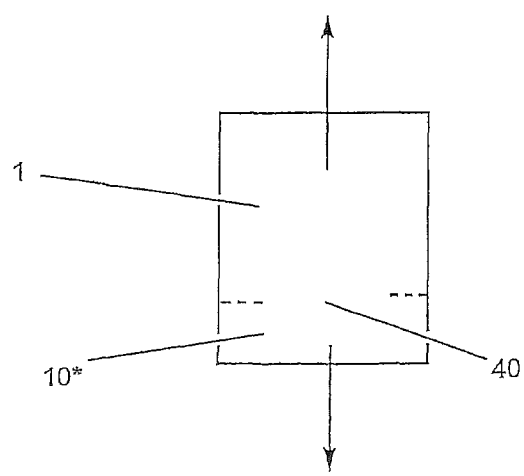

Tensile deformation tests were performed using a tensile machine (an Instron 4204 universal tester, with a 1 KN (225 lbf) capacity load cell) with the crosshead velocity set at 50 mm/min. A closure having a tether proxy section (area 40 in FIGS. 13A and 13B) with a 6 mm arcuate length and a 0.6 mm cross-sectional width connecting a cap portion (1) to a tamper evident band 10* (a proxy for a retaining means portion, 10) and suitable for mating with a PCO 1881 bottle finish was employed. Prior to testing, the tamper evident band (10*) was unfolded and then almost entirely removed, by cutting through the tamper evident band at a distance of approximately 2 mm from each end of the tether proxy section (see FIGS. 14A, 15A, and 15B). The remaining portion of the tamper evident band (as shown in FIGS. 14A, 15A, and 15B) then, includes the tether proxy section having an arcuate length of 6 mm, and a further 2 mm arcuate length section on either side of the tether proxy section, all of which has a cross sectional width of 0.6 mm. Adding 2 mm to either side of the tether proxy section provides a larger surface area to grip when carrying out the tensile deformation testing. For the tensile deformation test, most of the cap portion (1) was similarly cut away, leaving only a section of the cap portion side wall connected to the what was left of the tamper evident band (see FIGS. 15A and 15B). This "cut away" section of the closure was then mounted in the tensile tester, with the remaining cap portion side wall and the remaining tamper evident band each being secured with 0.5-inch wide steel serrated grips at a 0.25-inch grip separation. During the tensile testing, the remaining section of the cap portion (1) and the remaining section of the tamper evident band (10*) were drawn apart vertically. The tensile strength of the tether proxy (40) is defined as the maximum load (in grams·force, gf) required to separate the remaining cap portion (1) from the remaining tamper evident band section (10*) by breaking the tether proxy (40). The reported tensile strength in Table 11 is the average of at least 5 such tensile deformation tests.

TABLE 11

| Average Shear, Tear, and Tensile Deformation of a Tether Proxy | | |
|---|---|---|
| Closure Type No. | 1 | 2 (Comparative) |
| Shear Strength (inches · pounds) | 10.48 | 9.43 |
| Tear Strength (inches · pounds) | 10.51 | 9.18 |
| Tensile Strength (grams · force) | 15122 | 12800 |

A person skilled in the art will recognize from the data provided in Table 11, that a tether proxy made using a polyethylene composition according to the current disclosure may have a relatively good ability to resist shear, tear, and tensile deformations (relative to a comparative tether proxy made from a unimodal polyethylene copolymer of ethylene and 1-butene, SCLAIR 2712). The data thus provides further evidence that the polyethylene compositions described herein may be useful in the production of bottle closure assemblies, by preventing facile separation of a cap portion from a retaining means portion or from a bottle, and by generally helping to prevent loss or disassociation of a cap portion (a potential plastic waste stream) from a bottle, where the cap portion could otherwise contribute to environmental waste concerns.

The present disclosure has been described with reference to certain details of particular embodiments thereof. It is not intended that such details be regarded as limitations upon the scope of the disclosure except insofar as and to the extent that they are included in the accompanying claims.

What is claimed is:

1. A bottle closure assembly comprising:
an integrally molded: cap portion, elongated tether portion, and retaining means portion; the cap portion being molded to reversibly engage and cover a bottle opening, the retaining means portion being molded to irreversibly engage a bottle neck or an upper portion of a bottle, and the elongated tether portion being molded to connect at least one point on the cap portion to at least one point on the retaining means portion; wherein the integrally molded: cap portion, elongated tether portion, and retaining means portion are made from a polyethylene composition comprising:
(1) 10 to 70 wt. % of a first ethylene copolymer having a melt index $I_2$, of 10 g/10 min or less; and a density of from 0.920 to 0.960 g/cm$^3$; and
(2) 90 to 30 wt. % of a second ethylene copolymer having a melt index $I_2$, of at least 50 g/10 min; and a density higher than the density of the first ethylene copolymer, but less than 0.970 g/cm$^3$;

wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

2. The bottle closure assembly of claim 1, wherein the first and second ethylene copolymer comprise polymerized ethylene and at least one polymerized alpha-olefin comonomer, wherein the polymerized ethylene is the majority species.

3. The bottle closure assembly of claim 1, wherein the polyethylene composition comprises:
   (1) 10 to 70 wt. % of a first ethylene copolymer having a melt index $I_2$, of from 0.1 to 10 g/10 min; a molecular weight distribution $M_w/M_n$, of less than 3.0; and a density of from 0.930 to 0.960 g/cm$^3$; and
   (2) 90 to 30 wt. % of a second ethylene copolymer having a melt index $I_2$, of from 50 to 10,000 g/10 min; a molecular weight distribution $M_w/M_n$, of less than 3.0; and a density higher than the density of the first ethylene copolymer, but less than 0.966 g/cm$^3$;
   wherein the density of the second ethylene copolymer is less than 0.037 g/cm$^3$ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.0; and
   wherein the polyethylene composition has a molecular weight distribution $M_w/M_n$, of from 2 to 7; a density of at least 0.950 g/cm$^3$; a high load melt index $I_{21}$, of from 150 to 400 g/10 min; a Z-average molecular weight $M_Z$, of less than 300,000; a melt flow ratio $I_{21}/I_2$, of from 22 to 50; a stress exponent of less than 1.40; and an ESCR Condition B (100% IGEPAL® CO-630) of at least 3.5 hrs.

4. A bottle closure assembly comprising:
an integrally molded: cap portion, elongated tether portion, and retaining collar portion; the cap portion being molded to reversibly engage and cover a bottle opening, the retaining collar portion being molded to irreversibly engage a bottle neck or an upper portion of a bottle, and the elongated tether portion being molded to connect at least one point on the cap portion to at least one point on the retaining collar portion; wherein the integrally molded: cap portion, elongated tether portion, and retaining collar portion are made from a polyethylene composition comprising:
   (1) 10 to 70 wt. % of a first ethylene copolymer having a melt index $I_2$, of 10 g/10 min or less; and a density of from 0.920 to 0.960 g/cm$^3$; and
   (2) 90 to 30 wt. % of a second ethylene copolymer having a melt index $I_2$, of at least 50 g/10 min; and a density higher than the density of the first ethylene copolymer, but less than 0.970 g/cm$^3$;
   wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

5. The bottle closure assembly of claim 4, wherein the first and second ethylene copolymer comprise polymerized ethylene and at least one polymerized alpha-olefin comonomer, wherein the polymerized ethylene is the majority species.

6. The bottle closure assembly of claim 4, wherein the polyethylene composition comprises:
   (1) 10 to 70 wt. % of a first ethylene copolymer having a melt index $I_2$, of from 0.1 to 10 g/10 min; a molecular weight distribution $M_w/M_n$, of less than 3.0; and a density of from 0.930 to 0.960 g/cm$^3$; and
   (2) 90 to 30 wt. % of a second ethylene copolymer having a melt index $I_2$, of from 50 to 10,000 g/10 min; a molecular weight distribution $M_w/M_n$, of less than 3.0; and a density higher than the density of the first ethylene copolymer, but less than 0.966 g/cm$^3$;
   wherein the density of the second ethylene copolymer is less than 0.037 g/cm$^3$ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.0; and
   wherein the polyethylene composition has a molecular weight distribution $M_w/M_n$, of from 2 to 7; a density of at least 0.950 g/cm$^3$; a high load melt index $I_{21}$, of from 150 to 400 g/10 min; a Z-average molecular weight $M_Z$, of less than 300,000; a melt flow ratio $I_{21}/I_2$, of from 22 to 50; a stress exponent of less than 1.40; and an ESCR Condition B (100% IGEPAL® CO-630) of at least 3.5 hrs.

7. A bottle closure assembly comprising:
a closure portion, an elongated tether portion, and a retaining collar portion, the closure portion being molded to reversibly engage and cover a bottle opening, the elongated tether portion comprising a tether strip which is frangibly connected along a portion of its upper edge to a descending annular edge of the closure portion and which is frangibly connected along a portion of its lower edge to an upper annular edge of the retaining collar portion, the tether strip being integrally formed with and connected at one end to at least one point on the closure portion and integrally formed with and connected at another end to at least one point on the retaining collar portion, the frangible connections being breakable when the closure portion is removed from a bottle opening, but where the closure portion remains connected to the retaining collar portion via the tether strip; wherein the closure portion, the elongated tether portion, and the retaining collar portion are integrally molded from a polyethylene composition comprising:
   (1) 10 to 70 wt. % of a first ethylene copolymer having a melt index $I_2$, of 10 g/10 min or less; and a density of from 0.920 to 0.960 g/cm$^3$; and
   (2) 90 to 30 wt. % of a second ethylene copolymer having a melt index $I_2$, of at least 50 g/10 min; and a density higher than the density of the first ethylene copolymer, but less than 0.970 g/cm$^3$;
   wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

8. The bottle closure assembly of claim 7, wherein the first and second ethylene copolymer comprise polymerized ethylene and at least one polymerized alpha-olefin comonomer, wherein the polymerized ethylene is the majority species.

9. The bottle closure assembly of claim 7, wherein the polyethylene composition comprises:

(1) 10 to 70 wt. % of a first ethylene copolymer having a melt index $I_2$, of from 0.1 to 10 g/10 min; a molecular weight distribution $M_w/M_n$, of less than 3.0; and a density of from 0.930 to 0.960 g/cm$^3$; and (2) 90 to 30 wt. % of a second ethylene copolymer having a melt index $I_2$, of from 50 to 10,000 g/10 min; a molecular weight distribution $M_w/M_n$, of less than 3.0; and a density higher than the density of the first ethylene copolymer, but less than 0.966 g/cm$^3$;

wherein the density of the second ethylene copolymer is less than 0.037 g/cm$^3$ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.0; and wherein the polyethylene composition has a molecular weight distribution $M_w/M_n$, of from 2 to 7; a density of at least 0.950 g/cm$^3$; a high load melt index $I_{21}$, of from 150 to 400 g/10 min; a Z-average molecular weight $M_Z$, of less than 300,000; a melt flow ratio $I_{21}/I_2$, of from 22 to 50; a stress exponent of less than 1.40; and an ESCR Condition B (100% IGEPAL® CO-630) of at least 3.5 hrs.

\* \* \* \* \*